(12) United States Patent
Raiyani et al.

(10) Patent No.: US 7,603,291 B2
(45) Date of Patent: Oct. 13, 2009

(54) MULTI-MODAL SALES APPLICATIONS

(75) Inventors: Samir Raiyani, Sunnyvale, CA (US); Jie Weng, Sunnyvale, CA (US); Li Gong, San Francisco, CA (US); Jordan Anderson, Brooklyn, NY (US); Wai Or, Hayward, CA (US); Ju-Kay Kwek, San Francisco, CA (US); John Hanley, Redwood City, CA (US)

(73) Assignee: SAP Aktiengesellschaft, Walldorf ( * ) Notice: Subject to any disclaimer, the term of this patent is extended or adjusted under 35 U.S.C. 154(b) by 768 days.

(21) Appl. No.: 10/743,348

(22) Filed: Dec. 23, 2003

(65) Prior Publication Data

US 2004/0181461 A1 Sep. 16, 2004

Related U.S. Application Data

(60) Provisional application No. 60/454,762, filed on Mar. 14, 2003, provisional application No. 60/470,898, filed on May 16, 2003, provisional application No. 60/474,217, filed on May 30, 2003.

(51) Int. Cl.
G06Q 30/00 (2006.01)
(52) U.S. Cl. .......................... 705/26; 705/37
(58) Field of Classification Search ............. 705/26, 705/27, 37
See application file for complete search history.

(56) References Cited

U.S. PATENT DOCUMENTS

| | | |
|---|---|---|
| 5,734,910 A | 3/1998 | Corrigan et al. |
| 5,945,989 A | 8/1999 | Freishtat et al. |
| 5,999,908 A | 12/1999 | Abelow |

(Continued)

FOREIGN PATENT DOCUMENTS

EP 1 100 013 A 5/2001

(Continued)

OTHER PUBLICATIONS

"Can technology make shopping fun?", Panos Kourouthanassis. International Commerce Review : ECR Journal. Brussels: Winter 2003. vol. 3, Iss. 2; p. 37, downloaded from ProQuest Direct on the Internet on Aug. 1, 2009, 8 pages.*

(Continued)

Primary Examiner—James Zurita
(74) Attorney, Agent, or Firm—Fish & Richardson P.C.

(57) ABSTRACT

A sales system is described that enables fast, efficient shopping by customers, and thereby increases sales and encourages customer loyalty, while simultaneously improving store management. An electronic device, which may be mobile or stationary, and which may belong or be assigned to (or accessed by) each customer, is used to access shopping information that might not otherwise be available to the customer during shopping. For example, a personal digital assistant or information kiosk may be used to provide specific product information and complete a sale thereof, or to provide suggested purchase lists and best routes through the store during shopping. The sales system is multi-modal, so that a plurality of input modalities (such as voice or auto-id techniques) are simultaneously available to the customer. Additionally, because it is multi-modal, the system can communicate with other store items, such as shelves or shopping carts, to gain (and integrate) information about customers and the products the customers are purchasing.

18 Claims, 57 Drawing Sheets

U.S. PATENT DOCUMENTS

| | | | |
|---|---|---|---|
| 6,012,030 A | | 1/2000 | French-St. George et al. |
| 6,119,147 A | | 9/2000 | Toomey et al. |
| 6,129,276 A | * | 10/2000 | Jelen et al. .................. 235/383 |
| 6,173,266 B1 | | 1/2001 | Marx et al. |
| 6,330,539 B1 | | 12/2001 | Takayama et al. |
| 6,338,053 B2 | | 1/2002 | Uehara et al. |
| 6,363,393 B1 | | 3/2002 | Ribitzky |
| 6,377,913 B1 | | 4/2002 | Coffman et al. |
| 6,473,739 B1 | * | 10/2002 | Showghi et al. ............... 705/26 |
| 6,501,832 B1 | | 12/2002 | Saylor et al. |
| 6,513,063 B1 | | 1/2003 | Julia et al. |
| 6,523,061 B1 | | 2/2003 | Halverson et al. |
| 7,062,454 B1 | * | 6/2006 | Giannini et al. ............... 705/27 |
| 7,174,308 B2 | | 2/2007 | Bergman et al. |
| 2001/0049603 A1 | | 12/2001 | Sravanapudi et al. |
| 2004/0103034 A1 | * | 5/2004 | Reade et al. .................. 705/16 |

FOREIGN PATENT DOCUMENTS

| | | |
|---|---|---|
| EP | 1 223 521 A | 7/2002 |
| WO | WO 96/13030 A | 5/1996 |
| WO | WO 97/28634 A | 8/1997 |
| WO | WO 01/31546 A | 5/2001 |
| WO | WO 01/69449 A | 9/2001 |
| WO | WO 01/93250 A | 12/2001 |

OTHER PUBLICATIONS

Albert, Dietrich, et al., "Adaptive and Dynamic Hypertext Tutoring Systems Based on Knowledge Space Theory," in *Artificial Intelligence in Education: Knowledge and Media in Learning Systems*, Benedict du Boulay and Riichiro Mizoguchi, Eds., 39:553-555 (1997), IOS Press, Amsterdam, retrieved from the Internet on Aug. 20, 2004, at http://wundt.kfunigraz.ac.at/rath/publications/aied-97. pdf.

Altenhofen, Michael, et al., "Adaptation and Use," in *Cooperative Computer-Aided Authoring and Learning: A Systems Approach*, Muehlhaeuser, Max, Ed., 1995, Kluwer Academic Publishers, Dordrecht, Netherlands, pp. 293-318.

Amazon.com, "Amazon.com—Your Store," undated materials, retrieved from the Internet on Dec. 23, 2003, at http://www.amazon.com.exec/obidos/tg/stores/your/store-home/-/0/ref=pd_ysl_gw_fr_2/102-338, 4 pgs.

Amazon.com, "Search Books at Amazon.com," undated materials, retrieved from the Internet on Nov. 1, 2002, at http://www.amazon.com/exec/obidos/ats-query-page/ref=b_tn_bh_bo/002-6912623-71384, 2 pgs.

Clark, Scott, "VXML Home: Voice XML Articles, Tutorials and Features," 2002, retrieved from the Internet on Oct. 30, 2002, at http://www.webreference.com/programming/vxml/, 3 pgs.

Classen, Michael, "The Voice of XML," Jun. 6, 2001, retrieved from the Internet on Oct. 30, 2002, at http://www.webreference.com/xml/column33/index.html, 10 pgs.

Compaq, "Customize Your Configuration," undated materials, retrieved from the Internet on May 13, 2002, at http://athome.compaq.com/configuration.asp?tab=0&fromScratch=Y&ProductLineID=441, 5 pgs.

Dell Computer Corporation, "Dell Express Path II: Computer Finder," undated materials, retrieved from the Internet on May 13, 2002, at http://catalog.us.dell.com/ep2/ep2selection.asp?customer_id=19&keycode=6V127, 2 pgs.

Eisenzopf, Jonathan, "Microsoft-led SALT Forum Releases Draft Spec," 2002, retrieved from the Internet on Oct. 30, 2002, at http://voicexmlplanet.com/articles/saltspec.html, 4 pgs.

Henze, Nicola, et al., "Modeling Constructivist Teaching Functionality and Structure in the KBS Hyperbook System," Jun. 4, 1999, retrieved from the Internet on Aug. 20, 2004, at http://www.kbs.uni-hannover.de/Arbeiten/Publikationen/1999/aied99/aied99.pdf, 12 pgs.

Hewlett-Packard Company, "HP Support—Directory of Hewlett-Packard Support Information," undated materials, retrieved from the Internet on Nov. 1, 2002, at http://welcome.hp.com/country/us/eng/support.htm, 5 pgs.

Hewlett-Packard Company, "My HP, My Way!" undated materials, retrieved from the Internet on Nov. 1, 2002, at http://ctodirect.ebus.hp.com/servlet/com.hp.ibs.confighpd.ConfigHpd, 3 pgs.

Hunt, Andrew, Ed., "JSpeech Grammar Format," Jun. 5, 2000, retrieved from the Internet on Aug. 20, 2004, at http://www.w3.org/TR/2000/NOTE-jsgf-20000605, 31 pgs.

Jin, Lai, et al., "An Ontology-Aware Authoring Tool—Functional Structure and Guidance Generation," undated materials, retrieved from the Internet on Aug. 20, 2004, at http://www.ei.sanken.osaka-u.ac.jp/pub/kin/kin-aied99.pdf, 8 pgs.

Jungmann, Michael, et al., "Adaptive Hypertext in Complex Information Spaces," technical report, Technical University of Ilmenau, Mar. 8, 1997, 5 pgs.

Jupitermedia Corporation, "KnowNow Debuts with Event Routing Technology," Jun. 28, 2001, retrieved from the Internet on Oct. 30, 2002 at http://siliconvalley.internet.com/news/print.php/793671, 2 pgs.

KnowNow, Inc., "Event Routing vs. Multicasting: Marrying Publish-Subscribe and Internet-Style Routing," 2002, 3 pgs.

KnowNow, Inc., "KnowNow Architecture Overview," 2002, 5 pgs.

KnowNow, Inc., "KnowNow, Inc. > Products > Library," 2002, retrieved from the Internet on Dec. 5, 2002, at http://www.knownow.com/products/library.html 1 pg.

KnowNow, Inc., "Web-Standard Messaging: Using Message Routing for Fast, Simple and Affordable Integration," 2002, 4 pgs.

Muehlhaeuser, Max, et al., "Base System and Hypermedia," in *Cooperative Computer-Aided Authoring and Learning: A Systems Approach*, Muehlhaeuser, Max, Ed., 1995, Kluwer Academic Publishers, Dordrecht, Netherlands, pp. 165-192.

Muehlhaeuser, Max, et al., "Instructional Strategies and Processes," in *Cooperative Computer-Aided Authoring and Learning: A Systems Approach*, Muehlhaeuser, Max, Ed., 1995, Kluwer Academic Publishers, Dordrecht, Netherlands, pp. 273-291

Muehlhaeuser, Max, et al., "The Nestor Reference Architecture," in *Cooperative Computer-Aided Authoring and Learning: A Systems Approach*, Muehlhaeuser, Max, Ed., 1995, Kluwer Academic Publishers, Dordrecht, Netherlands, pp. 107-130.

Nuance Communications Inc., "Press Release: Nuance 8.0 Delivers Lower Costs for Enterprises and Service Providers, Boosts Customer Satisfaction with Superior Accuracy and Personalized Caller Interactions," Jan. 14, 2002, retrieved from the Internet on Oct. 30, 2002, at http://www.nuance.com/corp/press/2002/20020114_nuance8.html, 4 pgs.

Nuance Communications Inc., "Press Release: Nuance Backs W3C for Multi-Modal Applications Standard Setting," Feb. 5, 2002, retrieved from the Internet on Oct. 30, 2002, at http://www.nuance.com/corp/press/2002/20020205_nuancebacksw3c_int.html, 2 pgs.

Nuance Communications Inc., "<log> element," retrieved from the Internet on Apr. 2, 2003, at http://techpreview.voxeo.com/docs/vxml/nuance20/log.html, 1 pg.

Nuance Communications Inc., "Tuning Automated Speech Applications (3 days)," retrieved from the Internet on Dec. 23, 2003, at http://www.nuance.com/learn/training/courses/tuningautomatedspeechapps.html, 2 pgs.

Nuance Communications Inc., "VoiceBrowser Interface," retrieved from the Internet on Apr. 2, 2003, at http://techpreview.voxeo.com/docs/vxml/nuance20/voicebrowint.html, 5 pgs.

Paaso, Jouko, et al., "A New Environment for Courseware Development, Course Delivery and Training," Proceedings of the ED-Media 97, Toronto, Ontario, Canada, 10 pgs.

Ranwez, Sylvie, et al., "Description and Construction of Pedagogical Material Using an Ontology Based DTD," Workshop on AI-ED '99, Ninth International Conference on Artificial Intelligence in Education, Le Mans, France, Jul. 19-23, 1999, retrieved from the Internet on Aug. 23, 2004, at http://www.ei.sanken.osaka-u.ac.jp/aied99/a-papers/S-Ranwez.pdf, 4 pgs.

Riben, Michael, M.D., "Voice Recognition for Pathology Tutorial," Jan. 21, 1999, retrieved from the Internet on May 27, 2002, at http://home.nycap.rr.com/voice/Introduction.htm, 50 pgs.

ScanSoft, Inc., "ScanSoft—Product Catalog," 2002, retrieved from the Internet on Nov. 1, 2001, at http://www.scansoft.com/products/, 8 pgs.

Schaper, Joachim, et al., ADP Authoring/Learning, in *Cooperative Computer-Aided Authoring and Learning: A Systems Approach*, Muehlhaeuser, Max, Ed., 1995, Kluwer Academic Publishers, Dordrecht, Netherlands, pp. 145-161.

Siekmann, Joerg, et al., "Adaptive Course Generation and Presentation," retrieved from the Internet on Aug. 23, 2004, at http://www.activemath.org/~paul/Publications/2000ITS/ActiveMathOverview.pdf, 10 pgs.

Speech Application Language Tags ("SALT") Forum, "Cisco, Comverse, Intel, Microsoft, Philips and SpeechWorks Found Speech Application Language Tags Forum to Develop New Standard For Multimodal and Telephony-Enabled Applications and Services," Oct. 15, 2001, retrieved from the Internet on Oct. 30, 2002, at http://www.saltforum.org/Oct15.asp, 5 pgs.

Speech Application Language Tags ("SALT") Forum, "The SALT Forum Welcomes Additional Technology Leaders as Contributors," Jan. 31, 2002, retrieved from the Internet on Oct. 30, 2002, at http://www.saltforum.org/Jan31.asp, 4 pgs.

Speech Application Language Tags ("SALT") Forum, "Speech Application Language Tags (SALT) Technical White Paper," printed from http://www.saltforum.org/Saltforum/downloads/SALT-TechnicalWhitePaper.pdf, 6 pgs.

van den Broecke, Just, "Pushlets: Send Events From Servlets to DHTML Client Browsers: Discover How Pushlets, a Servlet-Based Notification Mechanism, Enables Server-Side Java Objects to Call Back JavaScript Code Within a Client Browser," Mar. 2000, retrieved from the Internet on Oct. 30, 2002, at http://www.JavaWorld.com/javaworld/jw-03-2000/jw-03-pushlet_p.html, 15 pgs.

'Job Access With Speech' [online]. Wikipedia, Nov. 11, 2004, [retrieved on Nov. 22, 2004]. Retrieved from the Internet: <URL: http://en.wikipedia.org/wiki/Job_Access_With_Speech>.

'Web Accessibility' [online]. Wikipedia, Nov. 21, 2004, [retrieved on Nov. 22, 2004]. Retrieved from the Internet: <URL: http://en.wikipedia.org/wiki/Web_accessibility>.

'Window-Eyes Professional' [online]. GW Micro, 2004, [retrieved on Nov. 22, 2004]. Retrieved from the Internet: <URL: http://www.gwmicro.com/products>.

\* cited by examiner

MULTI-MODAL SALES APPLICATIONS

CROSS-REFERENCE TO RELATED APPLICATIONS

This application claims priority from (i) U.S. Provisional Application No. 60/454,762, filed Mar. 14, 2003, titled "Voice Recognition for Warehouse Management Applications," (ii) U.S. Provisional Application No. 60/470,898, filed May 16, 2003, titled "Sales and Warehouse Applications," and (iii) U.S. Provisional Application No. 60/474,217, filed May, 30, 2003, titled "Sales and Warehouse Applications."

TECHNICAL FIELD

Particular implementations relate generally to multiple modes of communication, and more particularly to such multiple modes of communication as applied to warehouse and retail environments.

BACKGROUND

A user may interface with a machine in many different modes, such as, for example, a mechanical mode, an aural mode, and a visual mode. A mechanical mode may include, for example, using a keyboard for input. An aural mode may include, for example, using voice input or output. A visual mode may include, for example, using a display output. This interfacing may consequently be used to use and access information in various commercial and non-commercial applications.

In a warehouse environment, a worker often uses his hands to perform tasks. Therefore, it may be difficult for the worker to access an electronic device while working. Moreover, particularly in large or complex storage systems, the worker may perform inefficiently. For example, the worker may select an inefficient route through the warehouse when stocking the warehouse. Additionally, human error committed by the worker may result in inaccurate inventory data. Other factors exist in warehouse management that may result in reduced profitability in the management of the warehouse.

In a retail sales environment, customers who have difficulties during shopping may purchase fewer items and a store may experience reduced customer loyalty. For example, if a customer would like to buy an item but cannot find the item on the shelves, or cannot find an employee who has access to information about the item, the customer may be less likely to purchase the item. Similarly, if the customer experiences a long wait at a check-out line, or spends excessive time searching for a particular product(s) to buy, the customer may be less likely to return to the store. Additionally, retail stores often receive large quantities of goods, some of which may be stored until ready for sale, others of which may be directly placed on shelves for sale.

SUMMARY

In one aspect, a database is operable to store retail data, wherein the retail data is accessible in a plurality of formats, each of the formats being compatible with one of a plurality of input modalities. Also, a server is operable to output a first page for display on an electronic device, the first page including a first field for receiving a customer request in a selected input modality from among the plurality of input modalities, wherein the server is operable to determine sales information in response to the customer request and based on the retail data. Additionally, a format determination system is operable to produce the sales information in each of the plurality of formats. The server is further operable to output a second page for display on the electronic device, the second page associated with the sales information in the plurality of formats and including a second field for responding to the sales information in any one of the input modalities.

Implementations may include one or more of the following features. For example, the retail data may include product information related to quantity, location, or description information associated with a product for sale. The customer request may include a request for the product information, and the sales information may include the product information.

The sales information also may include directions to a route for accessing products for sale. The retail data may include customer information related to a purchase history associated with an identified customer, and the sales information may include suggested purchases generated by the server based on the purchase history. The sales information may include pricing information, and the second field is operable to receive financial information for completing a purchase of the product for sale.

The selected input modality may be associated with an auto-identification signal. A mobile container equipped with a reader for reading the auto-identification signal and a transmitter for transmitting the auto-identification signal to the server may be additionally included. The server may be further operable to track a location of the mobile container, relative to other mobile containers, based on the auto-identification signal.

The selected input modality may be associated with voice input, and the first and second pages are associated with Voice Extensible Markup Language (VXML). The selected input modality may be associated with an auto-identification signal using Radio Frequency Identification (RFID). The selected input modality may include text-entry, and the first and second pages may be associated with Hyper Text Markup Language (HTML).

The electronic device may include a mobile device, a stationary device that is co-located with one of a plurality of products for sale, or an information kiosk.

In another aspect, a first page for display on an electronic device is outputted, where the first page includes a first field for receiving a first customer request. The first customer request in a selected input modality chosen from among a plurality of input modalities available for data entry into the first field is received. Sales information responsive to the customer request is determined. The sales information is associated with each of the plurality of input modalities. A second page for display on the electronic device is outputted, where the second page displays the sales information and includes a second field for receiving a second customer request in any one of the plurality of input modalities.

Implementations may include one or more of the following features. For example, receiving the first customer request may include receiving a request for product information associated with a product for sale, including price, location, or description information. Additionally, receiving the second customer request may include receiving a purchase request associated with financial transaction information, and completing a sale of the product, based on the financial transaction information.

An auto-identification signal from a mobile container may be received, where the auto-identification signal may identify a product for sale. The mobile container may be equipped with a reader for reading the auto-identification signal and a transmitter for transmitting the auto-identification signal. The electronic device may include a mobile device, a stationary device that is co-located with one of a plurality of products for sale, or an information kiosk.

Receiving the first customer request may include receiving a voice input, and wherein the first page is associated with Voice Extensible Markup Language (VXML). Receiving the first customer request may include receiving a text input, and wherein the first page is associated with Hyper Text Markup Language (HTML).

Associating the sales information with each of the plurality of input modalities may include expressing the sales information in each of a plurality of formats, wherein each of the plurality of formats is associated with one of the plurality of input modalities.

In another aspect, providing product data includes receiving at an electronic device an identifying input in a first modality, the identifying input identifying a product. Providing product data also includes requesting automatically, after receiving the identifying input, product information, and providing, from the electronic device, the product information to a user. Providing product data also includes receiving at the electronic device additional input in a second modality, the additional input requesting additional product information, requesting automatically, after receiving the additional input, the additional product information, and providing, from the electronic device, the additional product information to the user.

Implementations may include one or more of the following features. For example, receiving the identifying input in the first modality may include scanning a bar code associated with the product. Providing the product information to the user may include displaying the product information on a local display. Providing product data may further include providing the product data from a mobile device. Additionally, payment information for the user may be received and the product may be sold to the user.

The product information may include one or more of descriptive information, availability information, price information, warranty information, review information, promotional information, and competitor information.

Receiving input in at least one of the first and second modalities may include receiving a search string. Receiving input in at least one of the first and second modalities may further include accessing at least a first part of the search string, searching a first search space for a match for the first part of the search string, limiting a second search space based on a result of searching the first search space, accessing at least a second part of the search string, and searching the limited second search space for a match for the second part of the search string.

At least one of the first and second modalities may include a voice modality. Additionally, a voice input received in the voice modality may be accessed, the voice input including at least a first part and a second part, voice recognition may be performed on the first part of the voice input. Also, voice recognition may be performed on a combination of the first part and the second part using a search space, and the search space may be limited based on a result from performing voice recognition on the first part of the voice input, wherein limiting the search space allows enhanced voice recognition of the combination compared to performing voice recognition on the unlimited search space.

Receiving input in at least one of the first and second modalities may include providing a first set of options to the user, the first set of options relating to a first parameter of a search string, and being provided to the user in a page, and accepting a first input from the user, the first input being selected from the first set of options. Receiving input in at least one of the first and second modalities also may include limiting a second set of options based on the accepted first input, the second set of options relating to a second parameter of the search string, and providing the second set of options to the user in the page, such that the user is presented with a single page that provides the first set of options and the second set of options.

Receiving input in at least one of the first and second modalities may include activating a first grammar from among a plurality of independent grammars, the first grammar being identified with a first input category. Additionally, receiving input in at least one of the first and second modalities may include deactivating at least a second grammar from among the plurality of independent grammars, inputting spoken data related to the first input category, and matching the spoken data to stored data within the first grammar.

The details of one or more implementations are set forth in the accompanying drawings and the description below. Other features of particular implementations will be apparent from the description, the drawings, and the claims.

DETAILED DESCRIPTION

Introduction to a Particular Implementation

Figure 1:
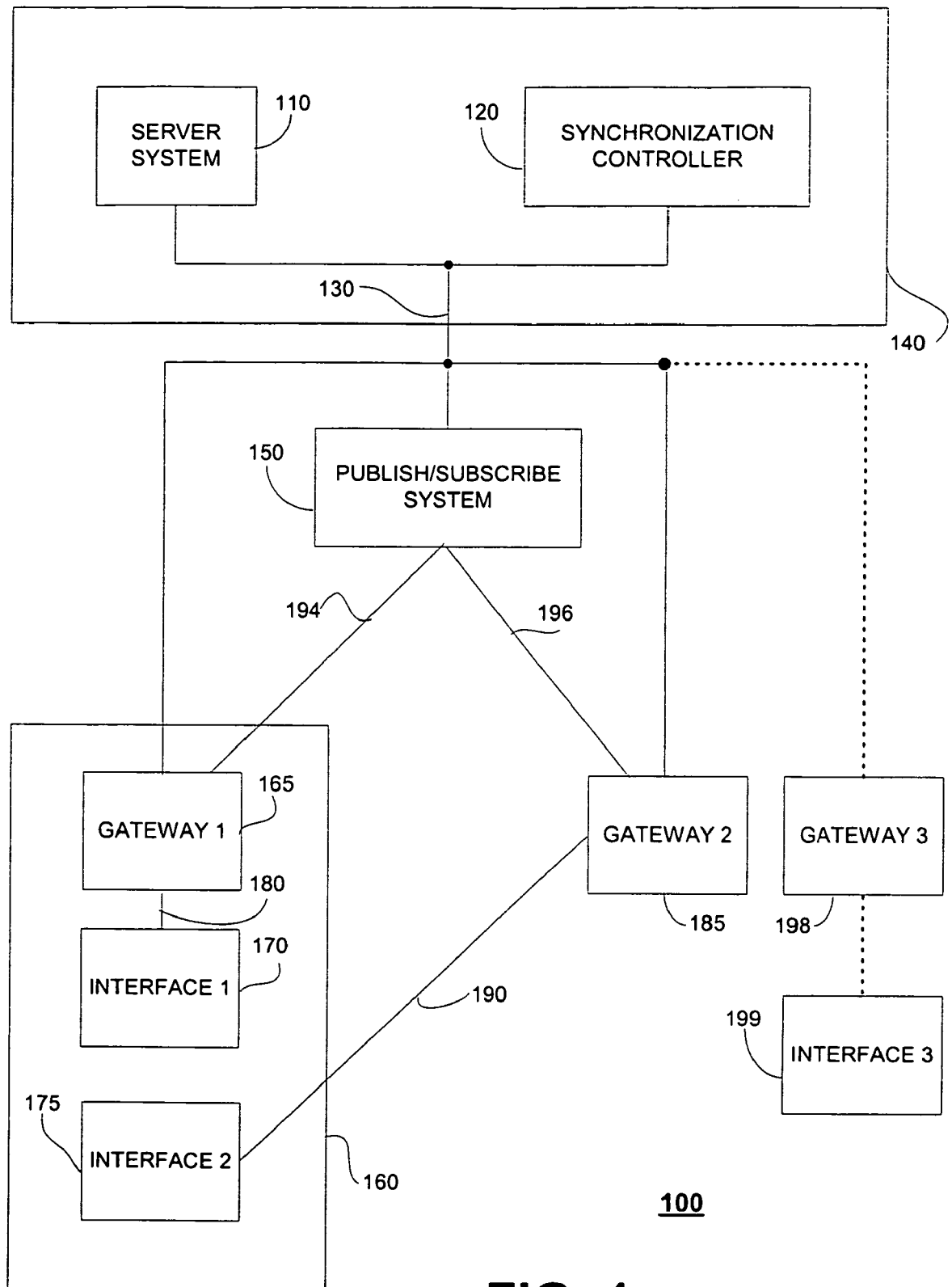
FIG. 1 is an example of a centralized system for synchronizing multiple communication modes.

The system 100 also includes a device 160 that includes a first gateway 165, a first interface 170, and a second interface 175. The first gateway 165 and the first interface 170 communicate over a connection 180. The system 100 also includes a second gateway 185 that communicates with the second interface 175 over a connection 190. Either or both of the first and second gateways 165 and 185 communicate with either the server system 110 and/or the synchronization controller 120 over the connection 130. The first and second gateways 165 and 185 also communicate with the publish/subscribe system 150 over connections 194 and 196, respectively.

An "interface" refers to a component that either accepts input from a user or provides output to a user. Examples include a display, a printer, a speaker, a microphone, a touch screen, a mouse, a roller ball, a joystick, a keyboard, a temperature sensor, a light sensor, a light, a heater, an air quality sensor such as a smoke detector, and a pressure sensor. A component may be, for example, hardware, software, or a combination of the two.

A "gateway" refers to a component that translates between user input/output and some other data format. For example, a browser is a gateway that translates the user's clicks and typing into hypertext transfer protocol ("HTTP") messages, and translates received HTML messages into a format that the user can understand.

The system 100 optionally includes a third gateway 198 and a third interface 199. The third gateway optionally communicates directly with the unit 140 over the connection 130. The third gateway 198 represents the multiplicity of different modes that may be used in different implementations, and the fact that the gateways and interfaces for these modes may be remote from each other and from the other gateways and interfaces. Examples of various modes of input or output include manual, visual (for example, display or print), aural (for example, voice or alarms), haptic, pressure, temperature, and smell. Manual modes may include, for example, keyboard, stylus, keypad, button, mouse, touch (for example, touch screen), and other hand inputs.

A modality gateway or a modality interface refers to a gateway (or interface) that is particularly adapted for a specific mode, or modes, of input and/or output. For example, a browser is a modality gateway in which the modality includes predominantly manual modes of input (keyboard, mouse, stylus), visual modes of output (display), and possibly aural modes of output (speaker). Thus, multiple modes may be represented in a given modality gateway. Because a system may include several different modality gateways and interfaces, such gateways and interfaces are referred to as, for example, a first-modality gateway, a first-modality interface, a second-modality gateway, and a second-modality interface.

More broadly, a first-modality entity refers to a component that is particularly adapted for a specific mode, or modes, of input and/or output. A first-modality entity may include, for example, a first-modality gateway or a first-modality interface.

A first-modality data item refers to a data item that is used by a first-modality entity. The data item need not be provided in one of the modes supported by the first-modality entity, but rather, is used by the first-modality entity to interface with the user in one of the supported modes. For example, if a voice gateway is a first-modality gateway, then a first-modality data item may be, for example, a VXML page. The VXML page is not itself voice data, but can be used to provide a voice interface to a user.

Figure 2:
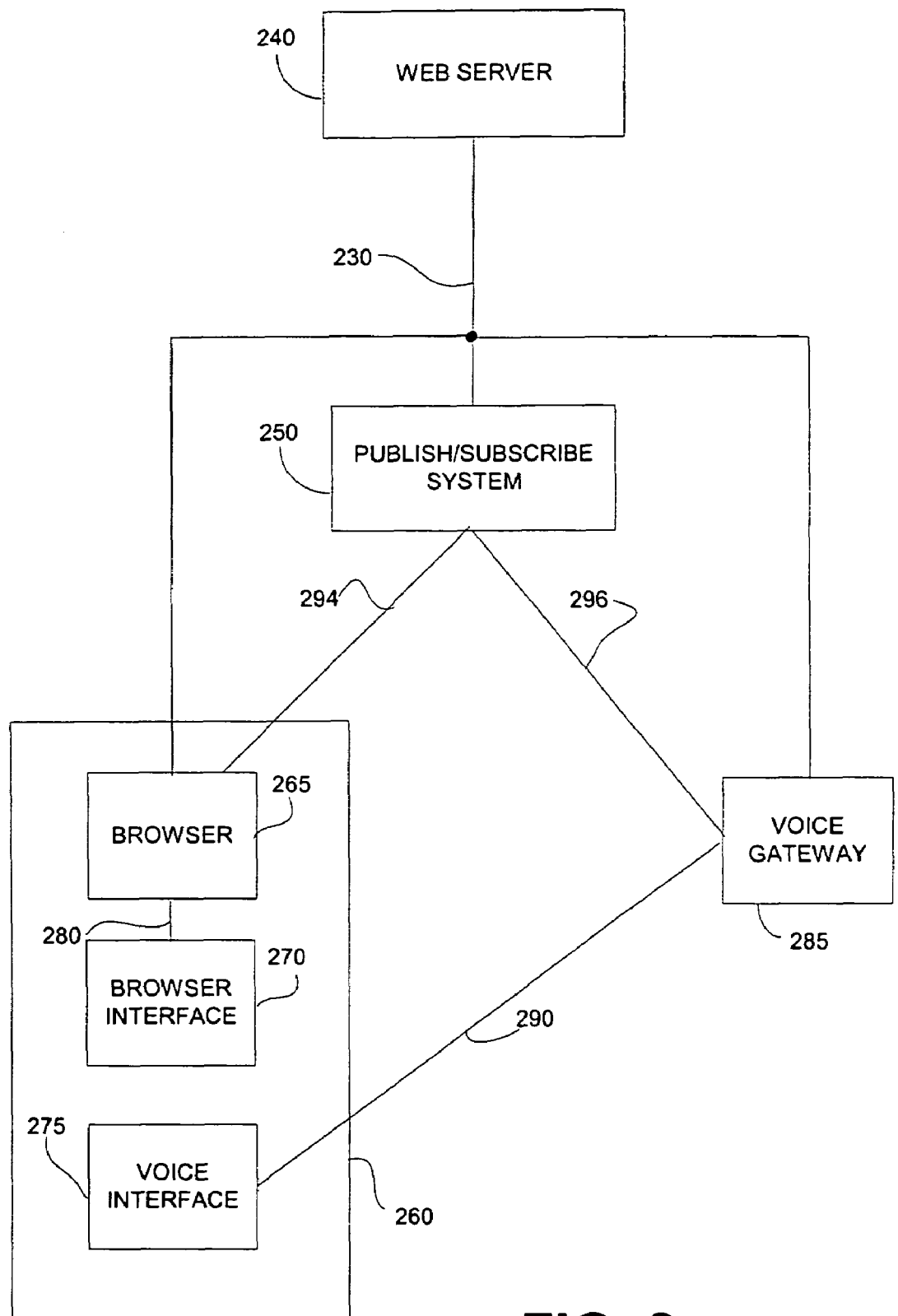
FIG. 2 is an example of an implementation of the system of FIG. 1.

Referring to FIG. 2, a system 200 is one example of an implementation of the system 100. The control unit 140 is implemented with a web server 240 that includes a built-in synchronization controller. The device 160 is implemented by a device 260 that may be, for example, a computer or a mobile device. The first gateway 165 and the first interface 170 are implemented by a browser 265 and a browser interface 270, respectively, of the device 260. The second gateway 185 and the second interface 175 are implemented by a voice gateway 285 and a voice interface 275, respectively. A publish/subscribe system 250 is analogous to the publish/subscribe system 150. Connections 230, 280, 290, 294, and 296 are analogous to the connections 130, 180, 190, 194, and 196.

The voice interface 275 may include, for example, a microphone and a speaker. The voice interface 275 may be used to send voice commands to, and receive voice prompts from, the voice gateway 285 over the connection 290. The commands and prompts may be transmitted over the connection 290 using, for example, voice telephony services over an Internet protocol ("IP") connection (referred to as voice over IP, or "VoIP"). The voice gateway 285 may perform the voice recognition function for incoming voice data. The voice gateway 285 also may receive from the web server 240 VXML pages that include dialogue entries for interacting with the user using voice. The voice gateway 285 may correlate recognized words received from the user with the dialogue entries to determine how to respond to the user's input. Possible responses may include prompting the user for additional input or executing a command based on the user's input.

The browser 265 operates in an analogous manner to the voice gateway 285. However, the browser 265 uses HTML pages rather than VXML pages. Also, the browser 265 and the user often communicate using manual and visual modes such as, for example, a keyboard, a mouse and a display, rather than using voice. Although the browser 265 may be capable of using an aural mode, that mode is generally restricted to output, such as, for example, providing music over a speaker. Although the system 200 shows an implementation tailored to the modes of manual and voice input, and display and voice output, alternative and additional modes may be supported.

The publish/subscribe system 250 may function, for example, as a router for subscribed entities. For example, if the gateways 265 and 285 are subscribed, then the publish/subscribe system 250 may route messages from the web server 240 to the gateways 265 and 285.

The operation of the system 200 is explained with reference to FIGS. 3-6, which depict examples of processes that may be performed using the system 200. Four such processes are described, all dealing with synchronizing two gateways after a user has navigated to a new page using one of the two gateways. The four processes are server push, browser pull, voice-interrupt listener, and no-input tag.

Figure 3:
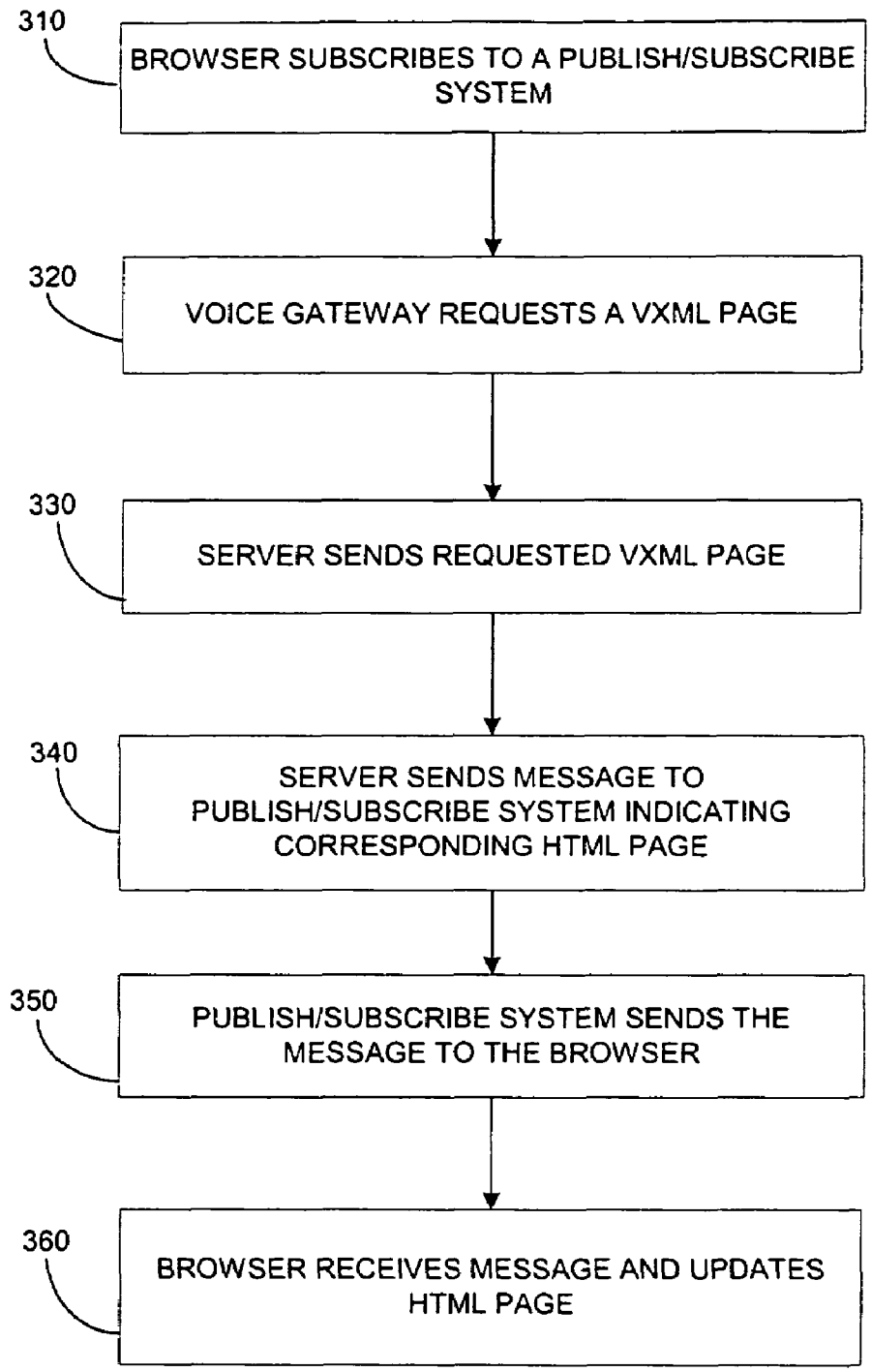
FIG. 3 is an example of a server-push process for synchronizing a browser after a voice gateway requests a VXML page.

Referring to FIG. 3, a process 300, referred to as server push, for use with the system 200 includes having the browser 265 subscribe to the publish/subscribe system 250 (310). Subscription may be facilitated by having the web server 240 insert a function call into a HTML page. When the browser 265 receives and loads the page, the function call is executed and posts a subscription to the publish/subscribe system 250. The subscription includes a call-back pointer or reference that is inserted into the subscription so that, upon receiving a published message, the publish/subscribe system 250 can provide the message to the browser 265. After subscribing, the browser 265 then listens to the publish/subscribe system 250 for any messages. In one implementation, the browser 265 uses multiple frames including a content frame, a receive frame, and a send frame. The send frame is used to subscribe; the receive frame is used to listen; and the content frame is the only frame that displays content. Subscription (310) may be delayed in the process 300, but occurs before the browser 265 receives a message (see 350).

The process 300 includes having the voice gateway 285 request a VXML page (320), and having the web server 240 send the VXML page to the voice gateway 285 (330). Note that the browser 265 and the voice gateway 285 are the gateways to be synchronized in the implementation of the process 300 being described. The operations 320 and 330 may be initiated, for example, in response to a user's provision of a voice command to the voice gateway 285 to tell the voice gateway 285 to navigate to a new web page. The web server 240 may delay sending the VXML page until later in the process 300. Such a delay might be useful to better time the arrival of the requested VXML page at the voice gateway 285 with the arrival of the corresponding HTML page at the browser 265.

A page may be, for example, a content page or a server page. A content page includes a web page, which is what a user commonly sees or hears when browsing the web. Web pages include, for example, HTML and VXML pages. A server page includes a programming page such as, for example, a Java Server Page ("JSP"). A server page also may include content.

The process 300 includes having the web server 240 send a message to the publish/subscribe system 250 to indicate the HTML page that corresponds to the VXML page sent to the voice gateway 285 (340). The web server 240 may recognize, or perhaps assume, that the voice gateway 285 and the browser 265 are out of synchronization, or that the two gateways 265 and 285 will become out of synchronization due to the VXML page being sent to the voice gateway 285. Accordingly, the web server 240 sends the message to the publish/subscribe system 250, intended for the browser 265, to bring the two gateways 265 and 285 into synchronization. The web server 240 may send the message by using, for example, a HTTP post message with an embedded JavaScript command that indicates the corresponding HTML page. The web server 240 need not designate the particular browser 265 for which the message is intended (by, for example, specifying an IP address and a port number). Rather, the web server 240 sends a message configured for a specific "topic" (usually a string parameter). All subscribers to that topic receive the message when the message is published by the web server 240 using the publish/subscribe system 250.

The web server 240 may determine the corresponding HTML page in a variety of ways. For example, if the VXML page request was the voice equivalent of a click on a link, then the VXML data may contain the uniform resource locator ("URL") for the corresponding HTML page. Alternatively, for example, the web server 240 may access a database containing URLs of corresponding VXML and HTML pages, or perform a URL translation if the corresponding pages are known to have analogous URLs.

"Synchronizing," as used in this disclosure, refers to bringing two entities into synchronization or maintaining synchronization between two entities. Two gateways are said to be synchronized, for the purposes of this disclosure, when, at a given point in time, a user can use either of the two gateways to interface with the same specific information, the interfacing including either input or output.

Two items "correspond," as used in this disclosure, if they both can be used by a different modality gateway to allow a user to interface with the same specific information. For example, an HTML page corresponds to a VXML page if the HTML page and the VXML page allow the user to interface with the same information. An item may correspond to itself if two gateways can use the item to allow a user to interface with information in the item using different modalities.

The process 300 includes having the publish/subscribe system 250 receive the message from the web server 240 and send the message to the browser 265 (350). The publish/ subscribe system 250 may use another HTTP post message to send the message to all subscribers of the specified topic. In such an implementation, the publish/subscribe system 250 may use a call-back pointer or reference that may have been inserted into the subscription from the browser 265.

The process 300 includes having the browser 265 receive the message (360). The browser 265 is assumed to be in a streaming HTTP mode, meaning that the HTTP connection is kept open between the browser 265 and the publish/subscribe system 250. Because the browser 265 is subscribed, a HTTP connection is also kept open between the publish/subscribe system 250 and the web server 240. The web server 240 repeatedly instructs the browser 265, through the publish/subscribe system 250, to "keep alive" and to continue to display the current HTML page. These "keep alive" communications are received by the receive frame of the browser 265 in an interrupt fashion. When the web server message arrives and indicates the corresponding HTML page, the browser 265 receives the message in the browser receive frame and executes the embedded JavaScript command. Executing the command updates the content frame of the browser 265 by redirecting the content frame to another HTML page.

Figure 4:
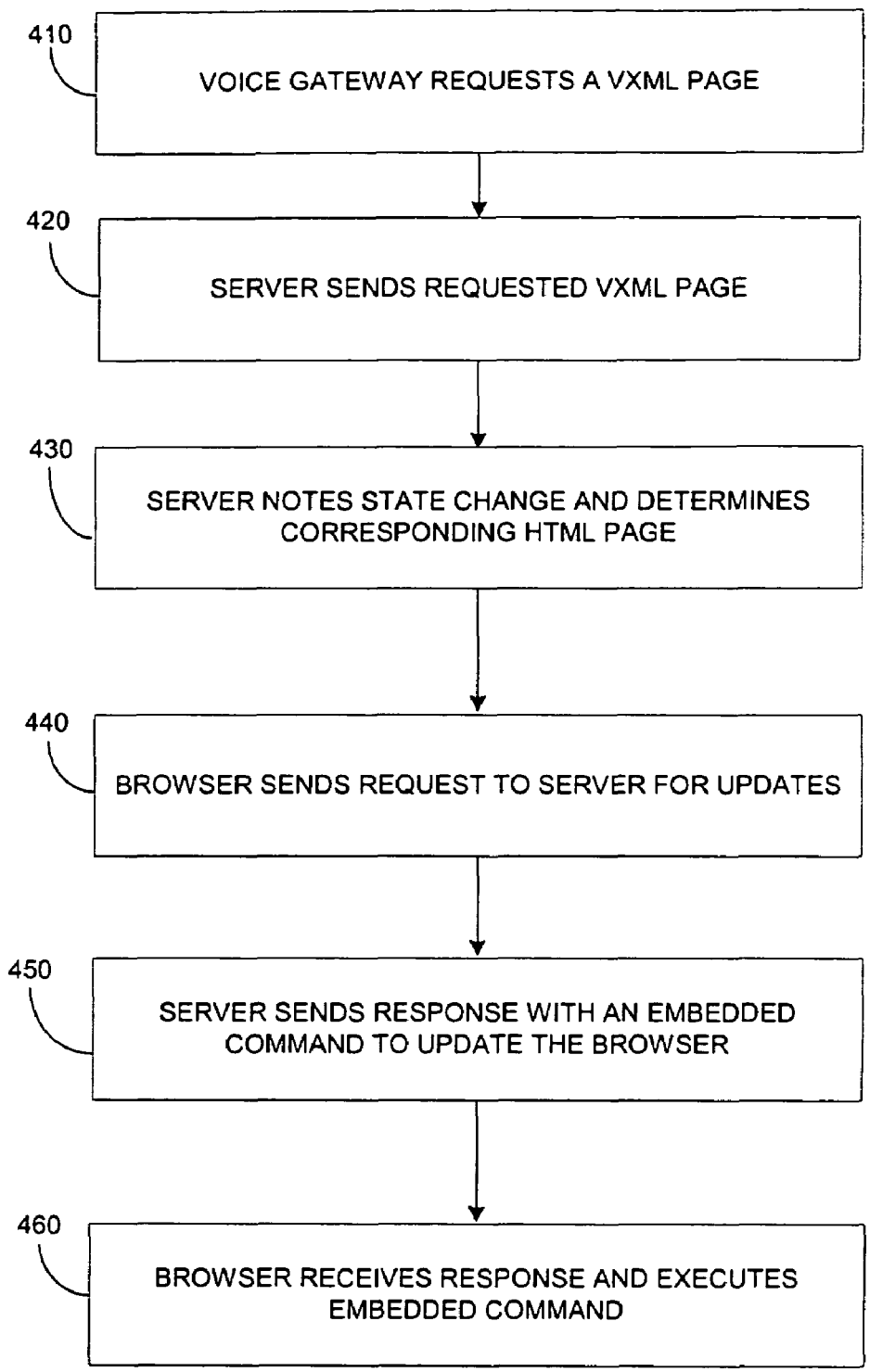
FIG. 4 is an example of a browser-pull process for synchronizing a browser after a voice gateway requests a VXML page.

Referring to FIG. 4, a process 400 for use with the system 200, which may be referred to as browser pull, includes having the voice gateway 285 request a VXML page (410), and having the web server 240 send the requested VXML page to the voice gateway 285 (420). The web server 240 may delay sending the VXML page until later in the process 400 in order, for example, to better time the arrival of the requested VXML page at the voice gateway 285 with the arrival of the corresponding HTML page at the browser 265.

The process 400 includes having the web server 240 note that the state of the voice gateway 285 has changed and determine the corresponding page that the browser 265 needs in order to remain synchronized (430). The web server 240 thus tracks the state of the gateways 265 and 285.

The process 400 includes having the browser 265 send a request to the web server 240 for any updates (440). The requests are refresh requests or requests for updates, and the browser 265 sends the requests on a recurring basis from a send frame using a HTTP get message.

The process 400 includes having the web server 240 send a response to update the browser 265 (450). Generally, the web server 240 responds to the refresh requests by sending a reply message to the browser receive frame to indicate "no change." However, when the voice gateway 285 has requested a new VXML page, the web server 240 embeds a JavaScript command in the refresh reply to the browser 265 that, upon execution by the browser 265, results in the browser 265 coming to a synchronized state. The JavaScript command, for example, instructs the browser 265 to load a new HTML page.

The process 400 includes having the browser 265 receive the response and execute the embedded command (460). Upon executing the embedded command, the browser 265 content frame is updated with the corresponding HTML page. The command provides the URL of the corresponding page. In another implementation, the web server 240 sends a standard response to indicate "no changes" and to instruct the browser 265 to reload the current HTML page from the web server 240. However, the web server 240 also embeds a command in the current HTML page on the web server 240, and the command indicates the corresponding HTML page. Thus, when the current HTML page is requested, received, and loaded, the browser 265 will execute the embedded command and update the HTML page.

Figure 5:
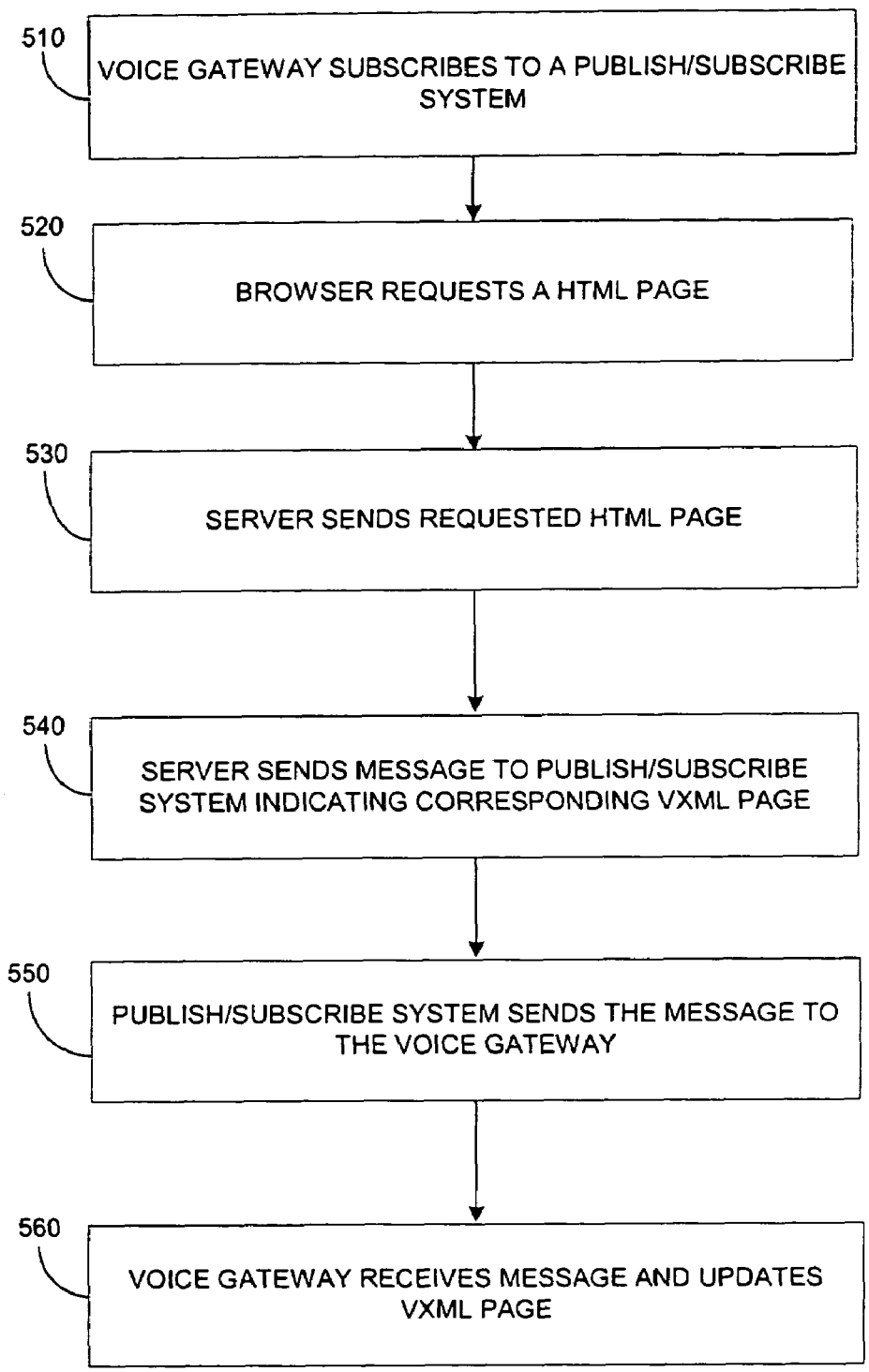
FIG. 5 is an example of a voice-interrupt listener process for synchronizing a voice gateway after a browser requests a HTML page.

Referring to FIG. 5, a process 500 for use with the system 200, which may be referred to as voice-interrupt listener, includes having the voice gateway 285 subscribe to the publish/subscribe system 250 (510). A function call may be embedded in a VXML page received from the web server 240, and the function call may be executed by the voice gateway 285 to subscribe to the publish/subscribe system 250. The voice gateway 285 can subscribe at various points in time, such as, for example, when the voice gateway 285 is launched or upon receipt of a VXML page. In contrast to a browser, the voice gateway does not use frames. Subscription (510) may be delayed in the process 500, but occurs before the voice gateway 285 receives a message (see 550).

The process 500 includes having the browser 265 request from the web server 240 a HTML page (520) and having the web server 240 send to the browser 265 the requested HTML page (530). This may be initiated, for example, by a user selecting a new URL from a "favorites" pull-down menu on the browser 265. The web server 240 may delay sending the requested HTML page (530) until later in the process 500 in order, for example, to better time the arrival of the requested HTML page at the browser 265 with the arrival of the corresponding VXML page at the voice gateway 285.

The process 500 includes having the web server 240 send a message to the publish/subscribe system 250 to indicate a corresponding VXML page (540). The web server 240 sends a HTTP post message to the publish/subscribe system 250, and this message includes a topic to which the voice gateway 285 is subscribed. The web server 240 also embeds parameters, as opposed to embedding a JavaScript command, into the message. The embedded parameters indicate the corresponding VXML page.

The process 500 includes having the publish/subscribe system 250 send the message to the voice gateway 285 (550). The publish/subscribe system 250 may simply reroute the message to the subscribed voice gateway 285 using another HTTP post message.

The process 500 also includes having the voice gateway 285 receive the message (560). The voice gateway 285 is assumed to be in a streaming HTTP mode, listening for messages and receiving recurring "keep alive" messages from the publish/subscribe system 250. When the voice gateway 285 receives the new message from the web server 240, the voice gateway 285 analyzes the embedded parameters and executes a command based on the parameters. The command may be, for example, a request for the corresponding VXML page from the web server 240.

Figure 6:
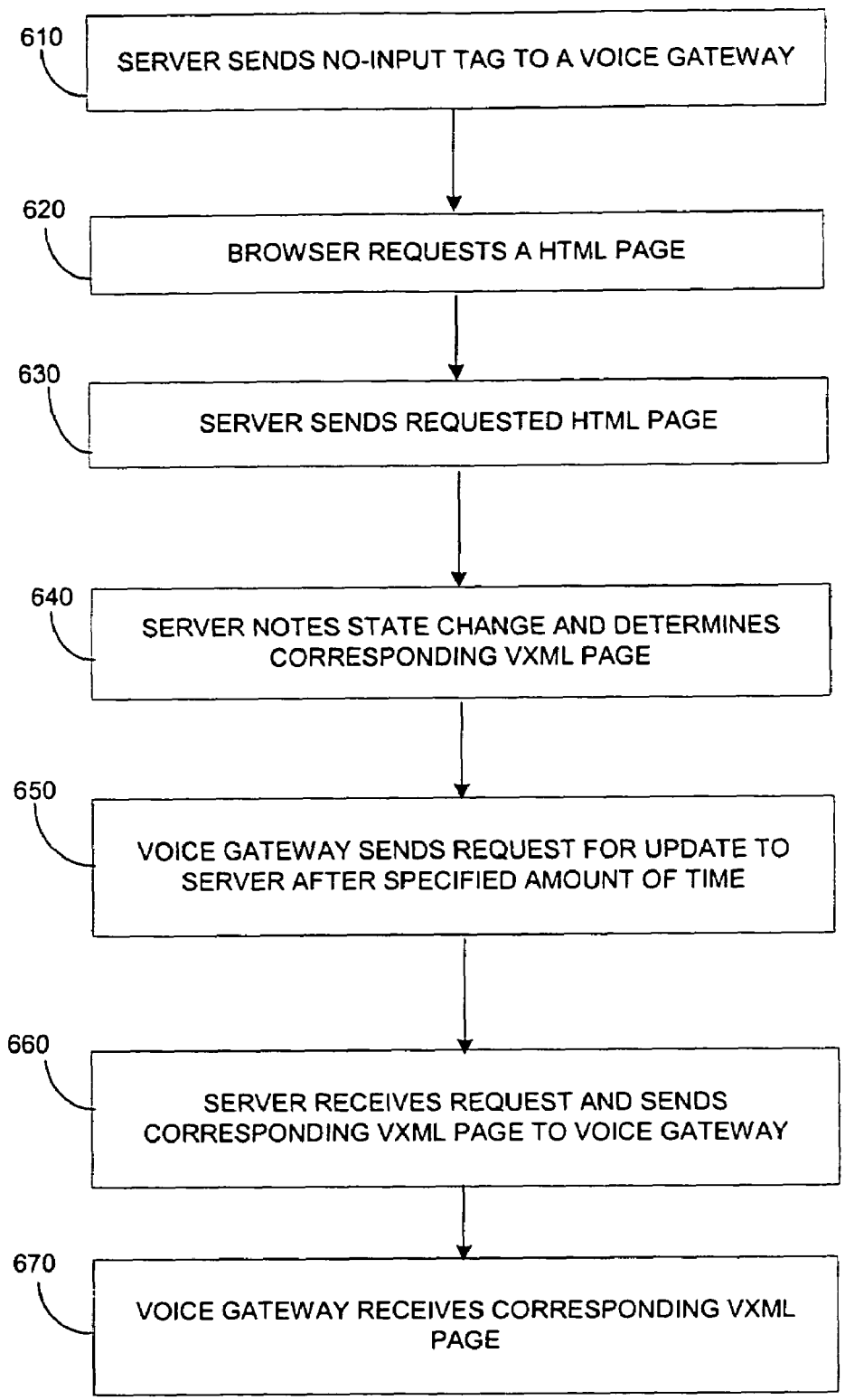
FIG. 6 is an example of a no-input tag process for synchronizing a voice gateway after a browser requests a HTML page.

Referring to FIG. 6, a process 600 for use with the system 200, which may be referred to as no-input tag, includes having the web server 240 send to the voice gateway 285 a VXML page with a no-input tag embedded (610). Every VXML page may have a no-input markup tag (<no input>) that specifies code on the voice gateway 285 to run if the voice gateway 285 does not receive any user input for a specified amount of time. The URL of a JSP (Java Server Page) is embedded in the code, and the code tells the voice gateway 285 to issue a HTTP get command to retrieve the JSP. The same no-input tag is embedded in every VXML page sent to the voice gateway 285 and, accordingly, the no-input tag specifies the same JSP each time.

The process 600 includes having the browser 265 request a HTML page (620), having the web server 240 send the requested HTML page to the browser 265 (630), and having the web server 240 note the state change and determine a corresponding VXML page (640). The web server 240 updates the contents of the JSP, or the contents of a page pointed to by the JSP, with information about the corresponding VXML page. Such information may include, for example, a URL of the corresponding VXML page. The web server 240 may delay sending the requested HTML page (630) until later in the process 600 in order, for example, to better time the arrival of the requested HTML page at the browser 265 with the arrival of the corresponding VXML page at the voice gateway 285.

The process 600 includes having the voice gateway 285 wait the specified amount of time and send a request for an update (650). After the specified amount of time, as determined by the code on the voice gateway 285, has elapsed, the voice gateway 285 issues a HTTP get command for the JSP. When no user input is received for the specified amount of time, the user may have entered input using a non-voice mode and, as a result, the voice gateway 285 may need to be synchronized.

The process 600 includes having the web server 240 receive the update request and send the corresponding VXML page to the voice gateway 285 (660). The JSP contains an identifier of the corresponding VXML page, with the identifier being, for example, a URL or another type of pointer. The web server 240 issues a HTTP post message to the voice gateway 285 with the VXML page corresponding to the current HTML page.

The process 600 includes having the voice gateway 285 receive the corresponding VXML page (670). When the voice gateway 285 receives and loads the corresponding VXML page, and the browser 265 receives and loads the HTML page (see 630), the two gateways 265 and 285 are synchronized. It is possible, however, that the two gateways 265 and 285 were never unsynchronized because the user did not enter a browser input, in which case the voice gateway 285 simply reloads the current VXML page after no voice input was received during the specified amount of waiting time.

The process 600 has an inherent delay because the process waits for the voice gateway 285 to ask for an update. It is possible, therefore, that the voice gateway 285 will be out of synchronization for a period of time on the order of the predetermined delay. A voice input received while the voice gateway 285 is out of synchronization can be handled in several ways. Initially, if the context of the input indicates that the gateways 265 and 285 are out of synchronization, then the voice input may be ignored by the voice gateway 285. For example, if a user clicks on a link and then speaks a command for a dialogue that would correspond to the new page, the voice gateway 285 will not have the correct dialogue. Assuming a conflict, however, the web server 240 may determine that the gateways 265 and 285 are not in synchronization and may award priority to either gateway. Priority may be awarded, for example, on a first-input basis or priority may be given to one gateway as a default.

Fused Implementations

Figure 7:
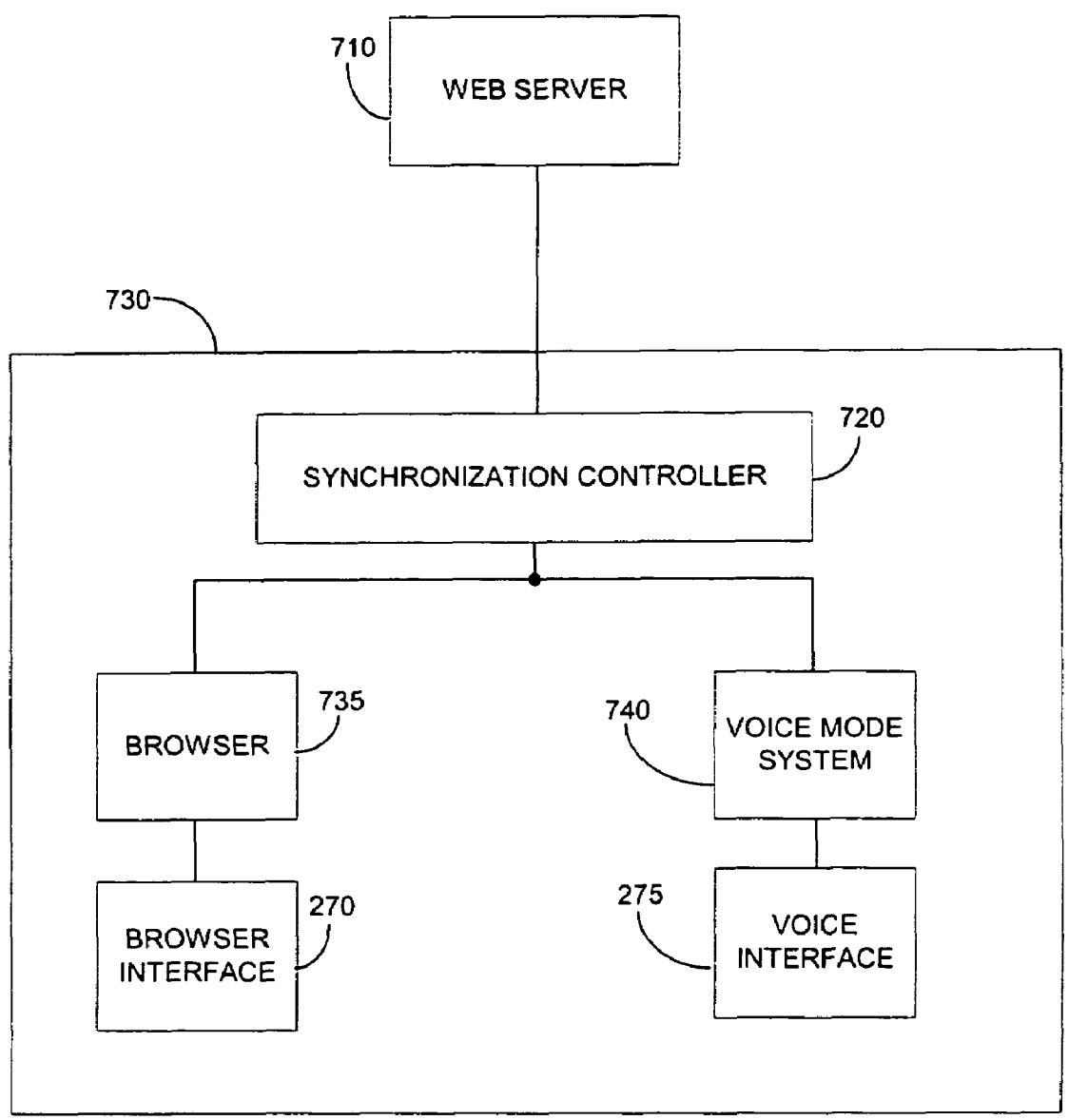
FIG. 7 is an example of a fused system for synchronizing multiple modes.

Referring to FIG. 7, a system 700 includes a web server 710 communicating with a synchronization controller 720 on a device 730. The device 730 also includes a browser 735 in communication with the browser interface 270, and a voice mode system 740 in communication with the voice interface 275.

The web server 710 may be, for example, a standard web server providing HTML and VXML pages over a HTTP connection. The device 730 may be, for example, a computer, a portable personal digital assistant ("PDA"), or other electronic device for communicating with the Internet. In one implementation, the device 730 is a portable device that allows a user to use either browser or voice input and output to communicate with the Internet. In such an implementation, the web server 710 does not need to be redesigned because all of the synchronization and communication is handled by the synchronization controller 720.

The voice mode system 740 stores VXML pages that are of interest to a user and allows a user to interface with these VXML pages using voice input and output. The VXML pages can be updated or changed as desired and in a variety of ways, such as, for example, by downloading the VXML pages from the WWW during off-peak hours. The voice mode system 740 is a voice gateway, but is referred to as a voice mode system to note that it is a modified voice gateway. The voice mode system 740 performs voice recognition of user voice input and renders output in a simulated voice using the voice interface 275.

Figure 8:
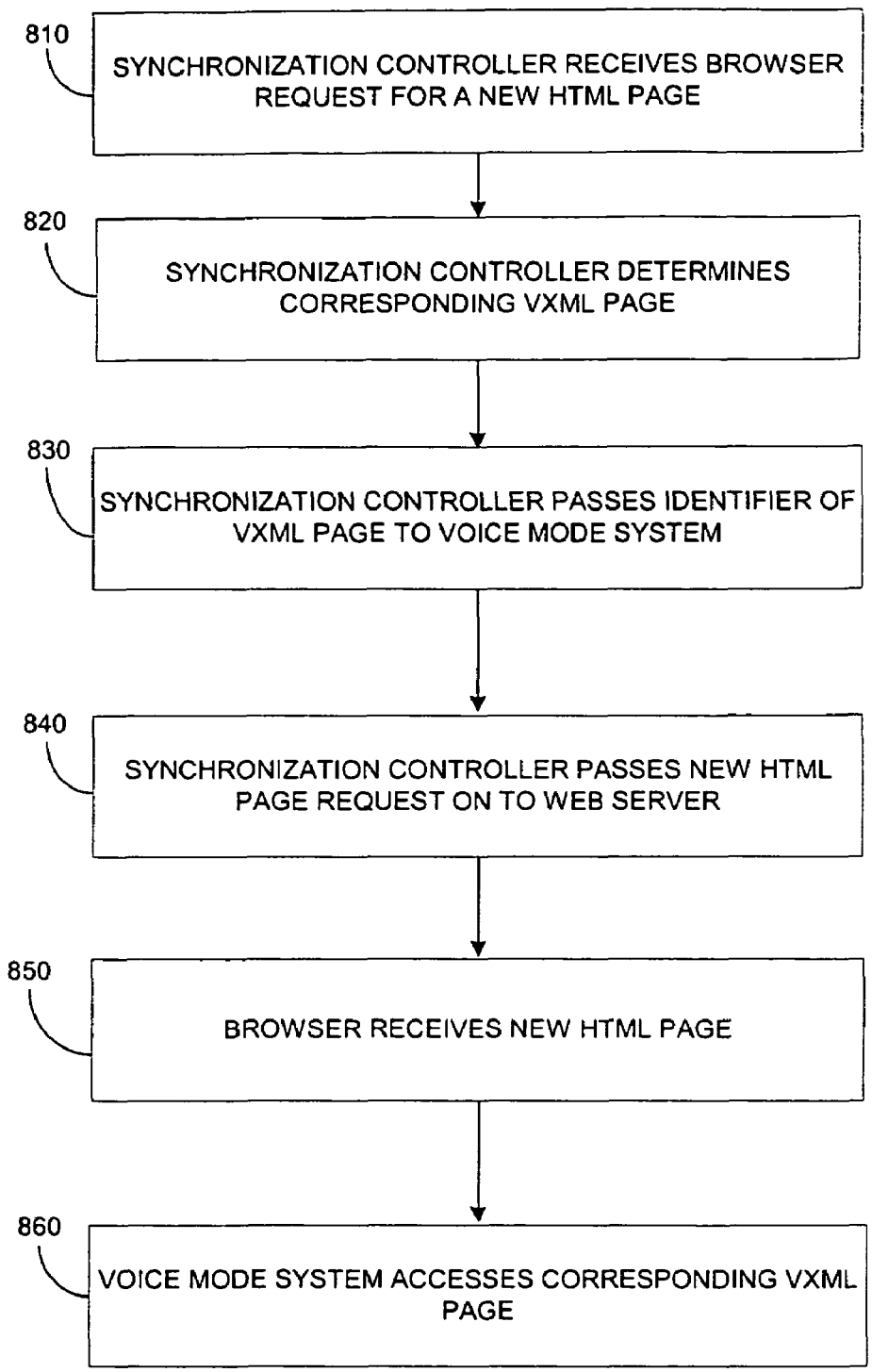
FIG. 8 is an example of a process for synchronizing a browser and a voice mode in the system of FIG. 7 after a browser input.
Figure 9:
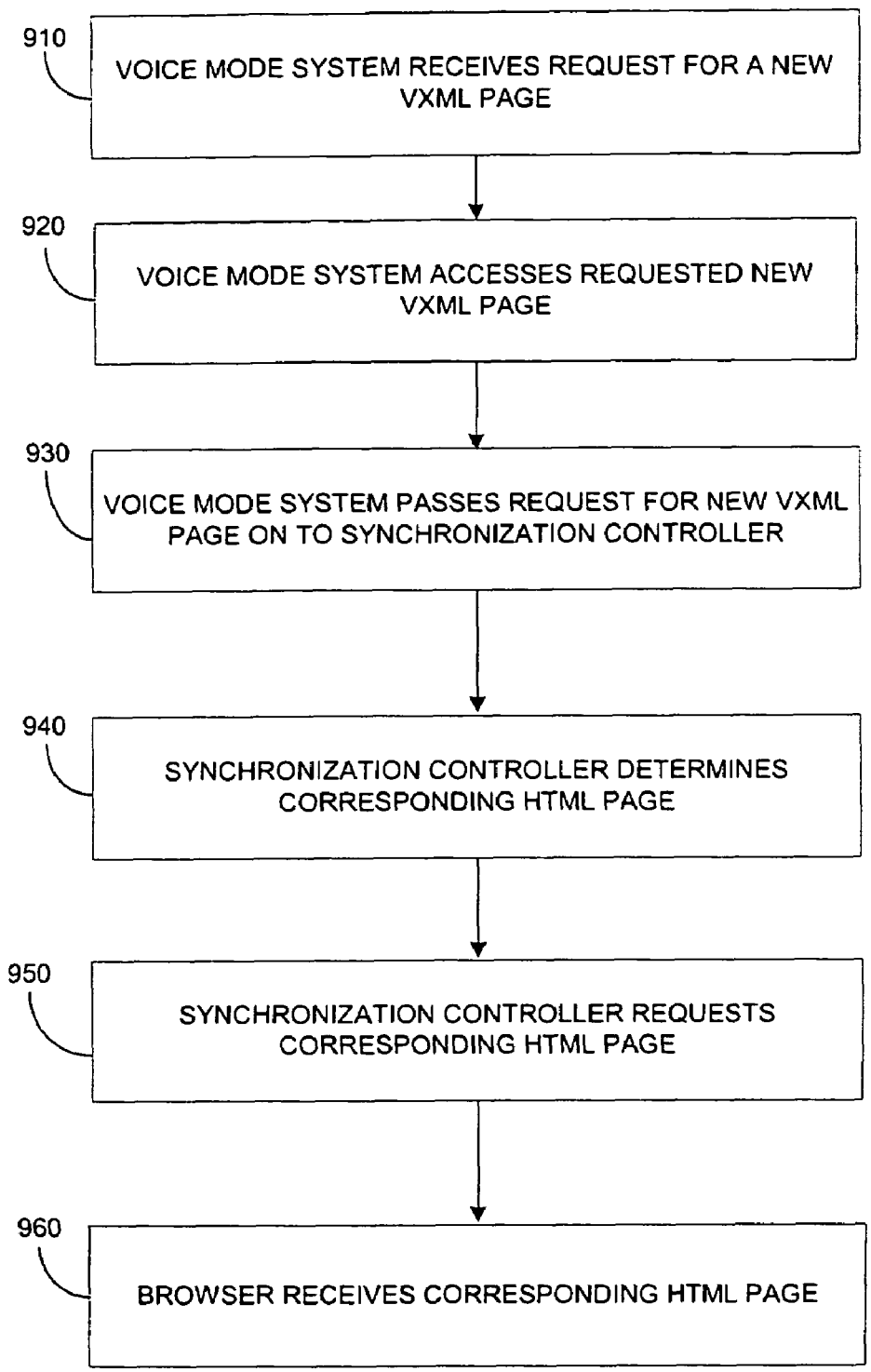
FIG. 9 is an example of a process for synchronizing a browser and a voice mode in the system of FIG. 7 after a voice input.

The synchronization controller 720 also performs synchronization between the browser and voice modes. Referring to FIGS. 8 and 9, two processes are described for synchronizing the browser 735 and the voice mode system 740, or alternatively, the browser interface 270 and the voice interface 275.

Referring to FIG. 8, a process 800 includes having the synchronization controller 720 receive a browser request for a new HTML page (810). The browser 735 may be designed to send requests to the synchronization controller 720, or the browser 735 may send the requests to the web server 710 and the synchronization controller 720 may intercept the browser requests.

The process 800 includes having the synchronization controller 720 determine a VXML page that corresponds to the requested HTML page (820). In particular implementations, when the user requests a new HTML page by clicking on a link with the browser 735, the HTML data also includes the URL for the corresponding VXML page. Further, the browser 735 sends both the URL for the requested HTML page and the URL for the corresponding VXML page to the synchronization controller 720. The synchronization controller 720 determines the corresponding VXML page simply by receiving from the browser 265 the URL for the corresponding VXML page. The synchronization controller 720 also may determine the corresponding page by, for example, performing a table look-up, accessing a database, applying a translation between HTML URLs and VXML URLs, or requesting information from the web server 710.

The process 800 includes having the synchronization controller 720 pass the identifier of the corresponding VXML page to the voice mode system 740 (830). The identifier may be, for example, a URL. In particular implementations, the voice mode system 740 may intercept browser requests for new HTML pages, or the browser 735 may send the requests to the voice mode system 740. In both cases, the voice mode system 740 may determine the corresponding VXML page instead of having the synchronization controller 720 determine the corresponding page (820) and send an identifier (830).

The process 800 includes having the synchronization controller 720 pass the browser's HTML page request on to the server 710 (840). The synchronization controller 720 may, for example, use a HTTP request. In implementations in which the synchronization controller 720 intercepts the browser's request, passing of the request (840) is performed implicitly. The synchronization controller 720 may delay sending the browser request to the server (840) until later in the process 800 in order, for example, to better time the arrival of the requested HTML page at the browser 735 with the access of the corresponding VXML page at the voice mode system 740 (see 860).

The process 800 includes having the browser receive the requested HTML page (850) and having the voice mode system 740 access the corresponding VXML page (860). Once these two pages are loaded and available for facilitating interaction with a user, the two modes will be synchronized.

Referring to FIG. 9, a process 900 includes having the voice mode system 740 receive a user request for a new VXML page (910) and access the requested VXML page (920). The voice mode system 740 accesses the VXML page from, for example, stored VXML pages. Accessing the requested VXML page (920) may be delayed to coincide with the browser's receipt of the corresponding HTML page in operation 960.

The process 900 includes having the voice mode system 740 pass the request for the VXML page on to the synchronization controller 720 (930), and having the synchronization controller 720 determine the corresponding HTML page (940). In particular implementations, the voice mode system 740 may determine the corresponding HTML page, or may pass the request for the VXML page directly to the browser 735 with the browser 735 determining the corresponding HTML page.

The process 900 includes having the synchronization controller 720 request the corresponding HTML page from the web server 710 (950) and having the browser receive the corresponding HTML page (960). The synchronization controller 720 may use, for example, a HTTP get command.

Proxy Implementations

Figure 10:
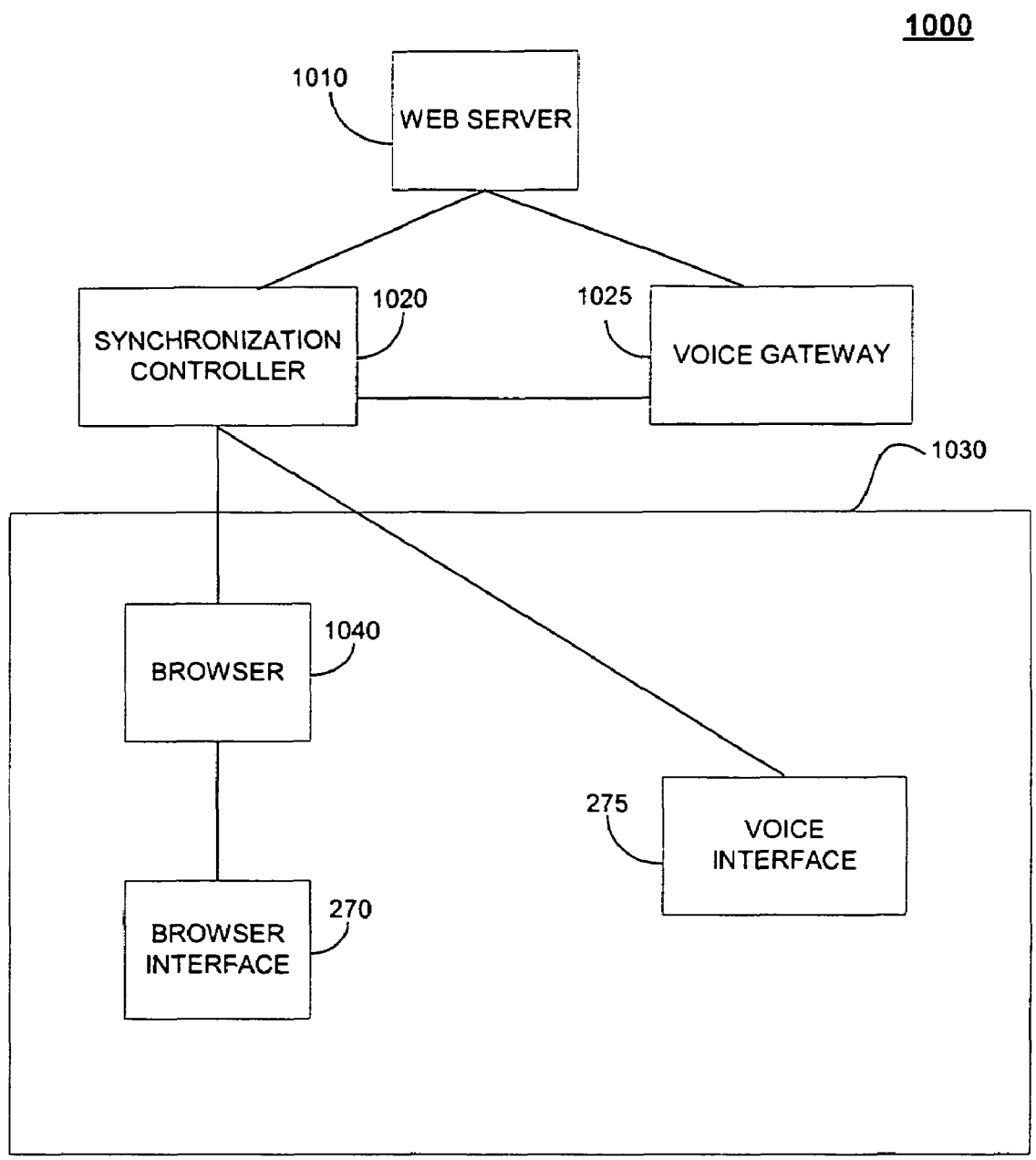
FIG. 10 is an example of a proxy system for synchronizing multiple communication modes.

Referring to FIG. 10, a system 1000 includes having a web server 1010 communicate with both a synchronization controller 1020 and a voice gateway 1025. The synchronization controller 1020 further communicates with both the voice gateway 1025 and several components on a device 1030. The device 1030 includes the browser interface 270, a browser 1040, and the voice interface 275. The browser 1040 communicates with the browser interface 270 and the synchronization controller 1020. The voice interface 275 communicates with the synchronization controller 1020.

The web server 1010 is capable of delivering HTML and VXML pages. The device 1030 may be, for example, a computer or a portable PDA that is equipped for two modes of interfacing to the WWW. The system 1000 allows the two modes to be synchronized, and the system 1000 does not require the web server 1010 to be enhanced or redesigned because the synchronization controller 1020 is independent and separate from the web server 1010.

Figure 11:
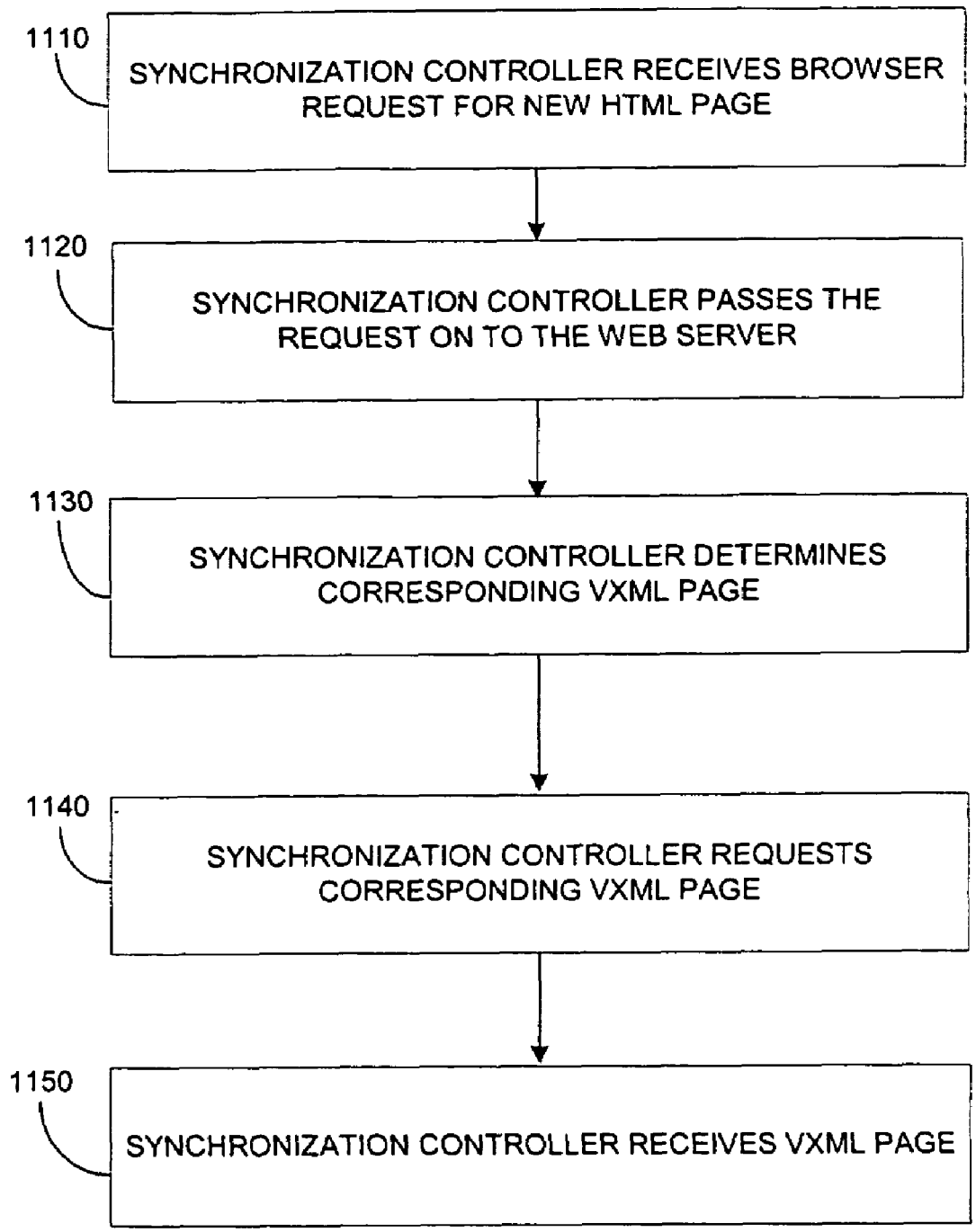
FIG. 11 is an example of a process for synchronizing a browser and a voice mode in the system of FIG. 10 after a browser input.
Figure 12:
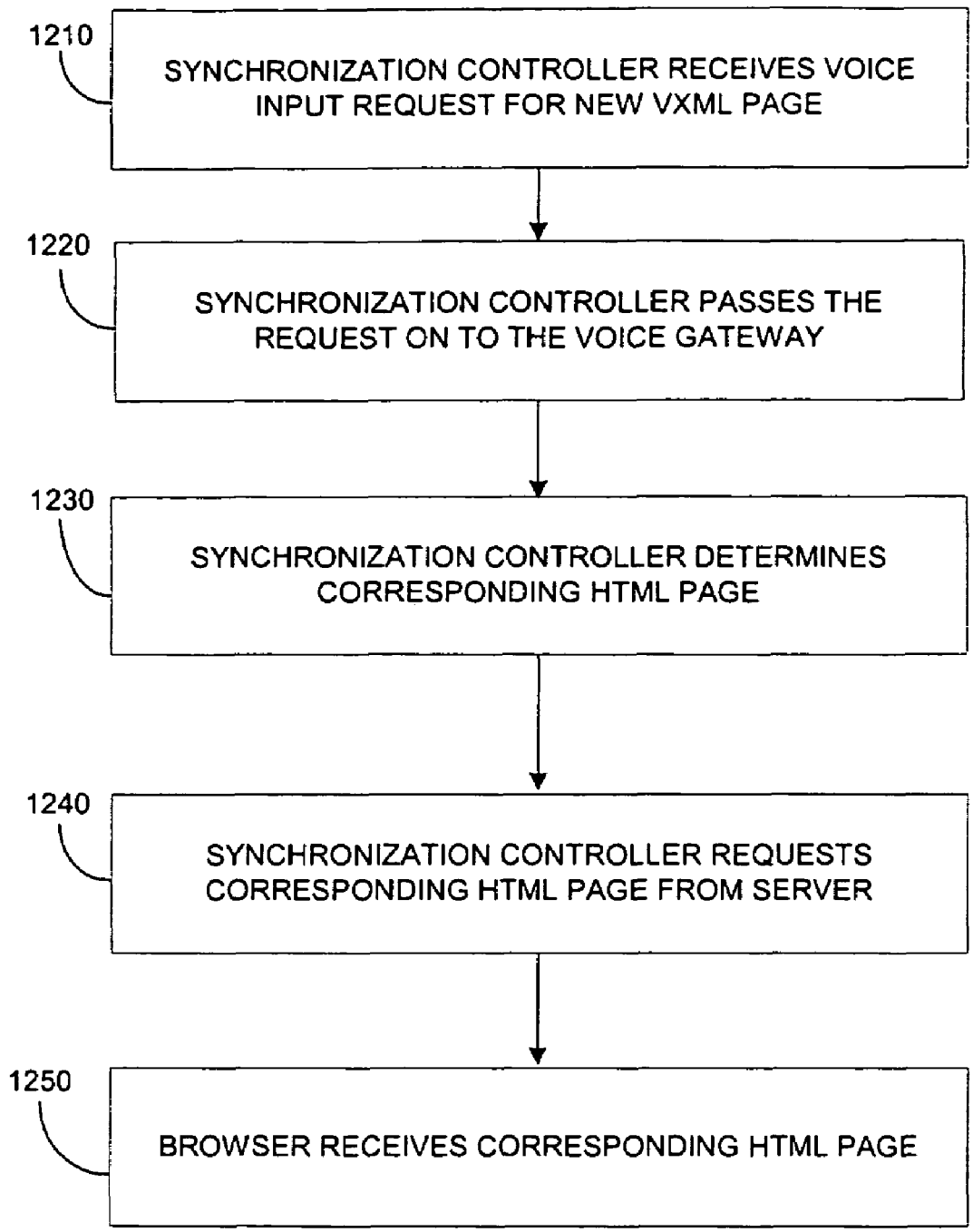
FIG. 12 is an example of a process for synchronizing a browser and a voice mode in the system of FIG. 10 after a voice input.

Referring to FIGS. 11 and 12, two processes are described for synchronizing the browser 1040 and the voice gateway 1025, or alternatively, the browser interface 270 and the voice interface 275. Both processes assume that the user input is a request for a new page, although other inputs may be used.

Referring to FIG. 11, a process 1100 includes having the synchronization controller 1020 receive a browser request for a new HTML page (1110). The process 1100 also includes having the synchronization controller 1020 pass the HTML request on to the web server 1010 (1120) and determine the corresponding VXML page (1130). These three operations 1110-1130 are substantially similar to the operations 810, 840, and 820, respectively, except for the location of the synchronization controller (compare 720 with 1120). The synchronization controller 1020 may delay sending the browser request to the web server 1010 (1120) until later in the process 1100 in order, for example, to better time the arrival of the requested HTML page at the browser 1040 with the arrival of the corresponding VXML page at the synchronization controller 1020 (see 1150).

The process 1100 includes having the synchronization controller 1020 request the corresponding VXML page through the voice gateway 1025 (1140). The synchronization controller 1020 may request the page in various ways. For example, the synchronization controller 1020 may send a simulated voice request to the voice gateway 1025, or may send a command to the voice gateway 1025.

The process 1100 includes having the synchronization controller 1020 receive the corresponding VXML page (1150). The voice gateway 1025 receives the requested VXML page and sends the VXML page to the synchronization controller 1020. In another implementation, the synchronization controller 1020 does not receive the VXML page, and the voice gateway 1025 does the voice recognition and interfacing with the user with the synchronization controller 1020 acting as a conduit.

Referring to FIG. 12, a process 1200 includes having the synchronization controller 1020 receive a voice input from the voice interface 275 requesting a new VXML page (1210). The process 1200 includes having the synchronization controller (i) parse the voice input and pass the request for a new VXML page along to the voice gateway 1025 (1220), and (ii) determine the corresponding HTML page (1230). In this implementation, the synchronization controller 1020 has access to and stores the current VXML page, which allows the synchronization controller 1020 to parse the voice input. As explained above, having the current VXML page also may allow the synchronization controller 1020 to determine the corresponding HTML page for "voice click" events. If the user's input is not the voice equivalent of clicking on a link, but is, for example, a spoken URL, then by having the capability to do the voice recognition, the synchronization controller may be able to parse the URL and request that the server provide the URL for the corresponding HTML page.

The process 1200 includes having the synchronization controller 1020 request the corresponding HTML page from the server (1240), and having the browser receive the requested HTML page (1250). In another implementation, the synchronization controller 1020 does not determine the corresponding page, but requests that the web server 1010 determine the corresponding page and send the corresponding page.

In yet another implementation, the synchronization controller 1020 does not parse the voice input, but merely passes the VoIP request along to the voice gateway 1025. If the voice input is a request for a VXML page, the voice gateway 1025 determines the corresponding HTML page and provides the synchronization controller 1020 with a URL for the HTML page.

Figure 13:
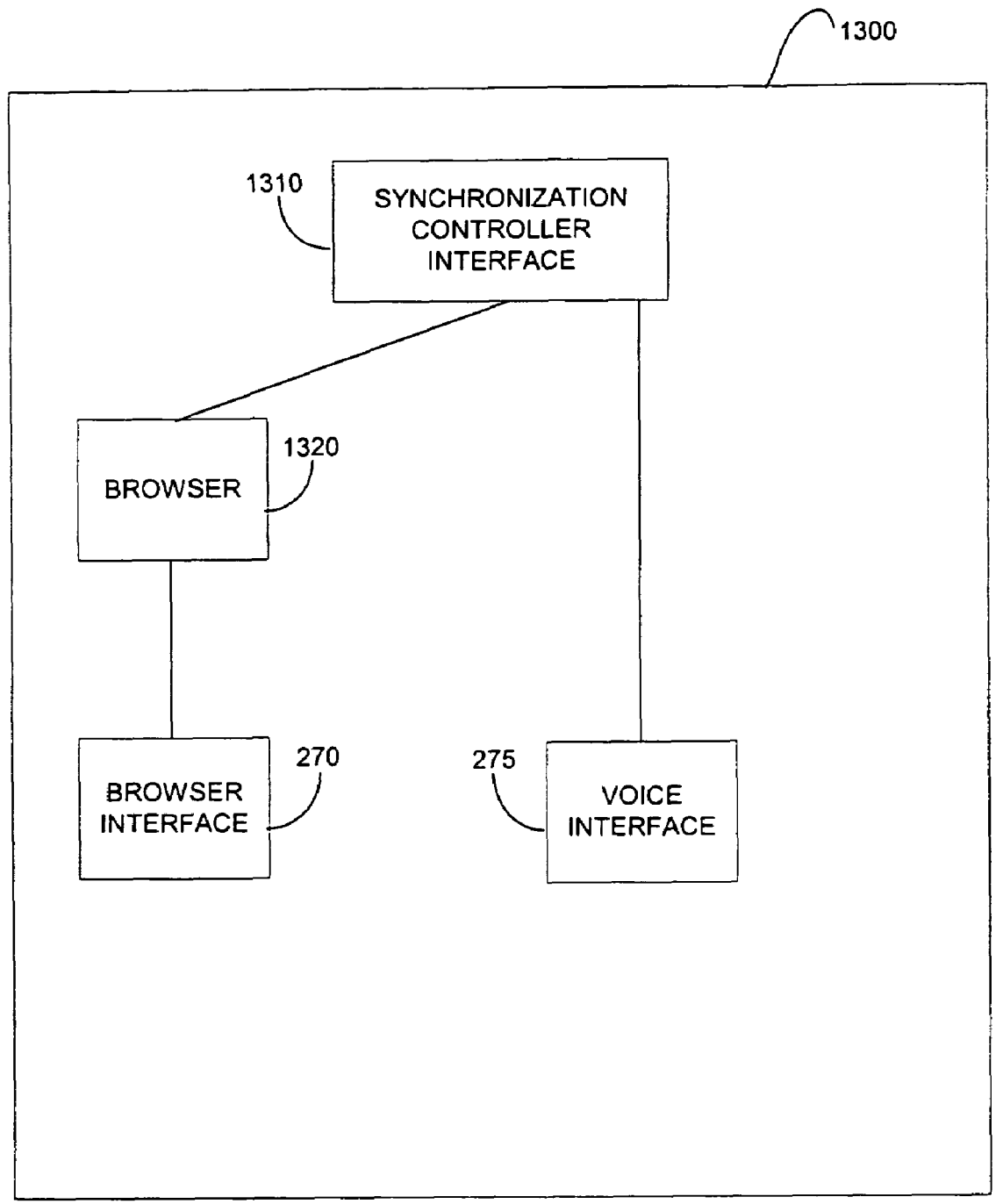
FIG. 13 is an example of a device for communicating with a synchronization controller in a proxy system for synchronizing multiple communication modes.

Referring to FIG. 13, a device 1300 includes a synchronization controller interface 1310, a browser 1320, the browser interface 270, and the voice interface 275. The browser 1320 communicates with the browser interface 270 and the synchronization controller interface 1310. The synchronization controller interface 1310 further communicates with the voice interface 275. The device 1300 is similar to the device 1030 except that the functionality allowing the browser 1040 and the voice interface 275 to communicate with the synchronization controller 1020 is separated as the synchronization controller interface 1310. In one implementation, the device 1300 is a mobile device. Such a mobile device is smaller and lighter than if a synchronization controller was also implemented on the mobile device. Further, because such a mobile device does not contain the functionality of a synchronization controller, but only includes an interface, the mobile device may be able to take advantage of improvements in a synchronization controller without having to be redesigned.

Additional Variations

Each of the above implementations may be used with more than two different modes. For example, inventory, shipping, or other data may be accessed in a warehouse using three different modes, and one or more machines accessing the warehouse data may need to be synchronized. The first mode may include keyboard input; the second mode may include voice input; and the third mode may include input from scanning a bar code on a pallet, for example, to request a particular record. Output for any of the modes may include, for example, display output, voice output, or printer output.

The processes described have been principally explained in terms of a particular system. However, each of the processes may be used with a variety of other implementations of a centralized, fused, proxy, or other type of system.

Referring again to FIG. 1, the server system 110 includes one or more devices for storing, at least temporarily, information that can be accessed by one or more gateways. For example, a web server has a storage device for storing web pages. The server system 110 may include multiple storage devices that are located locally or remotely with respect to each other. The server system 110 may include one or more storage devices that are located locally to another component, such as, for example, the device 160 or the second gateway 185. In various implementations, the server system 110 or the synchronization controller 120 are not contained in the unit 140.

The synchronization controller 120 maintains or establishes synchronization between two or more devices, such as, for example, gateways and/or interfaces. The components of the synchronization controller 120 may be remote or local with respect to each other and may be local to one or more of the other components in the system 100 such as, for example, the device 160, the second gateway 185, or the publish/subscribe system 150.

The publish/subscribe system 150 refers to a system that receives and sends messages. In particular implementations, the publish/subscribe system 150 can only receive messages from, or send messages to, subscribed entities—with the exception of receiving a subscribe request.

The device 160 may be an electronic device, an optical device, a magnetic device, or some other type of device capable of communicating with a user and with other systems. Examples include a computer, a PDA, a server, or a set-top box.

The connections 130, 180, 190, 194, and 196, and other connections throughout the disclosure, may be direct or indirect connections, possibly with one or more intervening devices. A connection may use one or more media such as, for example, a wired, a wireless, a cable, or a satellite connection. A connection may use a variety of technologies or standards such as, for example, analog or digital technologies, packet switching, code division multiple access ("CDMA"), time division multiple access ("TDMA"), and global system for mobiles ("GSM") with general packet radio service ("GPRS"). A connection may use a variety of established networks such as, for example, the Internet, the WWW, a wide-area network ("WAN"), a local-area network ("LAN"), a telephone network, a radio network, a television network, a cable network, and a satellite network.

The processes 300-600 are amenable to numerous variations, several examples of which follow, and may be applied to architectures different than that of the system 200. Separate devices, each including one gateway, can be synchronized by keeping track of the IP addresses and port numbers of the separate devices, or by having the devices subscribe to the same topic at a publish/subscribe system. For example, a user may be operating a first-modality interface on a first machine, and operating a second-modality interface on a second machine. As another example, two or more users may be remotely located and may want to be synchronized. The remotely located users may be operating the same modality interface, or different modality interfaces.

The voice commands discussed as initiating operation 320 or 410, and the browser commands discussed as initiating operation 520 or 620, may be navigation commands or non-navigation commands. Navigation commands include, for example, specifying a URL, and entering a home, back, or forward command. Non-navigation commands include, for example, a text entry, a preference change, or a focus command.

Any input received by a gateway, including command and data, may be provided to the server by the voice gateway or the browser. For example, the voice gateway may provide the server with text entries and other inputs, even when the voice gateway does not need a VXML page, so that the server can supply the input to the browser to keep the browser synchronized with respect to text entries, and not just with respect to new pages.

In various implementations, the server's message to a gateway in operation 360, 460, or 560 may include, for example, (i) the actual corresponding HTML/VXML page, (ii) the URL of the corresponding page with a command to retrieve the corresponding page, (iii) the URL of a JSP that identifies the corresponding page, (iv) a command relating to the corresponding page or to a JSP that identifies the corresponding page, and (v) an indication to reload the current page (into which the server has embedded a command that will retrieve the corresponding page).

A first item is said to relate to first data when the first item includes information relating to the first data. Such information may include, for example, the first data itself, an address of the first data or some other pointer to the first data, an encoding of the first data, and parameters identifying particular information from the first data. The first data may include any of the many examples described in this disclosure as well as, for example, an address of some other data, data entered by a user, and a command entered by a user.

In sending the corresponding input, or an indication of the corresponding input, to a gateway (340-50, 450, 540-550, or 660), a server may send, for example, a command or parameters. A command may include, for example, a JavaScript command that requests the corresponding page. Parameters may include, for example, a URL of the corresponding page. The parameters are parsed, a command is determined, and the command is executed. For example, in operation 660, instead of sending the corresponding VXML page, the server may send a message with parameters including a URL (for the corresponding VXML page) and an indication that the voice gateway should request the page identified by the URL.

In the processes 300-600, the web server 240 is described as performing a variety of actions. As described earlier, the web server 240 includes a synchronization controller and many of the actions performed by the web server 240 can be characterized as being performed by the synchronization controller.

Referring to FIGS. 8 and 9, operations 810 and 910 may be generalized to allow the synchronization controller 720 to receive other browser inputs, and the voice mode system 740 to receive other voice inputs. The inputs may include, for example, a command, a request for a new page, a data input, and a focus request. In one implementation of operation 910, the voice mode system 740 receives a user's city selection for a field in a VXML page that solicits the user's address. Receipt of the city selection causes the VXML to move to the dialogue entry for selecting a state. The voice mode system 740 may pass this selection to the browser 735 so that the user's screen display can be updated.

Further, the voice mode system 740 may be a voice gateway. In such an implementation, the voice gateway would not have any VXML pages stored locally and would request them from the web server 710. The synchronization controller 720 may intercept or control the voice gateway requests in a manner analogous to the manner in which the synchronization controller 720 may intercept or control the browser requests.

One or more of the functions of the synchronization controller 720 may be performed by either the browser 735 or the voice mode system 740. For example, the browser 735 may send HTML page requests to the voice mode system 740, and the voice mode system 740 may determine the corresponding VXML page.

As indicated by the breadth of implementations disclosed, the synchronization controller can be placed at various locations within a system. Further, the component functions of a synchronization controller can be separated and placed at different locations within a system. This flexibility allows the complexity of a system to be targeted to one or more particular devices. By keeping the synchronization controller functions off of a mobile device, for example, mobile devices may be more lightweight, less expensive, and more robust to technology enhancements in the synchronization controller. By using a proxy model, a mobile device is still free of the synchronization controller and enjoys the noted benefits. Further, by using a proxy model, the multitude of existing web servers may not need to be redesigned, and the synchronization controller may allow multiple types of mobile devices to communicate with the same server infrastructure. Using a publish/subscribe system, operating as in the implementations described or according to other principles, also may facilitate an architecture with minimal install time for client devices, such that client devices are changed only minimally.

A synchronization controller may consist of one or more components adapted to perform, for example, the functions described for a synchronization controller in one or more of the implementations in this disclosure. The components may be, for example, hardware, software, firmware, or some combination of these. Hardware components include, for example, controller chips and chip sets, communications chips, digital logic, and other digital or analog circuitry.

The implementations disclosed can be characterized as providing synchronizing mechanisms. Such synchronizing mechanisms may include, for example, (i) sending a message to a publish/subscribe system, (ii) sending a message to a browser, possibly with a URL for a new page or a JSP, (iii) updating state information by, for example, updating a JSP, (iv) sending a corresponding page directly to a gateway, (v) requesting a corresponding page from an intermediary or from a storage location having the page, (vi) determining a corresponding page, and (vii) requesting a determination of a corresponding page and, possibly, requesting receipt of that determination. Various of the listed mechanisms may be performed by a synchronization controller, a web server, a gateway, or another component adapted to provide such functionality.

Many of the disclosed implementations have focused on WWW and Internet applications. However, the features described can be applied to a variety of communication environments, networks, and systems. The use of the term "page" is not meant to be restrictive and refers to data in a form usable by a particular gateway, interface, or other component.

Throughout this disclosure various actions are described. These terms, which include, for example, receiving, accessing, providing, sending, requesting, determining, passing, and routing, and others like them, are intended to be broadly construed. Accordingly, such terms are not restricted to acting directly but may act through one or more intermediaries. For example, a page may be sent to a gateway, provided to a gateway, or received from a gateway, even though the page may first go through a controller or a publish/subscribe system. As another example, a corresponding page may be determined by requesting another component to provide the corresponding URL.

Additional details about particular implementations, focusing largely on various mechanisms for associating two or more modalities with each other, will now be provided. The implementations described above may use a variety of mechanisms to associate modalities, many of which are within the skill of one of ordinary skill without requiring undue experimentation. Such mechanisms may include various tabular approaches and naming conventions to associate modalities and/or devices. Further, for fused implementations as described above, a device may be programmed to associate the multiple modes supported on the device. Implementations described above also may query a user for information that identifies the modes and/or devices that the user desires to have associated.

Accordingly, the implementations described above have sufficient detail to allow one of ordinary skill to make and use the implementations without undue experimentation, and the disclosure of the mechanisms below is not necessary to enable or describe the implementations discussed above. However, the following discussion does provide additional disclosure supporting, for example, specific dependent claims to the disclosed mechanisms and implementations.

A user interface may allow a user to gain access to data, such as, for example, products in a catalog database, or to enter data into a system, such as, for example, entering customer information into a customer database. User interfaces are used for applications residing on relatively stationary computing devices, such as desktop computers, as well as for applications residing on mobile computing devices, such as laptops, palmtops, and portable electronic organizers. A voice-activated user interface can be created to provide data access and entry to a system, and voice input may be particularly appealing for mobile devices.

In various implementations, a grammar for speech recognition for a given voice-driven application, mobile or otherwise, can be written to enable accurate and efficient recognition. Particular implementations described below provide a user interface that allows a user to input data in one or more of a variety of different modes, including, for example, stylus and voice input. Output also may be in one or more of a variety of modes, such as, for example, display or voice. Particular implementations may be used with mobile devices, such as, for example, palmtops, and the combination of voice and stylus input with voice and display output may allow such mobile devices to be more useful to a user. Implementations also may be used with the multi-modal synchronization system described in the incorporated provisional application.

Implementations allow enhanced voice recognition accuracy and/or speed due in part to the use of a structured grammar that allows a grammar to be narrowed to a relevant part for a particular voice recognition operation. For example, narrowing of the grammar for a voice recognition operation on a full search string may be achieved by using the results of an earlier, or parallel, voice recognition operation on a component of the full search string. Other implementations may narrow the grammar by accepting parameters of a search string in a particular order from a user, and, optionally, using the initial parameter(s) to narrow the grammar for subsequent parameters. Examples include (i) reversing the standard order of receiving street address information so that, for example, the country is received before the state and the grammar used to recognize the state is narrowed to the states in the selected country, (ii) segmenting an electronic mail address or web site address so that a user supplies a domain identifier, such as, for example "com," separately, or (iii) automatically inserting the "at sign" and the "dot" into an electronic mail address and only prompting the user for the remaining terms, thus obviating the often complex process of recognizing these spoken characters.

Implementations also may increase recognition accuracy and speed by augmenting a grammar with possible search strings, or utterances, thus decreasing the likelihood that a voice recognition system will need to identify an entry by its spelling. In such situations, the voice recognition system also obviates the need to ask the user to spell out a term that is not recognized when spoken. For example, after a user enters "com" as a domain identifier in an electronic mail address, the voice recognition system may include, for example, the names of all "Fortune 100" companies and a variety of popular commercial sites in the grammar for the server identifier of the electronic mail address. Thus, if the user then enters "amazon" as the server identifier, and if "amazon" has been included in the grammar, the system will recognize the entry without having to ask the user to spell it out.

Implementations also allow enhanced database searching. This may be achieved, for example, by using a structured grammar and associating grammar entries with specific database entries. In this manner, when the structured grammar is used to recognize the search string, then particular database entries or relevant portions of the database may be identified at the same time.

According to one general aspect, automatically searching for one or more matches to a search string includes accessing a first part and a second part of a search string. A first search space is searched for a match for the first part of the search string, and a second search space is limited based on a result of searching the first search space. The limited second search space is searched for a match for the second part of the search string.

Searching the first search space may include searching a database. Searching the limited second search space may include searching at least part of the database. Limiting the second search space may include limiting the part of the database that is searched to database entries that include a match for the first part of the search string, thus allowing a quicker search compared to searching the full database. The second part of the search string may include a voice input or a manual input. Searching the first search space and searching the limited second search space may be performed at least partially in parallel. The search string may include an address.

Accessing the first part of the search string may include accessing a voice input. Searching the first search space for the match may include performing voice recognition on the first part of the search string. Accessing at least the second part of the search string may include accessing the voice input. Limiting the second search space may include limiting the second search space to grammar entries associated with the first part of the search string. Searching the limited second search space may include performing voice recognition on at least the second part of the search string using the limited second search space, thereby allowing enhanced voice recognition of the second part of the search string compared to performing voice recognition using the unlimited second search space.

The grammar entries associated with the first part of the search string may include grammar entries for full search strings, each full search string including the first part of the search string. The grammar entries associated with the first part of the search string may include grammar entries for components of a full search string, each component being part of a full search string that includes the first part. Performing voice recognition on the first part may produce a recognized string, and the recognized string may be associated with a set of recognizable search strings from the search space. Limiting the second search space may include limiting the second search space to the set of recognizable search strings or components thereof. Performing voice recognition on the second part of the voice input may include comparing the second part to a set of high-occurrence patterns in the limited second search space, followed by comparing the second part to a set of low-occurrence patterns in the limited second search space. Voice recognition may be performed on the entire voice input using a third search space. The third search space may be limited based on the result from performing voice recognition on the first part of the voice input and based on a result from performing voice recognition on at least the second part of the voice input.

The first part of the search string may be associated with a set of searchable entries, and each entry in the limited second search space may be associated with one or more entries in the set of searchable entries. A first set of options may be provided to a user, the first set of options relating to the first part of the search string, and being provided to the user in a page. Accessing at least the first part of the search string may include accepting a first input from the user, the first input being selected from the first set of options. Limiting the second search space may include limiting a second set of options based on the accepted first input, the second set of options relating to the second part of the search string. The second set of options may be provided to the user in the page, such that the user is presented with a single page that provides the first set of options and the second set of options. Accessing at least the second part of the search string may include accepting a second input from the user, the second input being selected from the second set of options.

Accepting the first input may include accepting a first voice input and performing voice recognition on the first input, wherein performing voice recognition on the first input in isolation allows enhanced voice recognition compared to performing voice recognition on the search string. The first set of options may include manufacturer designations and the second set of options may include product designations from a manufacturer designated by the first input. The search string may include an address.

Accepting the first input may include receiving the first input auditorily from the user. Voice recognition may be performed on the first input in isolation, wherein performing voice recognition on the first input in isolation allows enhanced voice recognition compared to performing voice recognition on the search string. Providing the second set of options may include searching a set of data items for the first input and including in the second set of options references only to those data items, from the set of data items, that include the first input. Accepting the second input may include receiving the second input auditorily from the user. Voice recognition may be performed on the second input in isolation, wherein performing voice recognition on the second input in isolation allows enhanced voice recognition compared to performing voice recognition on the search string.

A third set of options may be provided to the user, the third set of options relating to a third part of the search string and being provided to the user in the page. A third input may be accepted from the user, the third input being selected from the third set of options, wherein the second set of options that is provided to the user is also based on the accepted third input. The second set of options may be modified based on the third input. The first set of options may include manufacturer designations. The third set of options may include price range designations. The second set of options may include product designations from a manufacturer designated by the first input in a price range designated by the third input.

In various implementations, a grammar for speech recognition for a given voice-driven application, mobile or otherwise, can be written to enable accurate and efficient recognition. Particular implementations described below provide a user interface that allows a user to input data in one or more of a variety of different modes, including, for example, stylus and voice input. Output also may be in one or more of a variety of modes, such as, for example, display or voice. Particular implementations may be used with mobile devices, such as, for example, palmtops, and the combination of voice and stylus input with voice and display output may allow such mobile devices to be more useful to a user. Implementations also may be used with the multi-modal synchronization system described in the incorporated provisional application.

Implementations allow enhanced voice recognition accuracy and/or speed due in part to the use of a structured grammar that allows a grammar to be narrowed to a relevant part for a particular voice recognition operation. For example, narrowing of the grammar for a voice recognition operation on a full search string may be achieved by using the results of an earlier, or parallel, voice recognition operation on a component of the full search string. Other implementations may narrow the grammar by accepting parameters of a search string in a particular order from a user, and, optionally, using the initial parameter(s) to narrow the grammar for subsequent parameters. Examples include (i) reversing the standard order of receiving street address information so that, for example, the country is received before the state and the grammar used to recognize the state is narrowed to the states in the selected country, (ii) segmenting an electronic mail address or web site address so that a user supplies a domain identifier, such as, for example "com," separately, or (iii) automatically inserting the "at sign" and the "dot" into an electronic mail address and only prompting the user for the remaining terms, thus obviating the often complex process of recognizing these spoken characters.

Implementations also may increase recognition accuracy and speed by augmenting a grammar with possible search strings, or utterances, thus decreasing the likelihood that a voice recognition system will need to identify an entry by its spelling. In such situations, the voice recognition system also obviates the need to ask the user to spell out a term that is not recognized when spoken. For example, after a user enters "com" as a domain identifier in an electronic mail address, the voice recognition system may include, for example, the names of all "Fortune 100" companies and a variety of popular commercial sites in the grammar for the server identifier of the electronic mail address. Thus, if the user then enters "amazon" as the server identifier, and if "amazon" has been included in the grammar, the system will recognize the entry without having to ask the user to spell it out.

Implementations also allow enhanced database searching. This may be achieved, for example, by using a structured grammar and associating grammar entries with specific database entries. In this manner, when the structured grammar is used to recognize the search string, then particular database entries or relevant portions of the database may be identified at the same time.

According to one general aspect, performing voice recognition includes accessing a voice input including at least a first part and a second part, performing voice recognition on the first part of the voice input, performing voice recognition on a combination of the first part and the second part using a search space, and limiting the search space based on a result from performing voice recognition on the first part of the voice input. Limiting the search space allows enhanced voice recognition of the combination compared to performing voice recognition on the unlimited search space.

Performing voice recognition on the first part may produce a recognized string, and the recognized string may be associated with a set of recognizable utterances from the search space. Limiting the search space may include limiting the search space to a set of recognizable utterances. Voice recognition on the first part may be performed in parallel with voice recognition on the combination, such that the search space is not limited until after voice recognition on the combination has begun. Voice recognition on the first part may be performed before voice recognition on the combination, such that the search space is limited before voice recognition on the combination has begun. Performing voice recognition on the first part of the voice input may include comparing the first part to a set of high-occurrence patterns in the search space, followed by comparing the first part to a set of low-occurrence patterns in the search space.

Performing voice recognition on the first part of the voice input may include using a second search space. Voice recognition may be performed on the second part of the voice input. The second search space may be limited based on a result from performing voice recognition on the second part of the voice input. Limiting the search space also may be based on the result from performing voice recognition on the second part of the voice input.

Accessing circuitry may be used to access a voice input including at least a first part and a second part. Recognition circuitry may be used to perform voice recognition on the first part of the voice input and on the combination of the first part and the second part, wherein voice recognition may be performed on the combination using a search space. A recognition engine may be used and may include the recognition circuitry. Limiting circuitry may be used to limit the search space based on a result from performing voice recognition on the first part of the voice input. Limiting the search space may allow enhanced voice recognition of the voice input compared to performing voice recognition on the unlimited search space.

One or more of the accessing circuitry, the recognition circuitry, and the limiting circuitry may include a memory with instructions for performing one or more of the operations of accessing the voice input, performing voice recognition, and limiting the search space based on the result from performing voice recognition on the first part of the voice input. One or more of the accessing circuitry, the recognition circuitry, and the limiting circuitry may include a processor to perform one or more of the operations of accessing the voice input, performing voice recognition, and limiting the search space based on the result from performing voice recognition on the first part of the voice input. The circuitry may be used to perform one of the other features described for this or another aspect.

According to another general aspect, accepting input from a user includes providing a first set of options to a user, the first set of options relating to a first parameter of a search string, and being provided to the user in a page. A first input is accepted from the user, the first input being selected from the first set of options. A second set of options is limited based on the accepted first input, the second set of options relating to a second parameter of the search string. The second set of options is provided to the user in the page, such that the user is presented with a single page that provides the first set of options and the second set of options.

Accepting the first input from the user may include receiving an auditory input and performing voice recognition. Performing voice recognition on the first input in isolation may allow enhanced voice recognition compared to performing voice recognition on the search string. Accepting the first input from the user may include receiving a digital input.

A second input may be accepted from the user, the second input being selected from the second set of options. Accepting the first input may include receiving the first input auditorily from the user. Voice recognition may be performed on the first input in isolation. Performing voice recognition on the first input in isolation may allow enhanced voice recognition compared to performing voice recognition on the search string. Providing the second set of options may include searching a set of data items for the first input and including in the second set of options references only to those data items that include the first input. Accepting the second input may include receiving the second input auditorily from the user. Voice recognition may be performed on the second input in isolation. Performing voice recognition on the second input in isolation may allow enhanced voice recognition compared to performing voice recognition on the search string.

A third set of options may be provided to the user, and the third set of options may relate to a third parameter of the search string and be provided to the user in the page. A third input may be accepted from the user, and the third input may be selected from the third set of options. The second set of options provided to the user also may be based on the accepted third input. The second set of options provided to the user may be modified based on the accepted third input.

Providing the second set of options may include searching a set of data for the first input and providing only data items from the set of data that include the first input. The first input may include a manufacturer designation that identifies a manufacturer. Providing the second set of options may be limited to providing only data items manufactured by the identified manufacturer.

Circuitry may be used (i) to provide a first set of options to a user, the first set of options relating to a first parameter of a search string, and being provided to the user in a page, (ii) to accept a first input from the user, the first input being selected from the first set of options, (iii) to limit a second set of options based on the accepted first input, the second set of options relating to a second parameter of the search string, and/or (iv) to provide the second set of options to the user in the page, such that the user is presented with a single page that provides the first set of options and the second set of options. The circuitry may include a memory having instructions stored thereon that when executed by a machine result in at least one of the enumerated operations being performed. The circuitry may include a processor operable to perform at least one of the enumerated operations. The circuitry may be used to perform one of the other features described for this or another aspect.

According to another general aspect, receiving items of an address from a user includes providing the user a first set of options for a first item of an address, receiving from the user the first address item taken from the first set of options, limiting a second set of options for a second item of the address based on the received first item, providing the user the limited second set of options for the second address item, and receiving the second address item.

Receiving the first address item may include receiving the first address item auditorily. Recognition may be performed on the received first address item. Performing voice recognition on the first address item in isolation may allow enhanced voice recognition compared to performing voice recognition on the address. Receiving the second address item may include receiving the second address item auditorily. Recognition may be performed on the received second address item. Performing voice recognition on the second address item in isolation may allow enhanced voice recognition compared to performing voice recognition on a combination of the first address item and the second address item or on the address.

The first address item may include a state identifier. The second address item may include a city identifier identifying a city. The user may be provided a third list of options for a zip code identifier. The third list of options may exclude a zip code not in the identified city. The zip code identifier may be received auditorily from the user. The user may select the zip code identifier from the third list of options. The zip code identifier may identify a zip code. Voice recognition may be performed on the auditorily received zip code identifier. Excluding a zip code in the third list of options may allow enhanced voice recognition compared to not excluding a zip code. The user may be provided a fourth list of options for a street address identifier. The fourth list of options may exclude a street not in the identified zip code. The street address identifier may be received auditorily from the user. The user may select the street address identifier from the fourth list of options. The street address identifier may identify a street address. Voice recognition may be performed on the auditorily received street address identifier. Exclusion of a street in the fourth list of options may allow enhanced voice recognition compared to not excluding a street.

Providing the user the first list of options may include providing the first list on a display. Providing the user the second list of options may include providing the second list auditorily.

Circuitry may be used (i) to provide the user a first set of options for a first item of an address, (ii) to receive from the user the first address item taken from the first set of options, (iii) to limit a second set of options for a second item of the address based on the received first item, (iv) to provide the user the limited second set of options for the second address item, and/or (v) to receive the second address item. The circuitry may include a memory having instructions stored thereon that when executed by a machine result in at least one of the enumerated operations being performed. The circuitry may include a processor operable to perform at least one of the enumerated operations. The circuitry may be used to perform one of the other features described for this or another aspect.

According to another general aspect, receiving an Internet address from a user includes prompting a user for a first portion of an Internet address. The first portion of the Internet address is received auditorily from the user. Voice recognition is performed on the received first portion. Performing voice recognition on only the first portion of the Internet address allows enhanced recognition compared to performing voice recognition on more than the first portion of the Internet address. The user is prompted for a second portion of the Internet address. The second portion of the Internet address is received auditorily from the user. Voice recognition is performed on the received second portion. Performing voice recognition on only the second portion of the Internet address allows enhanced recognition compared to performing voice recognition on more than the second portion of the Internet address.

The Internet address may include an electronic mail address. The first portion may include a domain identifier of an electronic mail address. The second portion may include a server identifier of an electronic mail address. The user may be prompted for a user identifier portion of an electronic mail address. A user identifier portion may be received auditorily from the user. Voice recognition may be performed on a received user identifier portion. Performing voice recognition on only a user identifier portion may allow enhanced recognition compared to performing voice recognition on more than the user identifier portion of an electronic mail address.

Performing voice recognition on a domain identifier may include using a domain vocabulary including common three-letter domain identifiers, which may allow enhanced recognition. Performing voice recognition on a server identifier may include using a server vocabulary including common server identifiers, which may allow enhanced recognition. Performing voice recognition on a user identifier may include using a user vocabulary including common user identifiers, which may allow enhanced recognition. The server vocabulary may be based on a domain identifier.

The Internet address may include a web site address. The first portion may include a domain identifier of the web site address. The second portion may include a server identifier of the web site address. The user may be prompted for a network identifier portion of the web site address. The network identifier portion may be received auditorily from the user. Voice recognition may be performed on the received network identifier portion. Performing voice recognition on only the network identifier portion may allow enhanced recognition compared to performing voice recognition on more than the network identifier portion of the web site address.

Circuitry may be used (i) to prompt a user for a first portion of an Internet address, (ii) to receive auditorily from the user the first portion of the Internet address, (iii) to perform voice recognition on the received first portion, wherein performing voice recognition on only the first portion of the Internet address allows enhanced recognition compared to performing voice recognition on more than the first portion of the Internet address, (iv) to prompt the user for a second portion of the Internet address, (v) to receive auditorily from the user the second portion of the Internet address; and/or (vi) to perform voice recognition on the received second portion, wherein performing voice recognition on only the second portion of the Internet address allows enhanced recognition compared to performing voice recognition on more than the second portion of the Internet address. The circuitry may include a memory having instructions stored thereon that when executed by a machine result in at least one of the enumerated operations being performed. The circuitry may include a processor operable to perform at least one of the enumerated operations. The circuitry may be used to perform one of the other features described for this or another aspect.

Various implementations include a user interface that provides a user with access to data. These user interfaces may be designed to accept various modes of input and to deliver various modes of output. Examples of input and output modes include manual, visual (for example, display or print), auditory (for example, voice or alarms), haptic, pressure, temperature, and smell. Manual modes may include, for example, keyboard, stylus, keypad, button, mouse, touch (for example, touch screen), and other hand inputs. Certain implementations are particularly suited for mobile applications, for which stylus or voice input is preferred, and for which output is presented visually on the screen and/or auditorily with text-to-speech or recorded human speech.

Various implementations also make use of structured grammars for voice recognition. The structured grammars may allow for quicker recognition, for quicker searching for an item in a corresponding database, and/or for enhanced voice recognition due to the decreased likelihood of misrecognizing a voice input.

Figure 14:
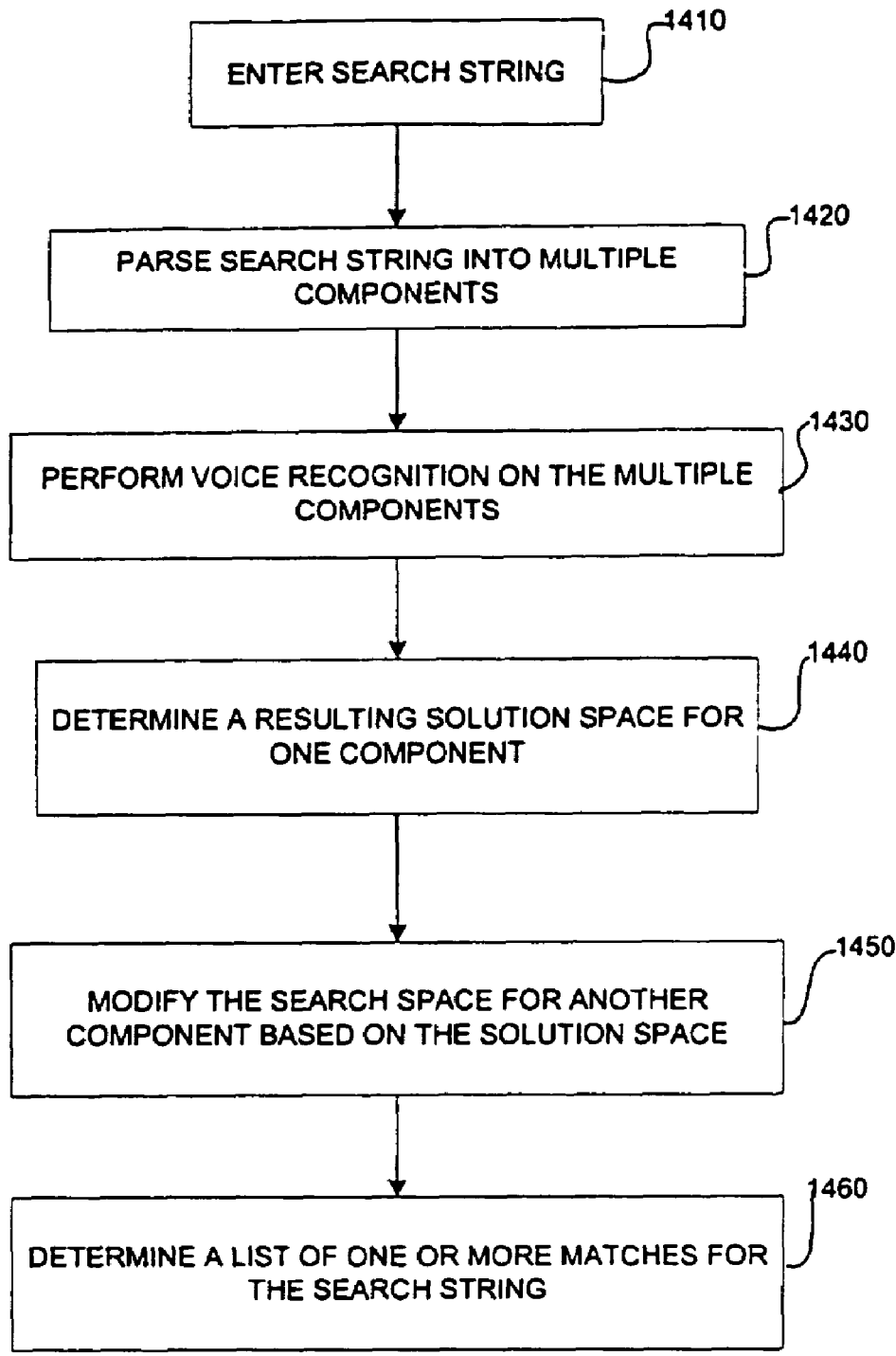
FIG. 14 is a flow chart of a process for recognizing a search string using a multi-cluster approach.

Referring to FIG. 14, a process 1400 for recognizing a search string using a multi-cluster approach includes entering a search string using a voice input (1410). The search string may represent, for example, an item in a database that a user wants to find. For example, the user may enter "Sony laptop superslim 505Z" into a voice recognition engine of a computer database to pull up information on that (hypothetical) computer model. As explained, the grammar is structured around the database entries, including the actual database entries, or keywords, etc., and possibly also including additional category descriptions and other vocabulary entries.

The process 1400 includes parsing the entered search string into at least one component in addition to the full search string (1420). The full search string is also referred to as a component. A component may be a word or other recognized symbol, or group of words or symbols. The search string may be parsed into all of its components, or a single component may be parsed out. Parsing may be performed by recognizing silence between words, symbols, or other components, and the voice entry system may require such silence. Parsing also may be performed on voice inputs entered in a more natural delivery, without obvious pauses between components.

The process 1400 includes performing voice recognition on at least two components (1430). The parsing (1420) may be performed simultaneously while performing the voice recognition (1430). For example, as the search string is processed from left to right, for example, a component may be recognized (1430) and, upon recognition, may be parsed (1420). One of the two components may be the full search string.

The process 1400 includes determining a resulting solution space in the grammar for at least one of the voice recognition operations (1440). The solution space represents possible matches for the full search string. For example, the first component may be the first word of the search string, for example, "Sony," and may correspond to a cluster in the speech recognition grammar. This cluster defined by "Sony" may contain, perhaps, only one hundred entries out of tens of thousands of entries in the grammar (and the corresponding database). Those one hundred entries would form the solution space for the component "Sony."

The process 1400 includes modifying the search space for the voice recognition operation (1430) of at least one of the components using the solution space determined in operation 1440 (1450). Continuing with the example from above, if the full search string is "Sony laptop superslim 505Z," then the search space being used to perform the voice recognition on the full string can be narrowed to include only the one hundred grammar entries that include the component "Sony."

By narrowing the search space, one or more advantages may be realized in particular implementations. For example, by narrowing the search space, the complexity of the searched-grammar, and the size of the searched vocabulary may be reduced, which may enhance recognition accuracy. Further, the speed of the recognition process may be increased.

In one implementation, both recognition processes (1430) are performed at least partially in parallel and recognizing the smaller component, such as "Sony," is faster than recognizing the entire search string. As a result, the recognition process for the full search string is started on the entire search space of grammar entries and is narrowed after the resulting solution space for the smaller component is determined in operation 1440. Other implementations perform the voice recognition processes serially. For example, one implementation performs voice recognition on a smaller component, and afterwards performs voice recognition for a larger component using the smaller component's solution space as the search space for the larger component.

The process 1400 includes determining a list of one or more matches for the full search string (1460). Voice recognition algorithms often return confidence scores associated with the results. These confidence scores can be used, for example, to rank order the results and a selected number of the highest scoring results can be returned to the user.

The list of matches might not necessarily be good matches. Various implementations may use a threshold confidence score to determine if a good match has been found. If a good match has not been found, then a variety of options are available. For example, (i) the user may be prompted for more information, (ii) the search string may be modified automatically, if it has not already been, by, for example, using synonyms of recognized components, transposing components, etc., or (iii) the user may be presented with information on the size of the solution space for each component, and the confidence scores, which may reveal a component that the system had a difficult time recognizing.

Figure 15:
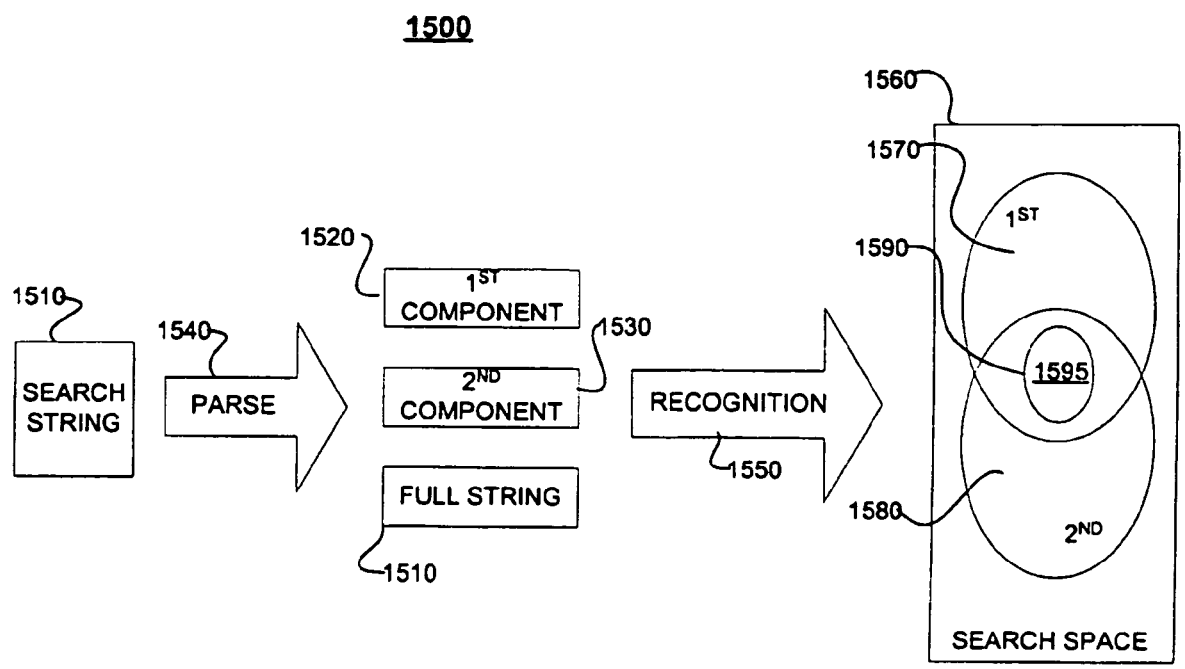
FIG. 15 is a diagrammatic flow chart depicting the process of FIG. 14.

Referring to FIG. 15, a diagrammatic flow chart 1500 depicting the process 1400 includes a search string 1510. The search string 1510 includes a first component 1520 and a second component 1530. The search string 1510 may be, for example, a voice segment. The search string 1510 is parsed using a parse process 1540 into the first and second components 1520, 1530. A voice recognition process 1550 is performed on each component 1510, 1520, 1530, in parallel, using a search space 1560. The parse process 1540 and the voice recognition process 1550 may be implemented using, for example, a processor or other computing device or combination of devices.

Voice recognition of the first component 1520 results in a first solution space 1570. Assuming that voice recognition of the first component 1520 finishes before voice recognition of the second component 1530 and of the full string 1510, then each of the latter voice recognition operations can be restricted to the first solution space 1570.

Voice recognition of the second component 1530 results in a second solution space 1580. Assuming that voice recognition of the second component 1530 finishes before voice recognition of the full string 1510, then voice recognition of the full string 1510 can be restricted to an overlap 1590 of the first solution space 1570 and the second solution space 1580. Voice recognition of the full string 1510 results in a third solution space 1595.

The time required for performing voice recognition on a small component can be decreased by structuring the grammar so that common components of the database entries (which are included in the grammar) are compared with the components of the search string before other components of the database entries (which are also included in the grammar). Further, common components may be entered as separate vocabulary entries in a grammar, even though those components do not constitute complete database entries. For example, the word "Sony" may be entered into the vocabulary even though it does not refer to an individual product (database entry). The component "Sony" can then be associated with all of the grammar entries that include the word "Sony" and that correspond to complete database entries. The same can be done for the individual word "laptop," as well as the two-word component "Sony laptop," for example. Such a structure may allow for relatively quick recognition of the component "Sony laptop" and a corresponding narrowing of the search space for the recognition of the full search string "Sony laptop superslim 505Z."

Note that the list of matches determined in the process 1400 (1460) may return matches that correspond to actual database entries that match the entered search string. Accordingly, in such implementations, the voice recognition process may effectively perform the database search simultaneously. For example, each of the listed matches may serve as an index into the database for easy retrieval of the corresponding database entry.

Other implementations may allow search strings to include components that are not part of the database, however. For example, a user may be allowed to enter a price range for a computer. In such an example, the grammar could include, and be able to recognize, price ranges entered in a determined format. The grammar may be structured in a variety of ways to support recognizing such search strings. For example, if a user enters only a price range, the voice recognition engine may recognize the search string and associate it with a set of database entries satisfying the price range. Alternatively, the voice recognition engine may query the user for more data by, for example, returning a list of manufacturers having computers (computers being the assumed content of the database ultimately being searched) in that price range. If the user enters additional information, such as, for example, a manufacturer, the voice recognition system may use that additional information to narrow the solution space. If the user enters sufficient information, the grammar may be structured to allow the voice recognition system to determine, for the various price ranges that are recognizable, the grammar entries for all actual products (corresponding to actual database entries) that satisfy the entered price range and the other components of the search string. These entries may then be presented to the user.

The process 1400 can also be applied to systems that do not use voice input. For example, other modes of input may require a recognition process that could be performed in an analogous manner to that already described.

Figure 16:
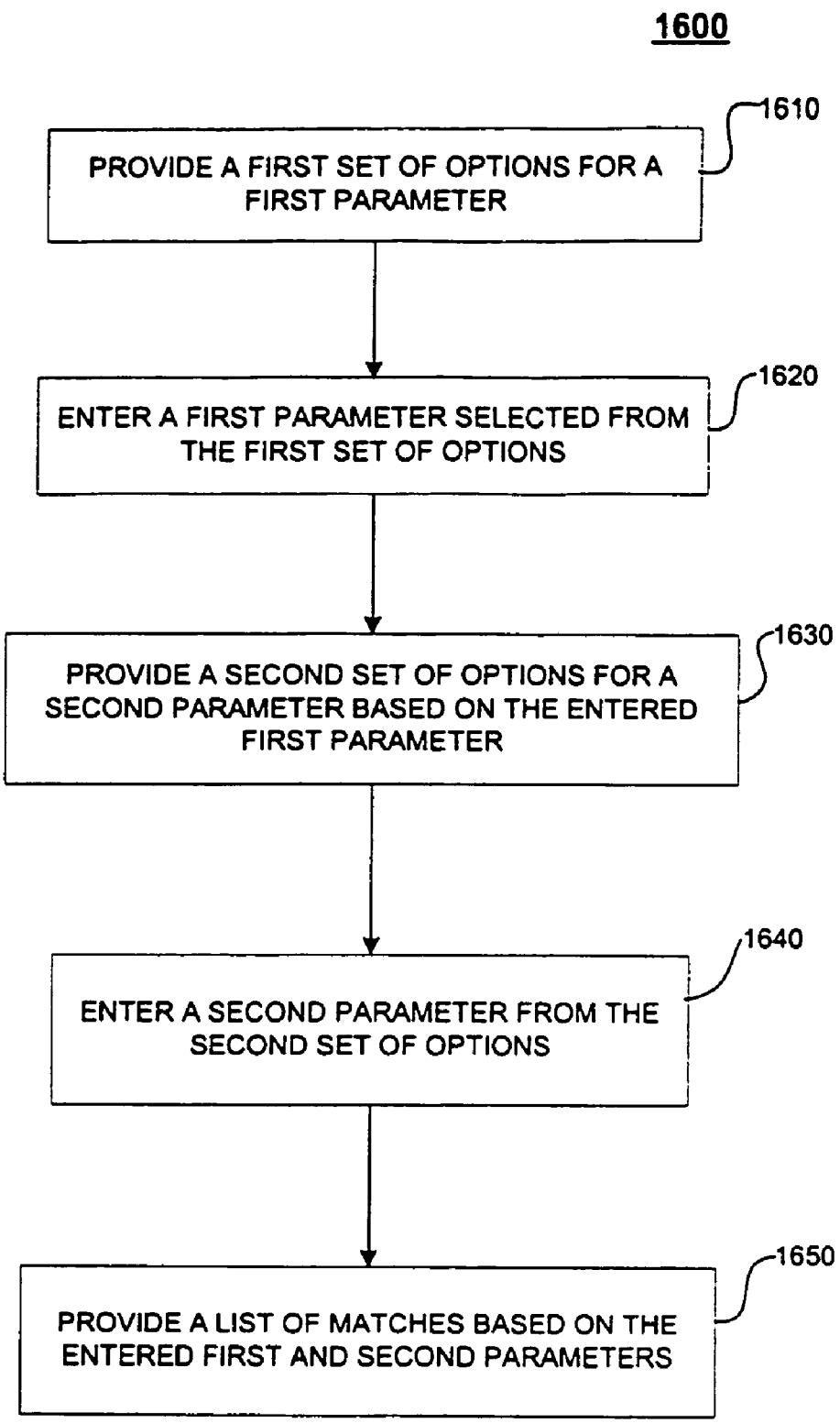
FIG. 16 is a flow chart of a process for performing a search for a search string using a multi-level, multi-parameter cascade approach.

Referring to FIG. 16, a process 1600 for performing a search for a search string using a multi-level, multi-parameter cascade approach includes providing a first set of options for a first parameter (1610). For example, a user interface to a database of computers may provide a list of manufacturers as the first set of options, with the first parameter being the manufacturer. The first set of options may be provided, for example, on a display, or through a voice response system.

The process 1600 includes entering a first parameter selected from the first set of options (1620). Continuing the example from above, a user may select, and enter, a manufacturer from a list provided in operation 1610. The user may enter the first parameter by using, for example, a stylus, keyboard, touch screen, or voice input.

The process 1600 includes providing a second set of options for a second parameter based on the first parameter (1630). Continuing the example from above, a user interface may provide a list of product types, including, for example, desktops, laptops, and palmtops, that are available from the manufacturer entered in operation 1620.

The process 1600 includes entering a second parameter selected from the second set of options (1640). Continuing the example from above, a user may select, and enter, a product type from the list provided in operation 1630.

The process 1600 includes providing a list of matches, based on the first and second parameters (1650). Continuing the example from above, the list of matches may include all computers in the database that are manufactured by the entered manufacturer and that are of the entered product type. For example, the list of matches may include all Sony laptops.

The process 1600 may be used, for example, instead of having a user enter a one-time, full search phrase. The process 1600 presents a set of structured searches or selections from, for example, drop-down lists. The first and second parameters can be considered to be parts of a search string, with the cumulative search string producing the list of matches provided in operation 1650. The database may be structured to allow for efficient searches based on the parameters provided in operations 1610 and 1630. Additionally, in voice input applications, by structuring the data entry, the grammar and vocabulary for each parameter may be simplified, thus potentially increasing recognition accuracy and speed.

Implementations may present multiple parameters and sets of options, and these may be organized into levels. In the process 1600, one parameter was used at each of two levels. However, for example, multiple parameters may be presented at a first level, with both entries determining the list of options presented for additional multiple parameters at a second level, and with all entries determining a list of matches. Such parameters may include, for example, manufacturer, brand, product type, price range, and a variety of features of the products in the product type. Examples of features for computers include processor speed, amount of random access memory, storage capacity of a hard disk, video card speed and memory, and service contract options.

Figure 17:
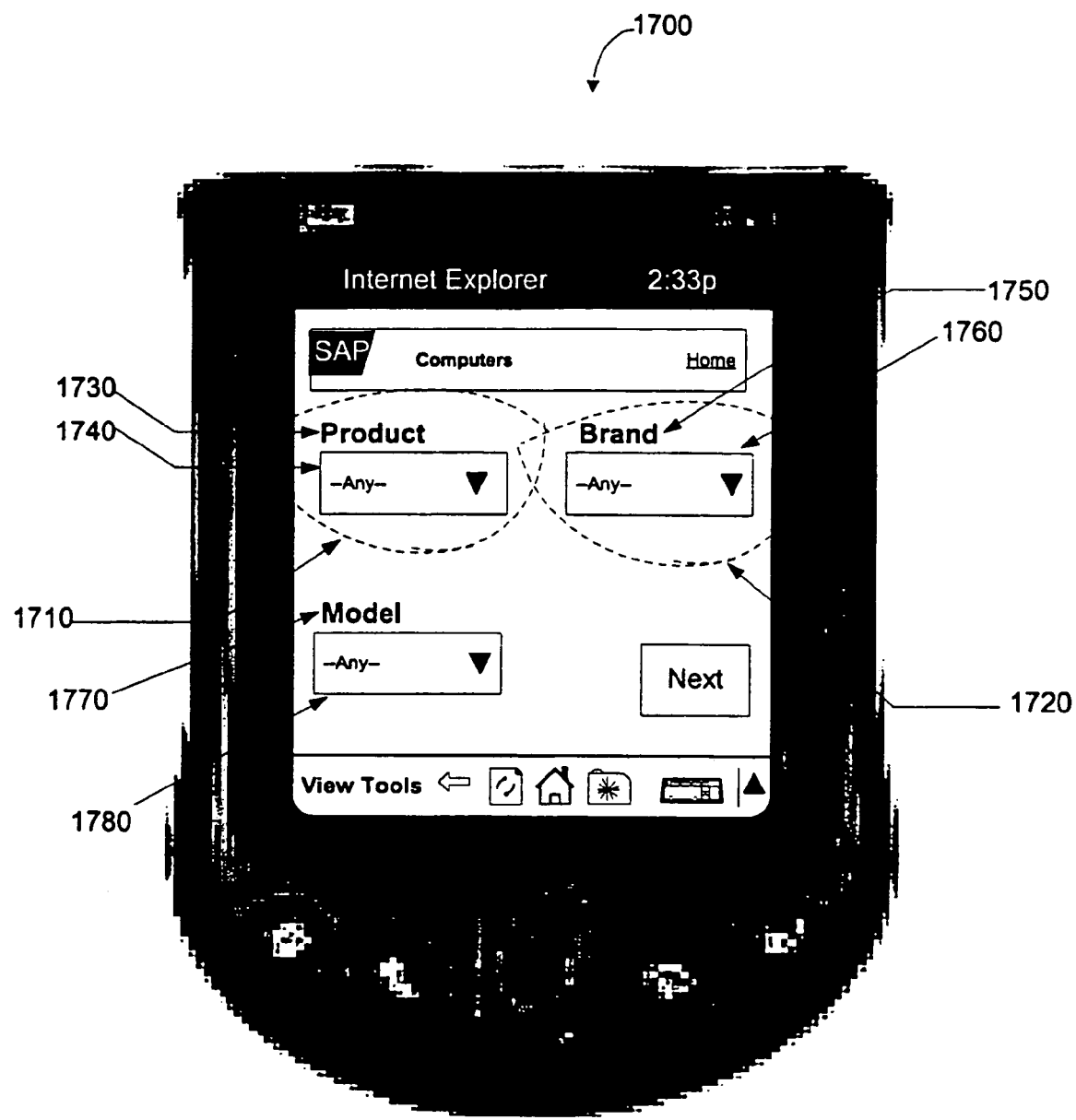
FIG. 17 is a picture of a page for implementing the process of FIG. 16.

Referring to FIG. 17, a picture of a page 1700 for implementing the process 1600 includes a first level 1710 and a second level 1720. The first level 1710 provides a first parameter 1730 for the product, with a corresponding pull-down menu 1740 that includes a set of options. The set of options in pull-down menu 1740 may include, for example, desktop, laptop, and palmtop. The second level 1720 provides a second parameter 1750 for the brand, with a corresponding pull-down menu 1760 that includes a set of options. The set of options in pull-down menu 1760 are all assumed to satisfy the product parameter entered by the user in pull-down menu 1740 and may include, for example, Sony, HP/Compaq, Dell, and IBM. Assuming that "laptop" was selected in the pull-down menu 1740, then the pull-down menu 1760 would only include brands (manufacturers) that sell laptops.

The page 1700 also includes a category 1770 for models that match the parameters entered in the first and second levels 1710 and 1720. The matching models are viewable using a pull-down menu 1780. As the page 1700 indicates, all of the search string information as well as the results may be presented in a single page. The page 1700 is also presentable in a single screen shot, but other single-page implementations may use, for example, a web page that spans multiple screen lengths and requires scrolling to view all of the information.

Figure 18:
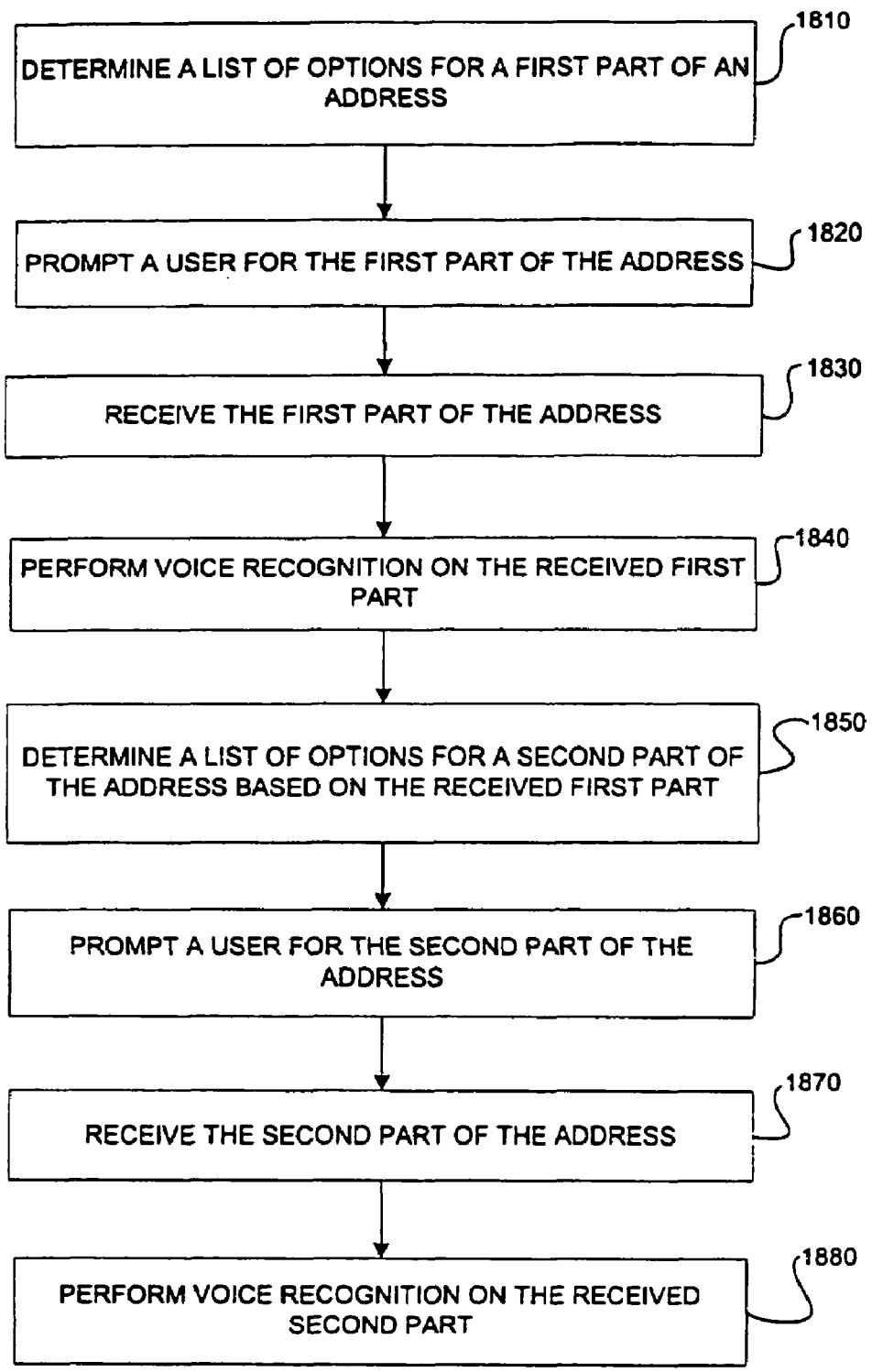
FIG. 18 is a flow chart of a process for recognizing an address.

Referring to FIG. 18, a process 1800 for recognizing an address includes determining a list of options for a first part of an address (1810). The address may be, for example, a street address or an Internet address, where Internet addresses include, for example, electronic mail addresses and web site addresses. If the address is a street address, the first part may be, for example, a state identifier.

The process 1800 includes prompting a user for the first part of the address (1820). The prompt may, for example, simply include a request to enter information, or it may include a list of options. The process 1800 includes receiving the first part of the address (1830). If the first part is received auditorily, the process 1800 includes performing voice recognition of the first part of the address (1840).

The process 1800 includes determining a list of options for a second part of the address based on the received first part (1850). Continuing the example from above, the second part may be, for example, a city identifier, and the list of options may include, for example, only those cities that are in the state identified by the received state identifier. By inverting the usual order of state and city in entering street addresses, a voice recognition system can simplify the relevant grammar and vocabulary for the city identifier, thus facilitating enhanced voice recognition accuracy and speed.

The process 1800 includes prompting the user for the second part of the address (1860). Again, the prompt need not include the list of options. The process 1800 includes receiving the second part of the address (1870). If the second part is received auditorily, the process 1800 includes performing voice recognition of the second part of the address (1880).

The process 1800 could continue with subsequent determinations of lists of options for further parts of the address. Continuing the example from above, a list of options for a zip code could be determined based on the city identified by the received city identifier. Such a list could be determined from the available zip codes in the identified city. City streets in the city or the zip code could also be determined. Further, country information could be obtained before obtaining state information.

As the above example and the process 1800 indicate, the range of possibilities for each subsequent piece of address information can be narrowed by entering the data in an order that is reverse from the ordinary practice, that is, by entering data for geographically broad categories to geographically narrow categories. If multiple countries are concerned, the impact of using the reverse order may be even greater because standard designations for streets varies for different languages.

The process 1800 may prompt the user in a number of ways. For example, the user may be prompted to enter address information in a particular order, allowing a system to process the address information as it is entered and to prepare the lists of options. Entry fields for country, state or province, city, zip or postal code, street, etc., for example, may be presented top-down on a screen or sequentially presented in speech output.

Figure 19:
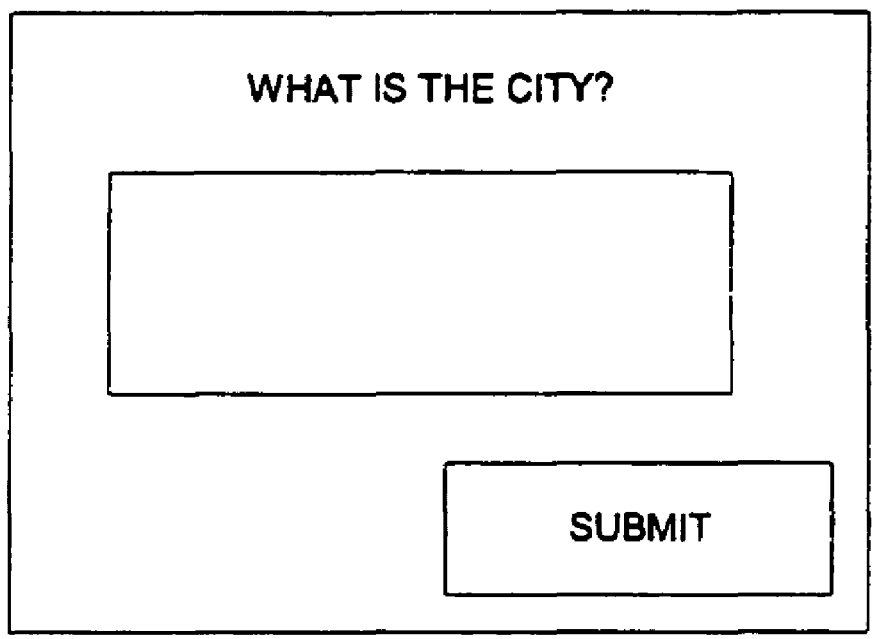
FIG. 19 is a block diagram of a pop-up wizard for entering address information.

Referring to FIG. 19, there is shown another way to prompt the user in the process 1800. A system may use a pop-up wizard 1900 on the screen of a device to ask the user to enter specific address information. Further, a system may preserve the normative order of address information, but use visual cues, for example, to prompt the user to enter the information in a particular order. Visual cues may include, for example, highlighting or coloring the border or the title of an entry field.

The process 1800 may be applied to data entered using a voice mode or another mode. After the data is entered at each prompt, and after it is recognized if voice input is used, a database of addresses may be searched to determine the list of options for the next address field. Such systems allow database searching on an ongoing basis instead of waiting until all address information is entered. Such systems also allow for guided entry using pull-down menus and, with or without guided entry, alerting a user at the time of entry if an invalid entry is made for a particular part of an address.

The process 1800 also may be applied to other addresses, in addition to street addresses or parts thereof. For example, the process 1800 may be applied to Internet addresses, including, for example, electronic mail addresses and web site addresses.

Figure 20:
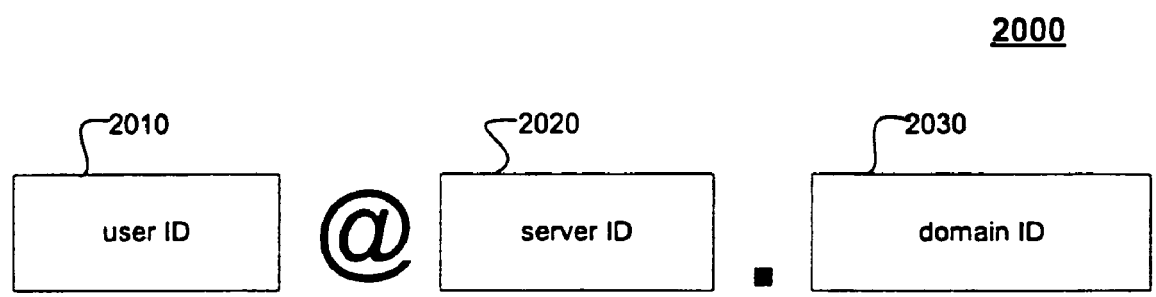
FIG. 20 is a block diagram of a format for entering an electronic mail address.

Referring to FIG. 20, a format 2000 for entering an electronic mail address includes using a user identifier 2010, a server identifier 2020, and a domain identifier 2030. The "at sign" separating the user identifier 2010 and the server identifier 2020, and the "dot" separating the server identifier 2020 and the domain identifier 2030 may be implicit and inserted automatically, that is, without human intervention.

In one implementation, the domain identifier 2030 is entered first due to the small number of options available for this field. A list of options for the server identifier 2020 can be generated based on the entered domain. For example, if "com" is entered for the domain, then a list of options for the server identifier 2020 may include, for example, all "Fortune 100" companies and the twenty-five most frequently visited commercial web sites. Similar lists may be generated for "gov," "net," and other domain identifiers 2030. A list of options for the user identifier 2010 may include, for example, common last names and first names and other conventions, such as, for example, a first initial followed by a last name.

Figure 21:
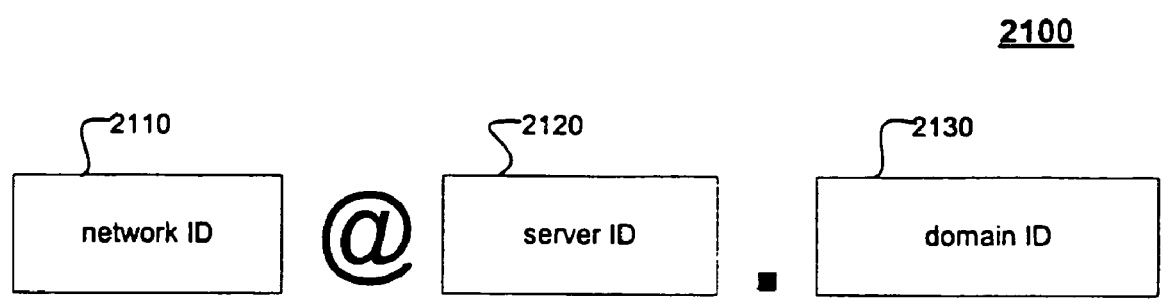
FIG. 21 is a block diagram of a format for entering a web site address.

Referring to FIG. 21, a format 2100 for entering a web site address includes using a network identifier 2110, a server identifier 2120, and a domain identifier 2130. The two "dots" separating the three identifiers 2110, 2120, 2130 may be implicit and inserted automatically. The network identifier may be selected from, for example, "www," "www1", "www2," etc.

Figure 22:
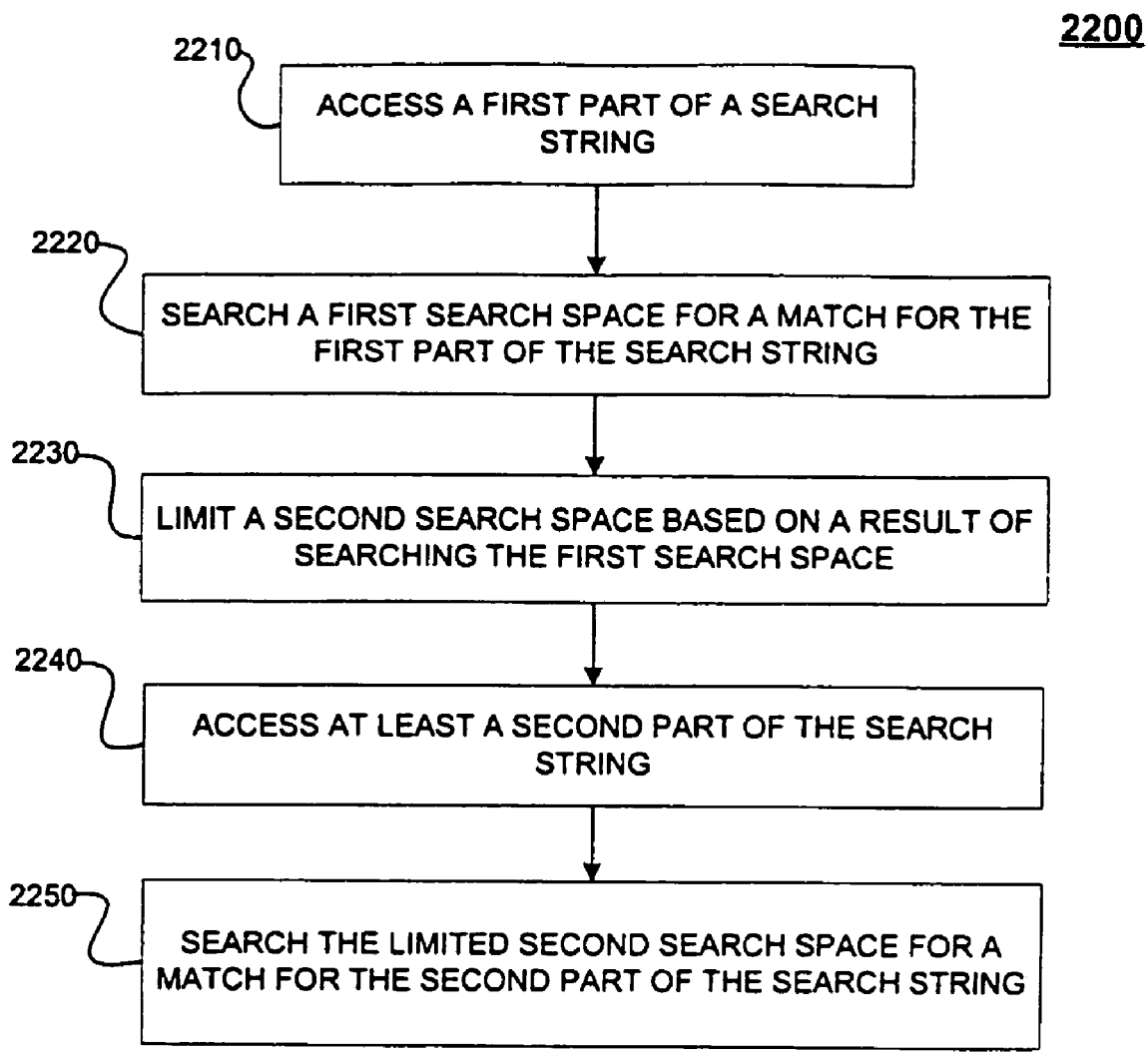
FIG. 22 is a flow chart of a process for searching for one or matches to a search string.

Referring to FIG. 22, a process 2200 for searching for one or matches to a search string includes accessing at least a first part of a search string (2210). Such accessing may include, for example, receiving a voice input, a stylus input, or a menu selection, and the first part may include the entire search string.

The process 2200 includes searching a first search space for a match for the first part of the search string (2220). The first search space may include, for example, a search space in a grammar of a voice recognition engine, a search space in a database, or a search space in a list of options presented to a user in a pull-down menu. Searching may include, for example, comparing text entries, voice waveforms, or codes representing entries in a codebook of vector-quantized waveforms.

The process 2200 includes limiting a second search space based on a result of searching the first search space (2230). The second search space may, for example, be similar to or the same as the first search space. Limiting may include, for example, paring down the possible grammar or vocabulary entries that could be examined, paring down the possible database entries that could be examined, or paring down the number of options that could be displayed or made available for a parameter of the search string. And paring down the possibilities or options may be done, for example, so as to exclude possibilities or options that do not satisfy the first part of the search string.

The process 2200 includes accessing at least a second part of the search string (2240) and searching the limited second search space for a match for the second part of the search string (2250). Accessing the second part of the search string may include, for example, receiving a voice input, a stylus input, or a menu selection, and the second part may include the entire search string. Searching the limited second search space may be performed, for example, in the same way or in a similar way as searching the first search space is performed. As suggested by the discussion of this paragraph and the preceding paragraphs, the process 2200 is intended to cover all of the disclosed processes.

Figure 23:
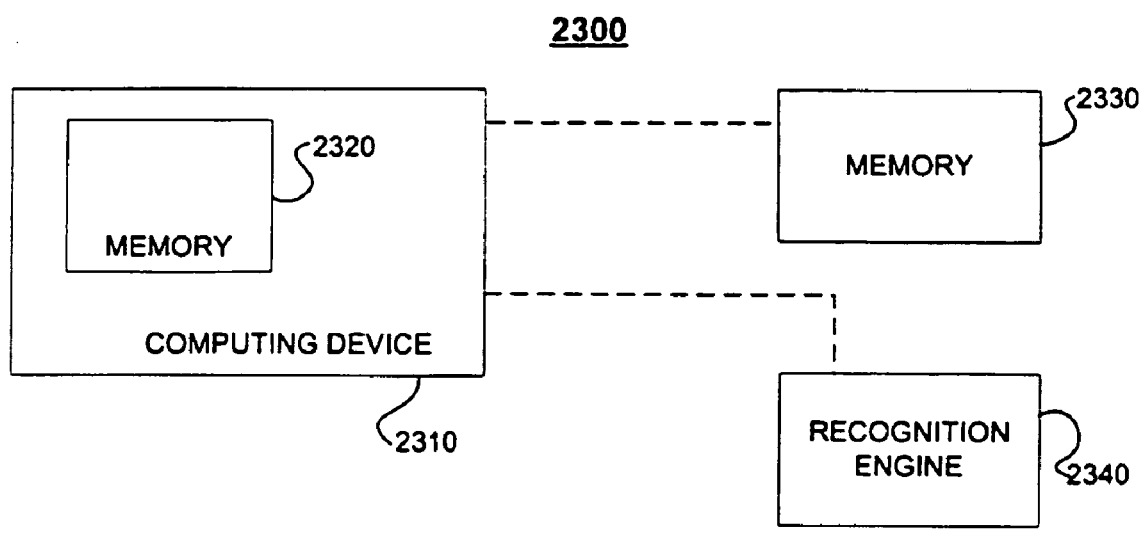
FIG. 23 is a block diagram of a system for performing one or more of the described processes.

Referring to FIG. 23, a system 2300 for implementing one or more of the above processes includes a computing device 2310, a first memory 2320 located internal to the computing device 2310, a second memory 2330 located external to the computing device 2310, and a recognition engine 2340 located external to the computing device 2310. The computing device may be, for example, a desktop, laptop, palmtop, or other type of electronic device capable of performing one or more of the processes described. The first and second memories 2320, 2330 may be, for example, permanent or temporary memory capable of storing data or instructions at least temporarily. The recognition engine 2340 may be a voice recognition engine or a recognition engine for another mode of input. The second memory 2330 and the recognition engine 2340 are shown as being external to, and optionally connected to, the computing device 2310. However, the second memory 2330 and the recognition engine 2340 also may be integrated into the computing device 2310 or be omitted from the system 2300.

Various modifications of the above implementations may be made. For example, the operations of the disclosed processes need not necessarily be performed in the order(s) indicated.

In the above description, numerous examples have been given which allow a first-modality gateway and a second-modality gateway to be synchronized, so that a user may access a server system using either or both of the gateways at a given point in time to obtain a given piece of information or perform a specific action. FIGS. 1, 7, and 10 depict several examples, and other examples have been described.

One action which a user might perform when utilizing the gateway synchronization capabilities of such systems is the selection of a web page that is linked to a currently-viewed web page, where this selection can be performed, for example, either by voice input using a VXML page, or by clicking on an HTML link embedded in an HTML page, using, for example, a stylus or mouse.

Another action which a user might perform is to enter text into, for example, multiple fields within a form on a single web page. For example, as discussed above, variations of processes 300-600 in FIGS. 3-6 include techniques for implementing commands relating to a particular page. More specifically, in FIGS. 8 and 9, variations of operations 810 and 910 allow the synchronization controller 720 of FIG. 7 to receive inputs such as browser inputs and voice inputs, where the inputs may include a data input and/or a focus request for moving to a new field. In an example given above with respect to operation 910, the voice mode system 740 receives a user's city selection for a field in a VXML page, and then subsequently moves a focus to a field for state selection.

Text can be entered using either manual entry by, for example, keyboard, or via a voice-recognition system associated with a corresponding and synchronized VXML page. The discussion of FIGS. 19-21 describe examples of such text entry; more specifically, these figures and related text and examples describe techniques whereby, for example, a grammar is selectively narrowed when performing voice-recognition on a search string, or where a grammar is progressively narrowed as a plurality of related entries are input. By these and other techniques, text entry using voice recognition may be improved in terms of speed and accuracy.

Another technique, allowed for in the discussion above, for entering text or other information into multiple fields within a form is to have a two-level, hierarchical dynamic grammar. In this technique, there are multiple levels and instances of independent, discrete grammars, rather than multiple subsets of a larger and/or interdependent grammar(s).

Figure 24:
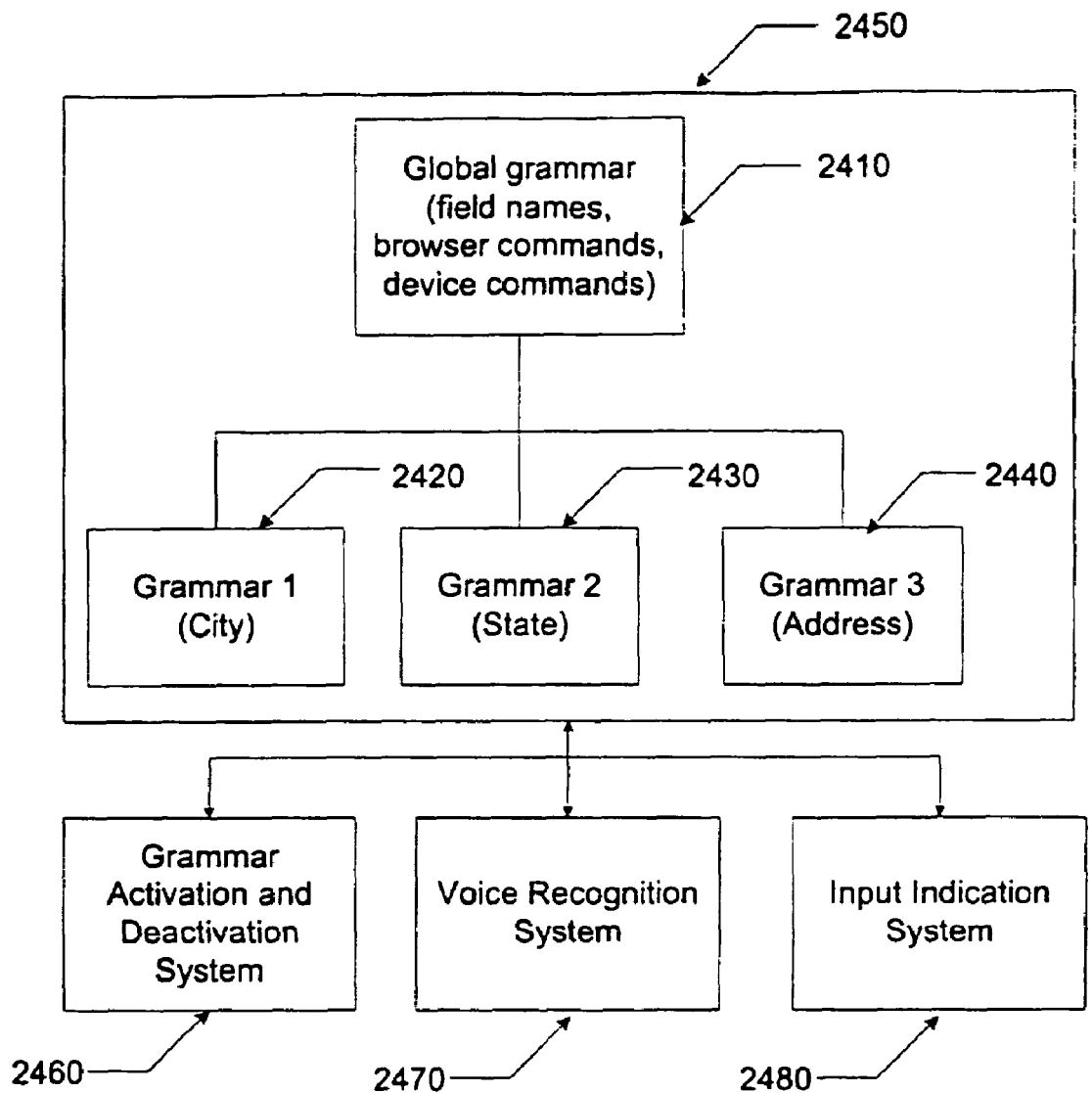
FIG. 24 is a block diagram of a structure for implementing a two-level, dynamic grammar.

FIG. 24 is a block diagram of a structure for implementing a two-level, dynamic grammar. In FIG. 24, a first level includes a global grammar 2410. Global grammar 2410 includes vocabulary for voice commands that are recognized by an operating device or software regardless of a current state of a system or a page. For example, even when a user is currently entering pieces of text information into one of a plurality of fields on a page, the global grammar will be continuously operable to recognize voice input references for, for example, names of other fields on the page, commands for activating the browser (such as, for example, "back," "home," or "refresh"), and device commands such as "restart."

In FIG. 24, a second level includes a plurality of specific grammars. For example, the second level might include a first grammar 2420 for recognizing voice commands inputting a city name, a second grammar 2430 for recognizing voice commands for inputting a state name, and a third grammar 2440 for recognizing voice commands for inputting a street address.

In FIG. 24, it should be understood that grammars 2410-2440 are separate, discrete, independent grammars. One consequence of having independent grammars is that a given word may be replicated in multiple grammars, thereby increasing total storage requirements. For example, grammar 2420 might include the word "Washington" for identifying a name of the city, Washington, D.C. Grammar 2430 might also include the word "Washington," here to identify the state of Washington. Finally, grammar 2440 might include the word "Washington" in case a user lives on "Washington Street."

In contrast, other voice recognition systems may have a single, large grammar (or a plurality of dependent grammars), in which the word "Washington" is stored once and entered into whatever field is currently active upon detection of the word "Washington." Moreover, such systems may be relatively poor in recognizing voice input when there are multiple fields for voice recognition that are active at the same time. For example, the fields of last name and first name may both exist in a form on a software application and may be concurrently active to display a result of recognizing a voice input such as "Davis" (which may be, for example, a valid selection within both a "first name" and a "second name" field). Such fields with similar data in the recognition grammar may compete for the results of voice recognition, and therefore increase the probability of inaccuracy.

The multi-level grammar of FIG. 24 may thus provide increased speed and/or accuracy of voice recognition. This speed and/or accuracy improvement results, for example, from the fact that only one from among the second level of grammars is active a particular time. Therefore, the size of the vocabulary that must be searched by a voice-recognition system may be severely reduced. With a smaller vocabulary, recognition accuracy generally increases, and processing time generally decreases.

Moreover, the voice recognition system is constantly aware of which grammar (field) is active, and so does not need to disambiguate a recognized word with respect to a given field. For example, in other systems in which the word Washington is recognized, the systems may have to determine the field into which the recognized word should be inserted, for example, city, state, or address. In using the multi-level, dynamic grammar of FIG. 24, such additional step(s) may be avoided.

Together, the various grammars 2410, 2420, 2430, and 2440 may be stored within a storage area 2450. The storage area 2450 may represent a single database or medium, or multiple databases (media). The grammars may be stored in, for example, a single file or in a plurality of files.

A grammar activation and deactivation system 2460 is available to turn on one of the second-level grammars 2420, 2430, or 2440, as needed, and to concurrently ensure that the other two are deactivated. A voice recognition system 2470 interacts with a user to input voice or spoken data and match the voice or spoken data with words or other portions of the currently-active grammar. Also, an input indication system 2480 demonstrates to the user which grammar is active, as well as a result of the matching operation performed by the voice recognition system 2470.

It should be understood that the storage area 2450, grammar activation and deactivation system 2460, the voice recognition system 2470, and the input indication system 2480 may be implemented on a single device, or on a plurality of devices. For example, one or more of the elements of FIG. 24 may be located on a server system, and/or on a local system such as a mobile computing device. For example, the input indication system 2480 may be a field(s) within a form on a graphical user interface such as a web page, as discussed above, so that voice data input by the user and recognized by the voice recognition system 2470 can be displayed to the user. The input indication system 2480 also may be a recorded or computer-generated voice repeating a recognized word to the user, such as might be used in a telephone entry system.

Figure 25:
FIG. 25 is a web page for entering information about a user.

FIG. 25 shows a web page 2500, being viewed on a portable device, for entering information about a user. In FIG. 25, page 2500 may be a VXML page including a first name field 2510, a last name field 2520, a state field 2530, a zip code field 2540, a city field 2550, and a street address field 2560. Page 2500 also illustrates a plurality of buttons 2570, which are intended to illustrate a plurality of conventional web commands, such as "refresh," "home," "favorites folder," and so on.

Thus, according to the description above, a user may activate the first name field 2510 using a variety of techniques. For example, field 2510 could be selected by a voice command recognized by the first level grammar that includes global grammar 2410. Alternatively, if page 2500 is synchronized with an HTML (and/or JSP) page as described above, the field could be selected using a stylus, mouse, or other mechanical input. As another example, the field could be automatically highlighted, due to being the first field in the form.

In any case, once the field 2510 is highlighted, a second-level grammar corresponding to that field is activated, and only words from that grammar will be recognized for entry into field 2510. In this way, a voice-recognition system 2470 will have a significantly restricted vocabulary from which to choose a first name, so that the speed and/or accuracy with which the first name is selected may be greatly improved.

Figure 26:
FIG. 26 is a web page for entering information about a user.

FIG. 26 shows a web page 2600, again being viewed on a portable device, for entering information about a user. Page 2600 has essentially the same fields as page 2500, however, page 2600 illustrates a visual cue highlighting a first name field 2610. The visual cue serves as a technique for indicating to the user which grammar is currently active. Various examples of such visual cues may include a cursor within the field, a highlighting of the field, a specific coloration of the field, or any other technique for indicating that the particular field and its associated grammar is active.

In one implementation, field 2610 is automatically highlighted as the first field on the page 2600. Upon filling in a first name into field 2610, the visual cue may automatically move to the field 2520, and so on through the page 2600. As shown, an entry into the various fields may be aided by pull-down menu(s), such as in fields 2530 and 2550, or may be filled without the aid of pull-down menus(s), such as in fields 2510 (2610), 2520, 2540, and 2560.

Due to the presence of first level grammars such as global grammar 2410, which remains active even when a particular one of the second level grammars is activated, the user may alternatively choose fields individually, simply by providing an activation signal for a selected one of the (currently) deactivated grammars. For example, the activation signal may involve simply saying the name of the desired field associated with the grammar to be activated. Moreover, as already noted, multi-modal synchronization of pages 2500/2600 allows the user to utilize an activation signal involving a physical selection of a field (for example, using a physical tool such as a stylus or a mouse), even when the pages include, or are associated with, VXML pages/data.

Alternatively, the global grammar 2410 may be included within each of the independent grammars 2420, 2430, and 2440, particularly in the case where the global grammar 2410 is relatively small in size. In this example, total memory requirements will likely be increased; however, the need to have two processes running simultaneously (that is, two grammars) would be eliminated.

It should be understood that the implementations of FIGS. 24-26 are particularly advantageous with respect to mobile computing devices, in which computing/processing resources are at a relative premium. Moreover, often in small mobile computing devices, text entry is awkward, difficult, or non-existent, so that speedy, accurate voice entry, particularly into forms such as web pages, would be very useful and advantageous.

Although the above implementations of a dynamic grammar have been discussed with respect to a web page such as HTML, VXML, or JSP, they are in fact compatible with many or all of the various implementations discussed above in Sections I and II. Moreover, the implementations may be compatible with non-web or non-Internet related implementations. For example, the multi-level, dynamic grammar of FIG. 24 could be used in almost any software application in which discrete data should be entered.

In fact, any application in which data is to be entered and vocal entry is possible could benefit from the above-described implementations. For example, as referred to above, telephone-based information entry could be facilitated in which a recorded or computerized voice speaks a field as a prompt for data entry, such as first name, and then selects from an independent, discrete grammar associated with the field, as described above.

Moreover, although a two-level grammar has been described above, implementations also may include a three (or more) level grammar. For example, a web page having two frames may have a set of independent grammars for each frame, a global grammar for each frame, and a global grammar for the web browser or other application(s) (such as an operating system for the device running the web browser).

Synchronizing Using IP Addresses

Figure 27:
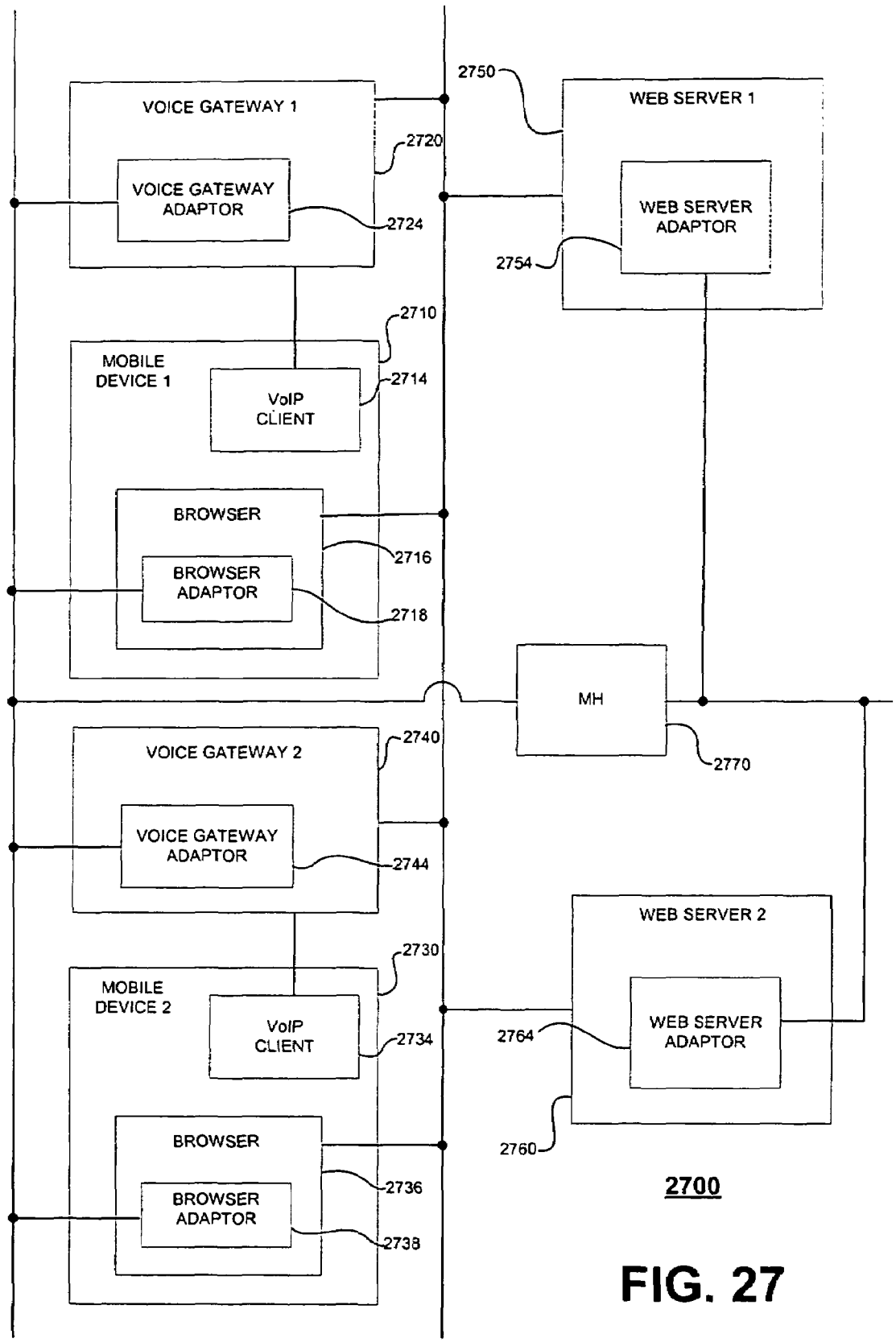
FIG. 27 is an example of a system with multiple mobile devices, voice gateways, and servers, with various components shown to include adaptors.

Referring to FIG. 27, a system 2700 includes a first mobile device 2710 including a first "voice over Internet Protocol" ("VoIP") client 2714 and a first browser 2716, with the first browser 2716 including a first browser adaptor 2718. First VoIP client 2714 is coupled to a first voice gateway 2720 that includes a voice gateway adaptor 2724.

System 2700 includes a second mobile device 2730 including a second VoIP client 2734 and a second browser 2736, with the second browser 2736 including a second browser adaptor 2738. Second VoIP client 2734 is coupled to a second voice gateway 2740 that includes a second voice gateway adaptor 2744.

System 2700 includes a first web server 2750 including a first web server adaptor 2754. System 2700 includes a second web server 2760 including a second web server adaptor 2764. First web server 2750 and second web server 2760 are each coupled to the first browser 2716, the first voice gateway 2720, the second browser 2736, and the second voice gateway 2740. System 2700 further includes a messaging handler 2770 coupled to the first web server adaptor 2754, the second web server adaptor 2764, the first browser adaptor 2718, the first voice gateway adaptor 2724, the second browser adaptor 2738, and the second voice gateway adaptor 2744. Web server adaptors 2754 and 2764 each can be implemented as part of a multi-modal application running on web server 2750 or 2760, respectively.

Figure 28:
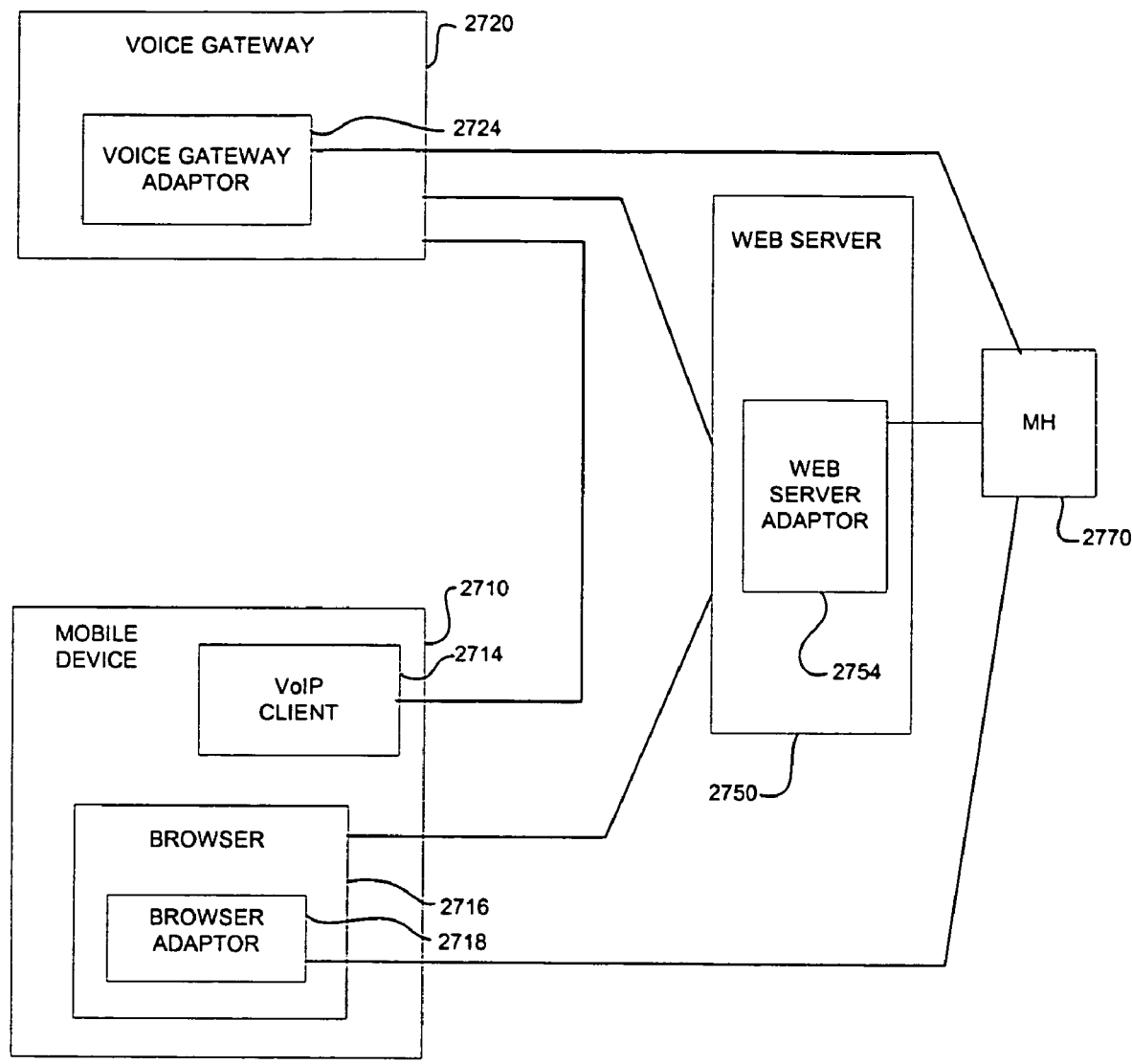
FIG. 28 is an example of a limited implementation of the system of FIG. 14.

Referring to FIG. 28, a system 2800 is a smaller implementation of the general system of FIG. 27. System 2800 includes first mobile device 2710 (referred to as mobile device 2710), first voice gateway 2720 (referred to as voice gateway 2720), first web server 2750 (referred to as web server 2750), and messaging handler 2770, as well as their constituent components described above in the description of FIG. 27.

Figure 29:
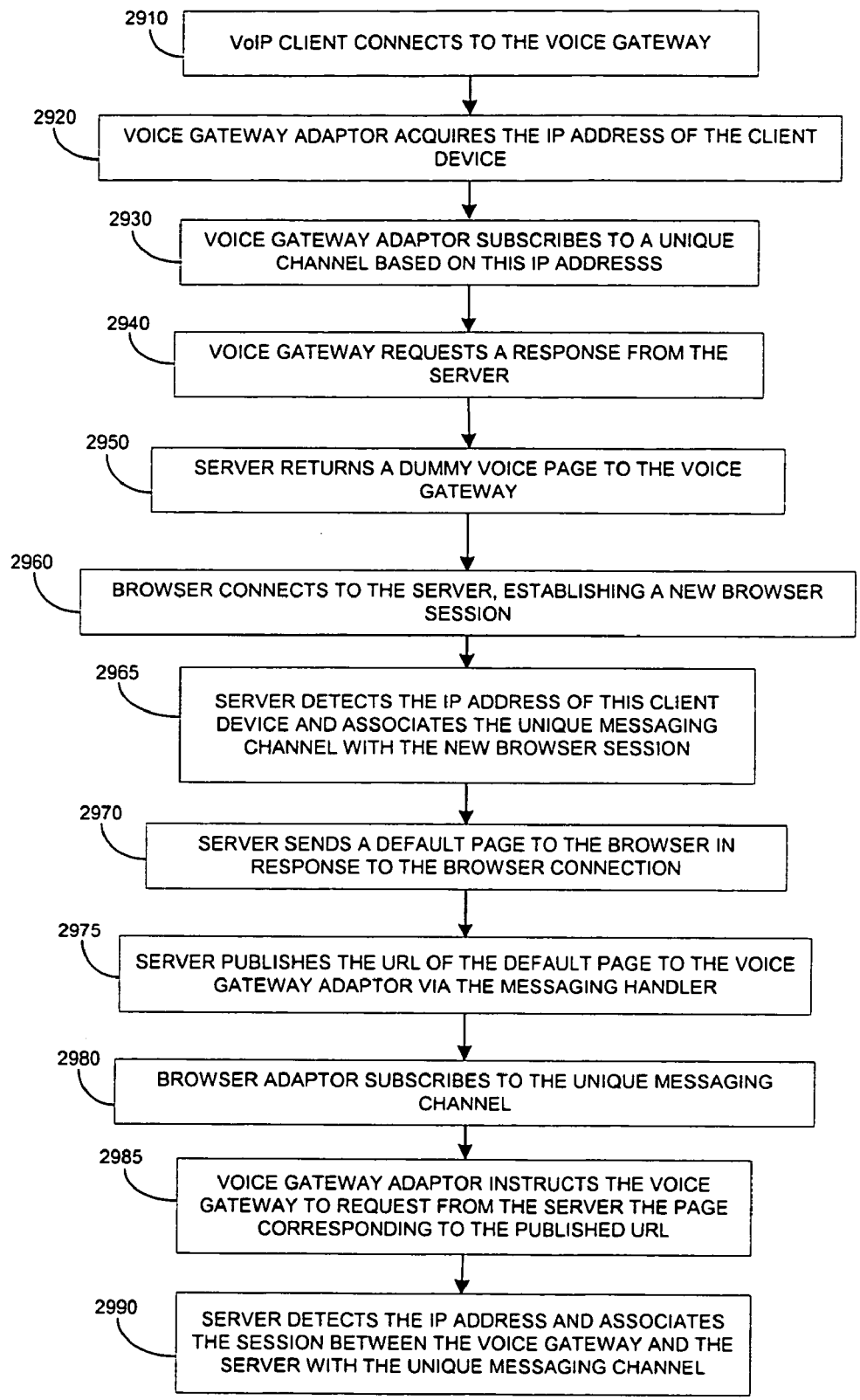
FIG. 29 is an example of a process for using the system of FIG. 15.

Referring to FIG. 29, a process 2900 can be used with system 2800 and generally describes one implementation for establishing communication between various components and associating two modalities. The association described in process 2900 may be used by, for example, one or more of the various synchronization processes described above.

Process 2900 includes having VoIP client 2714 connect to voice gateway 2720 (2910). This connection (2910) may be established in response to a user requesting a voice connection at mobile device 2710 by, for example, using a stylus to select a "connect" icon. A standard protocol, such as, for example, International Telecommunications Union—T Recommendation H.323 ("H.323") or Session Initiation Protocol ("SIP"), may be used between VoIP client 2714 and voice gateway 2720 in specific implementations.

Process 2900 also includes having voice gateway adaptor 2724 acquire the Internet Protocol ("IP") address of mobile device 2710 (2920). The IP address may be part of the VoIP protocol being used, in which case the voice gateway adaptor 2724 may acquire the IP address by, for example, pulling the IP address out of the connection header. The IP address also may be acquired, for example, by querying the user or mobile device 2710.

The various adaptors in system 2800 generally handle the messaging interface for the gateway/server and may be implemented, for example, as a software plug-in. In various implementations, adaptors function as listener processes and browser adaptors comprise software embedded in each HTML page, with the software calling routines stored on the browser machine. As each HTML page is received, and the embedded software is executed, the execution of the software may give rise to an adaptor for that HTML page being instantiated on the browser machine. These implementations also may embed similar calls in VXML pages in implementations that support such calls at a voice gateway. For systems having voice gateways that do not support such calls, the voice gateway may include a single listener process (adaptor) that interfaces with the messaging handler. Analogously, one browser adaptor may support multiple HTML pages in implementations that support such calls at the display browser.

Process 2900 includes having voice gateway adaptor 2724 subscribe to a unique channel based on the IP address of the mobile device 2710 (2930). Voice gateway adaptor 2724 may use, for example, HTTP to communicate with messaging handler 2770. Messaging handler 2770 creates the channel and uses the IP address as a name or other reference for the channel, and voice gateway adaptor 2724 subscribes to the unique channel. The channel is unique because it is described by the unique IP address of mobile device 2710.

Process 2900 includes having voice gateway 2720 request a response from web server 2750 (2940). Voice gateway 2720 may send a HTTP request to web server 2750 to request a response. Because no specific web page has been requested at this point by VoIP client 2714, the request may be for a default page that need not contain any content (that is, a dummy page). Specific implementations may perform this operation as part of a start-up procedure that allows time for browser 2716 to connect to web server 2750 before requesting or sending web pages with content. Web server 2750 may perform this functionality using a standard web server application that is enhanced to support synchronizing multiple modalities.

Process 2900 includes having web server 2750 return a dummy voice page to voice gateway 2720 (2950). Process 2900 also includes having browser 2716 connect to web server 2750 and establish a new browser session (2960). Browser 2716 may connect in response, for example, to a user entering the URL of a desired web page, or in response to a connect command.

Process 2900 includes having web server 2750 detect the IP address of mobile device 2710 and associate the unique messaging channel with the new session that was established between browser 2716 and web server 2750 (2965). In particular implementations, the IP address is embedded in the HTTP communication between browser 2716 and web server 2750, and web server 2750 detects the IP address by extracting the IP address from the communication. In one implementation, web server 2750 assumes that a unique messaging channel referenced by the IP address exists and associates the session with the unique messaging channel using a table or data structure.

Process 2900 includes having web server 2750 send a web page to browser 2716 in response to first web browser 2716 connecting to web server 2750 (2970). The web page sent to a browser is typically a HTML page. If the browser-server connection was established (2960) in response to a user entering the URL of a desired web page, then web server 2750 may send the requested web page.

Process 2900 includes having web server 2750 publish the URL of the web page sent to browser 2716 to voice gateway adaptor 2724 through messaging handler 2770 (2975). Web server 2750 publishes the URL to the unique messaging channel identified or referenced by the IP address of mobile device 2710. First web server adaptor 2754 (referred to as web server adaptor 2754) is used to publish to messaging handler 2770. Initially, only voice gateway adaptor 2724 is subscribed to the unique messaging channel, so there is no ambiguity as to what entity is the intended recipient of the message.

In typical implementations, the URLs of corresponding VXML and HTML web pages are the same. Thus, in the typical implementations, a server need only publish the URL to allow the other modality to identify a corresponding web page. In implementations in which corresponding pages (or other data) do not have the same URL or other identifier, a server (or other component) may determine the identifier for the corresponding page.

Process 2900 includes having browser adaptor 2718 subscribe to the unique messaging channel (2980). Both voice gateway adaptor 2724 and browser adaptor 2718 are now subscribed to the unique messaging channel and can receive messages published to that channel.

Operation 2980 is performed earlier in certain implementations. In an implementation in which browser adaptor 2718 subscribes in operation 2960, because both voice gateway adaptor 2724 and browser adaptor 2718 are subscribed to the unique messaging channel, each will receive the URL published in operation 2970, as well as subsequently published URLs. In operation 2970, voice gateway adaptor 2724 may then recognize itself as the intended recipient of the message by, for example, (i) having web server 2750 embed information in the message indicating which one or more adaptors are to act on the message, or (ii) having web server 2750 use a sub-channel of the unique messaging channel. Alternatively, both adaptors 2724 and 2718 may act on the message, as explained below, and the respective gateway 2720 and 2716 may determine whether a page needs to be requested.

Process 2900 includes having voice gateway adaptor 2724 instruct voice gateway 2720 to request the web page corresponding to the published URL (2985). After recognizing itself as an intended recipient of the published message, voice gateway adaptor 2724 instructs voice gateway 2720 to request the web page corresponding to the URL embedded in the message. In response, voice gateway 2720 requests the web page from web server 2750. The requested page corresponds to a VXML version of the HTML page that was sent to browser 2716. In implementations in which browser adaptor 2718 also acts on the published message, browser 2716 may determine that the web page to be requested has already been received by browser 2716 and that the message is intended only for voice gateway adaptor 2724.

Process 2900 includes having web server 2750 detect the IP address of mobile device 2710 and associate the session between voice gateway 2720 and web server 2750 with the unique messaging channel (2990). The IP address may be detected as in operation 2965 for browser 2716. Implementations may detect another parameter indicative of the IP address in lieu of the IP address itself. This operation may be performed earlier in process 2900, such as, for example, in operation 2940.

After process 2900 is complete, both adaptors 2724 and 2718 are subscribed to the unique messaging channel at message handler 2770 (2930, 2980), with the channel being described or referenced by the IP address of mobile device 2710. Further, both sessions are associated at web server 2750 with the unique messaging channel (2965, 2990). Accordingly, when a user requests a web page using either modality, the requesting session is already associated with the messaging channel (for example, 2965) and a message can be sent (for example, 2975) that allows a synchronizing web page to be requested (for example, 2985) and delivered.

In other implementations, browser 2716 may connect to web server 2750 before voice gateway 2720 connects to web server 2750. In such implementations, the roles of the two gateways 2716 and 2720 are generally reversed from that described in process 2900.

Synchronizing Using User/Device IDs

Figure 30:
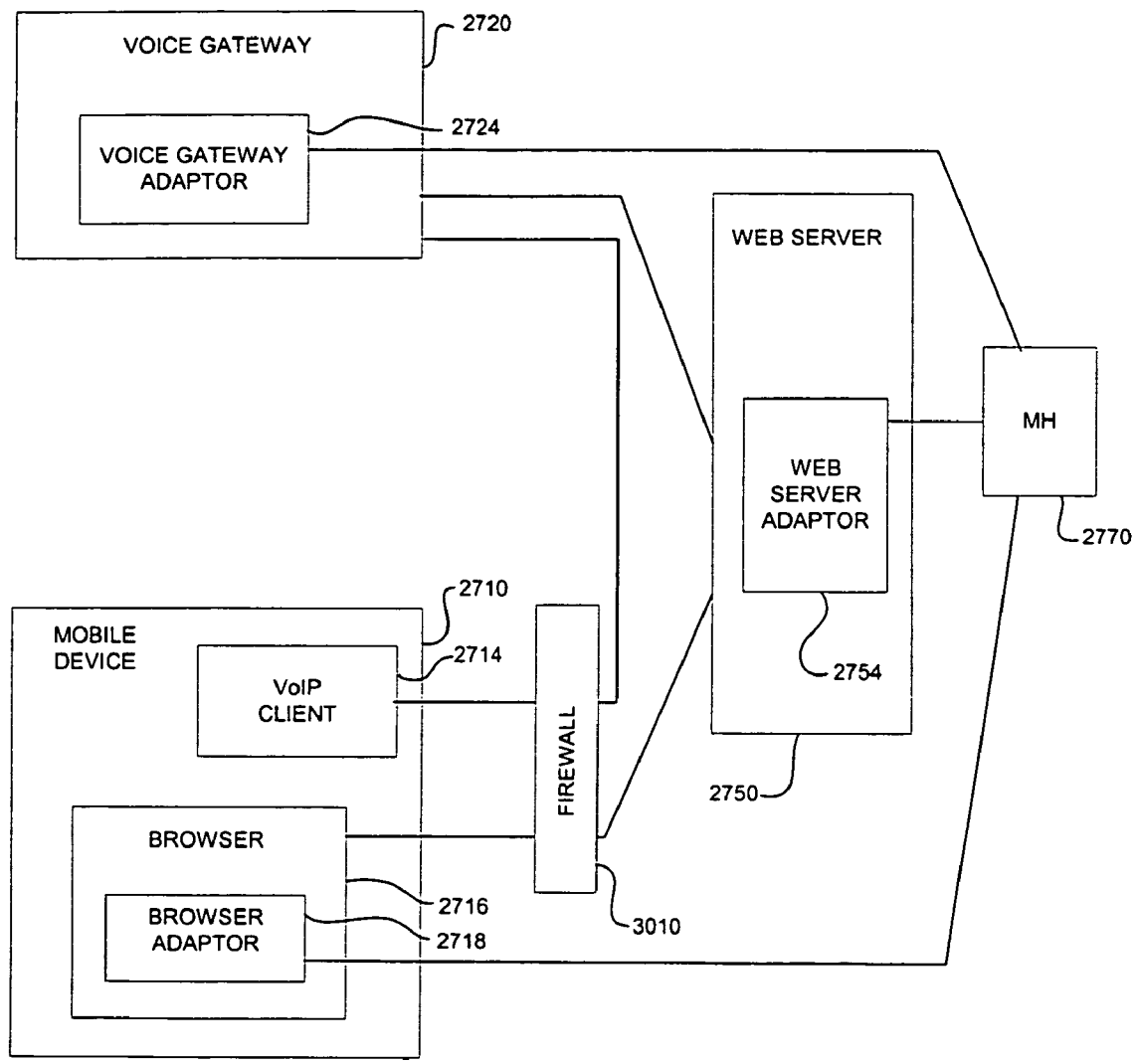
FIG. 30 is an example of the system of FIG. 15 with a firewall.

Referring to FIG. 30, a system 3000 includes the same components as system 2800 and also includes a firewall 3010 that interfaces between mobile device 2710 and both voice gateway 2720 and web server 2750. More specifically, firewall 3010 is disposed between VoIP client 2714 and voice gateway 2720, and between browser 2716 and web server 2750. Thus, firewall 3010 is shown in system 3000 as having four connections.

In typical implementations, firewall 3010 embeds the IP address of firewall 3010 into communications transmitted through firewall 3010 from mobile device 2710. Firewall 3010 thus shields the IP address of mobile device 2710 from transmissions to voice gateway 2720 and web server 2750. Accordingly, if process 2900 is used with system 3000, then the IP address of firewall 3010 will be detected by voice gateway adaptor 2724 in operation 2920 and by web server 2750 in operation 2965. This would cause voice gateway adaptor 2724 to subscribe to a messaging channel identified by the IP address of firewall 3010. Continuing with this example, in operation 2980 browser adaptor 2718 would not be able to subscribe to the same messaging channel unless browser adaptor 2718 knew the IP address of firewall 3010. A more general problem exists, however, for many implementations.

Typical implementations will have multiple mobile devices coupled to firewall 3010. In those implementations, the IP address of firewall 3010 does not provide a unique messaging channel. Consequently, messages published for modalities on a single device will be received by other devices as well.

In one solution, (i) VoIP client 2714 provides a unique identifier to voice gateway 2720 in operation 2910, and (ii) browser 2716 provides the unique identifier to web server 2750 in operation 2960. In that way, (i) voice gateway adaptor 2724 can be configured to detect the unique identifier in operation 2920, and (ii) web server 2750 can be configured to detect the unique identifier in operation 2965. Further, browser adaptor 2718 can be configured to subscribe to the messaging channel identified by the unique identifier and created in operation 2930.

A unique identifier may be, for example, a user ID, a device ID, the combination of an IP address for a device and an IP address of an associated firewall, or a unique hardware identifier. The unique identifier may be provided, for example, by embedding the unique identifier within the communication format in such a way that firewall 3010 does not remove the unique identifier.

Figure 31:
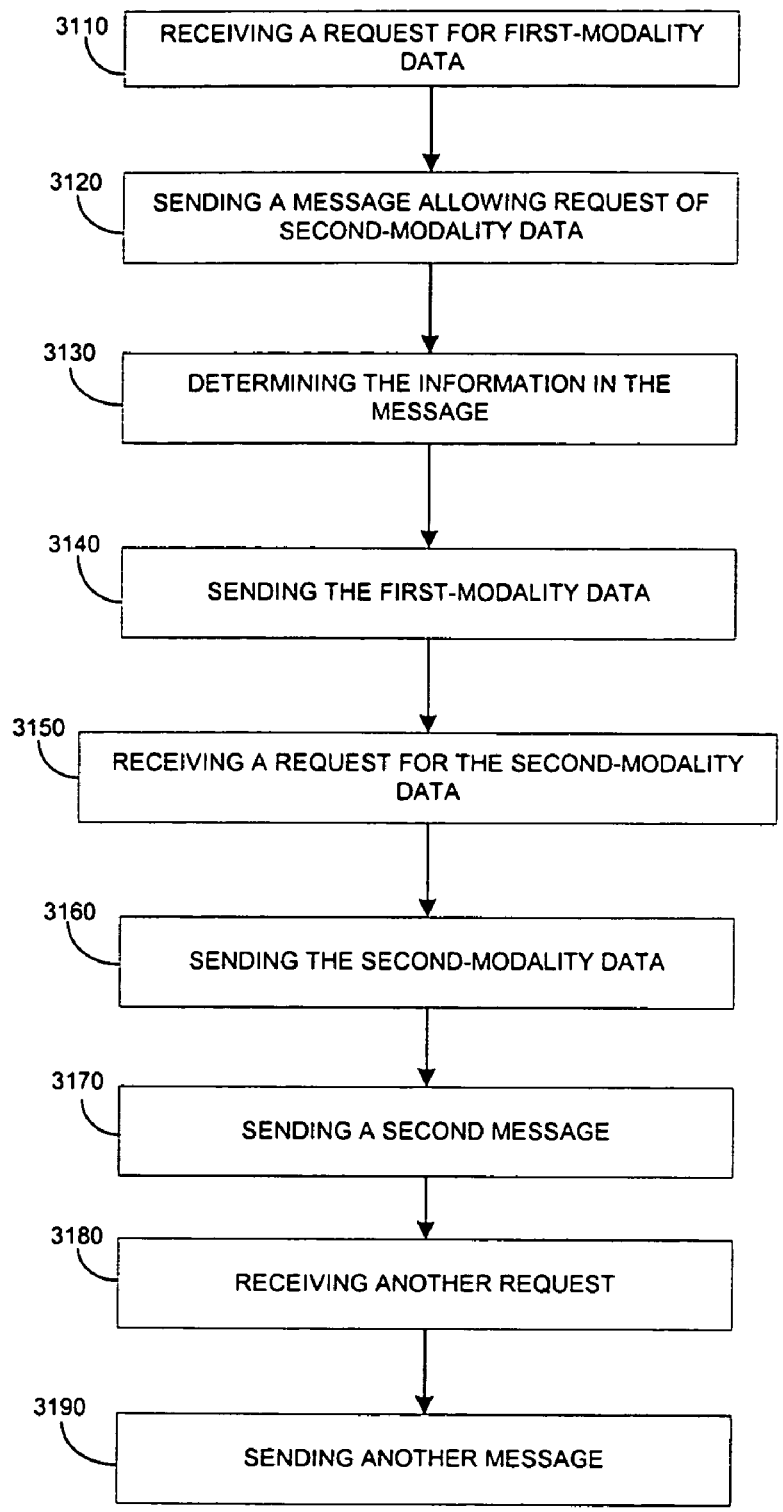
FIG. 31 is an example of a process for sending a synchronization message.

Referring to FIG. 31, a process 3100 may be used to send a synchronization message. Process 3100 may be used by various implementations including, for example, the implementations associated with system 2800 and system 3000.

Process 3100 includes receiving a request for first-modality data (3110). The first modality data includes first content, with the first-modality data being configured to be presented using a first modality, and the request coming from a requestor and being received at a first device. First-modality data includes data that may be presented to a user using a first modality, or that may be responded to by the user using the first modality. Other modality data, such as second-modality data and third-modality data, may be defined similarly.

First-modality data may include, for example, a web page or other data structure, and such a data structure typically includes content. Content generally refers to information that is presented to a user or that a user may be seeking. A data structure also may include, for example, a header having header information, and other formatting information. As an example, a web page may include content that is displayed to a display device by a browser application, and the HTML of the web page may include header and formatting information that control aspects of the display and routing of the web page.

Process 3100 includes sending a message allowing request of second modality data (3120). The message is sent from the first device for receipt by a second device, with the message being sent in response to receiving the request and including information that allows the second device to request second-modality data that includes second content that overlaps the first content, with the second-modality data being configured to be presented using a second modality. The content of the second-modality data may overlap the content of the first-modality data by having common content. For example, a HTML page (first-modality data) and a corresponding VXML page (second-modality data) have common content.

The information allowing a request of the second-modality data may be of various types. For example, the information may include (i) a pointer to the second-modality data (for example, a URL), (ii) a point to a pointer to the second-modality data (for example, a URL of a JSP, with the JSP including the URL of the second-modality data), or (iii) data allowing the address of the second-modality data to be determined (for example, the URL of a HTML page may be provided, from which the URL of the corresponding VXML page can be determined).

Further, the first-modality data and the corresponding second-modality data may be synchronized by presenting the first-modality data and the corresponding second-modality data to a user in such a manner that the user may respond to the overlapping content using either the first modality or the second modality.

Process 3100 includes determining the information that is included in the sent message (3130). For example, if the URL of the first-modality data and the corresponding second-modality data are different, and the information includes the URL of the first-modality data, then the URL of the corresponding second-modality data may be determined by, for example, using a table look-up or an algorithm, or requesting the information from another component or a user.

Process 3100 includes sending the first-modality data to the requestor (3140). One or more additional components may be involved in sending the first-modality data to the requestor, either upstream or downstream.

Process 3100 includes receiving a request for the second-modality data from the second device (3150). The request may be, for example, (i) a request for second-modality data at a URL identified by the information included in the sent message, (ii) a request for second-modality data at a URL determined from the information included in the sent message, or (iii) a request for second-modality data at an address pointed to by a web page at a URL identified by or determined from the information included in the sent message.

Process 3100 includes sending the second-modality data to the second device (3160). One or more additional components may be involved in sending the second-modality data to the second device, and may be involved either upstream or downstream of the sending. For example, a server may send data through a firewall to a gateway.

Process 3100 includes sending a second message (3170). The second message is sent from the first device in response to receiving the request and for receipt by a third device. The second message includes second information allowing the third device to request third-modality data that includes third content that overlaps both the first content and the second content, with the third-modality data being configured to be presented using a third modality. The second information allows a third modality to synchronize with the first two modalities. For example, the first-modality data, the corresponding second-modality data, and the corresponding third-modality data may be synchronized by presenting each to the user in such a manner that the user may respond to the overlapping content using either the first modality, the second modality, or the third modality.

Process 3100 includes receiving another request at the first device (3180). The other request comes from a second requestor and requests second first-modality data that includes fourth content. The second first-modality data is configured to be presented using the first modality. The other request may be from, for example, another user using a different device.

Process 3100 includes sending another message from the first device (3190). The other message is sent in response to receiving the other request, and is sent for receipt by another device. The other message includes third information that allows the other device to request second second-modality data that includes fifth content that overlaps the fourth content, with the second second-modality data being configured to be presented using the second modality. Thus, for example, two users may each be using separate mobile communication devices to navigate a network such as the WWW, and each user's modalities may be synchronized. That is, the first user may have his/her two modalities synchronized and the second user may have his/her two modalities synchronized, but there need not be any synchronization between the two users. The second first-modality data and the second corresponding second-modality data may be synchronized by presenting the second first-modality data and the second corresponding second-modality data to a second user in such a manner that the second user may respond to the overlapping content using either the first modality or the second modality.

Process 3100 may be illustrated by various implementations including, for example, implementations of system 2800 or system 3000. In system 2800 or 3000, web server 2750 may receive a request for a VXML page from voice gateway 2720 (3110). Web server 2750 may send a message to browser 2716, with the message including the URL of the VXML page requested by voice gateway 2720 thereby allowing browser 2716 to request the corresponding HTML page (3120). Web server 2750 may use web server adaptor 2754, messaging handler 2770, and browser adaptor 2718 to send the message to browser 2716. If the URL of the VXML page is not the same as the URL of the corresponding HTML page, then web server 2750 may determine the URL of the corresponding HTML page and send the URL of the corresponding HTML page in the message rather than sending the URL of the VXML page (3130).

Web server 2750 may send the requested VXML page to voice gateway 2720 (3140). Web server 2750 may receive a request for the corresponding HTML page from browser 2716, possibly through firewall 3010 (3150). Web server 2750 may send the corresponding HTML page to browser 2716 (3160).

Web server 2750 may send a second message, with the second message going to a third-modality gateway (not shown) and including the URL of the VXML page, with the URL of the VXML page allowing the third-modality gateway to request corresponding third-modality data (3170).

Web server 2750 may receive another request, with the other request being from a second voice gateway (not shown) and requesting a second VXML page (3180). Web server 2750 may send another message for receipt by a second browser (not shown), with the other message including the URL of the second VXML page and thereby allowing the second browser to request a HTML page corresponding to the second VXML page (3190).

Web server 2750 may perform various operations of process 3100 using any of the server-push, browser-pull, voice-interrupt listener, or no-input tag implementations described earlier. In server-push, for example, a voice gateway requests a VXML page from a server (320; 3110), and the server sends a message to a browser indicating the corresponding HTML page (340-350; 3120). In browser-pull, for example, a voice gateway requests a VXML page from a server (410; 3110), and the server sends a response to a browser with an embedded command that updates the browser with the corresponding HTML page when the browser executes the embedded command (450; 3120). In voice-interrupt listener, for example, a browser requests a HTML page from a server (520; 3110), and the server sends a message to a voice gateway indicating the corresponding VXML page (540-550; 3120). In no-input tag, for example, a browser requests a HTML page from a server (620; 3110). The server has previously sent a no-input tag to a voice gateway allowing the voice gateway to request a JSP (610; 3120), and the server now updates the JSP with, for example, the address of the corresponding VXML page, thereby allowing the voice gateway to request the corresponding VXML page (640; 3120).

Various operations of process 3100 also may be performed by, for example, proxy or fused implementations. In a proxy implementation, for example, a synchronization controller receives a request for a HTML page from a browser (1110; 3110), and the synchronization controller sends a message to a voice gateway so that the voice gateway requests the corresponding VXML page (1140; 3120). In a fused implementation, for example, a synchronization controller receives a request for a HTML page from a browser (810; 3110), and the synchronization controller passes an identifier of the corresponding VXML page to a voice mode system (830; 3120).

Synchronizing Using Smart Adaptors

Figure 32:
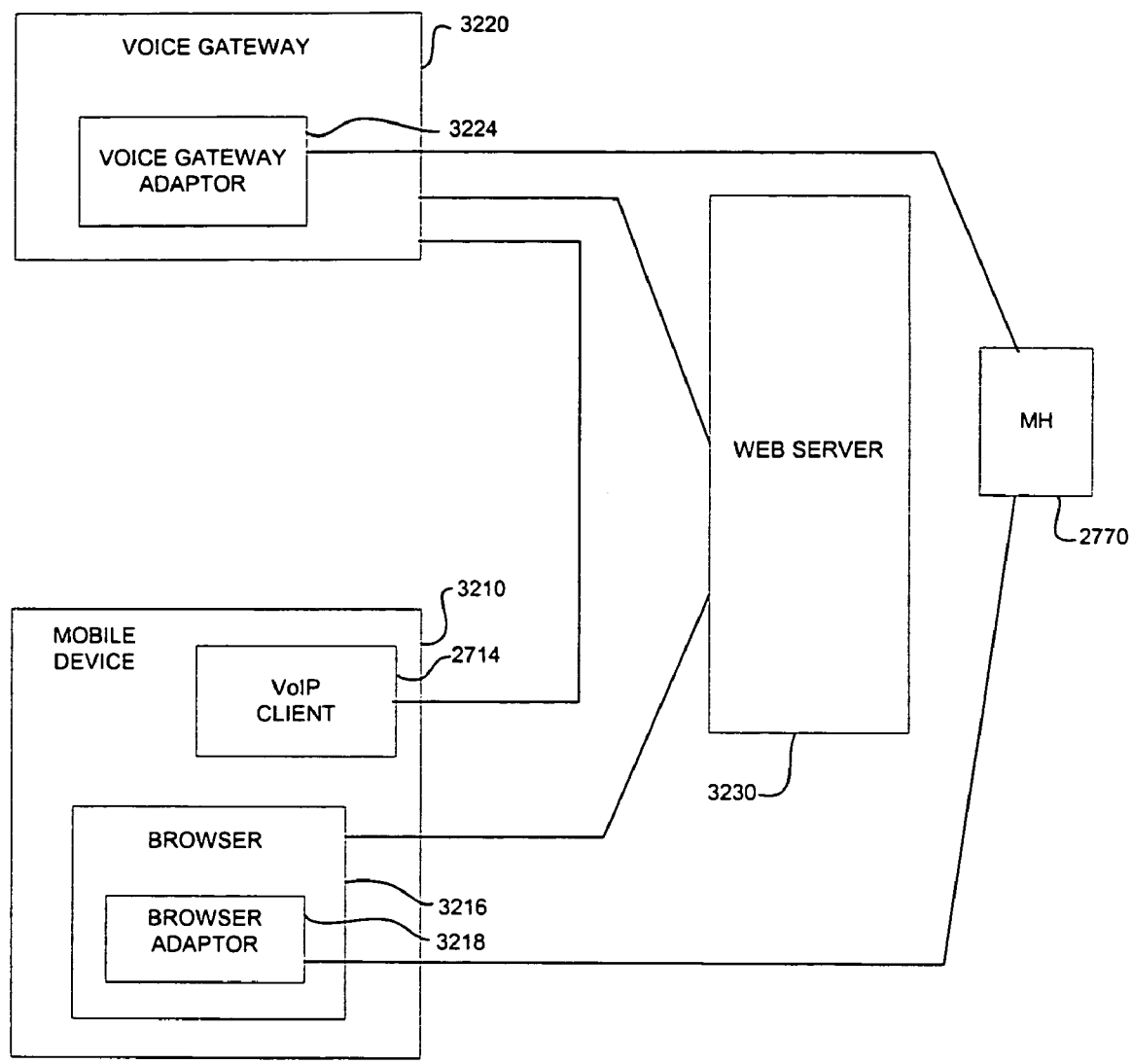
FIG. 32 is another example of a decentralized system.

Referring to FIG. 32, a system 3200 includes a modified mobile device 3210 that includes VoIP client 2714 and a modified browser 3216 having a modified browser adaptor 3218. System 3200 includes a modified voice gateway 3220 that is coupled to VoIP client 2714 and that includes modified voice gateway adaptor 3224. System 3200 includes a modified web server 3210 that does not include an adaptor and that is coupled to both browser 3216 and voice gateway 3220. System 3200 further includes messaging handler 2770 coupled to both browser adaptor 3218 and voice gateway adaptor 3224. Messaging handler 2770 does not communicate with web server 3210.

Browser 3216 and voice gateway 3220 are modified in that they can each send information to, and receive information from, browser adaptor 3218 and voice gateway adaptor 3224, respectively. Browser 2716 and voice gateway 2720, conversely, only receive information from browser adaptor 2718 and voice gateway adaptor 2724, respectively. As indicated above, web server 3230 is modified from web server 2750 in that web server 3230 does not include an adaptor nor include functionality associated with using an adaptor. Accordingly, web server 3230 does not publish messages.

Messages are published, as well as received, by voice gateway adaptor 3224 and browser adaptor 3218. More specifically, when browser 3216 receives input from a user requesting a HTML page, browser 3216 publishes (using browser adaptor 3218) a message to the unique messaging channel with the URL of the requested HTML page. Voice gateway adaptor 3224 receives the message and instructs voice gateway 3220 to request the corresponding VXML page from web server 3230. Referring again to process 2900, instead of the server publishing the URL to the voice gateway adaptor in operation 2975, browser adaptor 3218 publishes the URL. Analogously, when voice gateway 3220 receives input from VoIP client 2724 requesting a VXML page, voice gateway 3220 publishes (using voice gateway adaptor 3224) a message to the unique messaging channel with the URL of the requested VXML page. Browser adaptor 3218 receives the message and instructs browser 3216 to request the corresponding HTML page from web server 3230.

Browser adaptor 3218 and voice gateway adaptor 3224 may use the mechanisms described earlier to detect or obtain an IP address of mobile device 3210, or a user ID or device ID. Further, a login procedure may be used including, for example, a user entering login information into browser 3216 and voice gateway 3220 (using, for example, VoIP client 2727). Such login information may be used by web browser 3230 (or some other component(s)) to authenticate and uniquely identify the user. A login procedure also may be used with the earlier implementations described for systems 2800 and 3000.

System 3200 may be used to illustrate selected aspects of process 3100. In system 3200, mobile device 3210 may receive a request for a HTML page from a user (3110). Mobile device 3210 may send the URL of the requested HTML page to voice gateway 3220 in a message, with the URL allowing voice gateway 3220 to request the corresponding VXML page (3120). Mobile device 3210 may send the message using browser adaptor 3218, messaging handler 2770, and voice gateway adaptor 3224. Alternatively, in an implementation in which the URL for the HTML page is not the same as the URL for the corresponding VXML page, mobile device 3210 may determine the URL for the corresponding VXML page (3130) and send the URL for the corresponding VXML page in the message to voice gateway 3220. Mobile device 3210 may send a second message including the URL of the requested HTML page, with the second message going to a third-modality device and the sent URL allowing the third-modality device to request the corresponding third-modality data (3170).

In another example using system 3200, voice gateway 3220 may receive a request for a VXML page (3110). Voice gateway 3220 may send the URL of the requested VXML page to browser 3216 in a message, the URL allowing browser 3216 to request the corresponding HTML page (3120). Voice gateway 3220 may send the message using voice gateway adaptor 3224, messaging handler 2770, and browser adaptor 3218. Alternatively, in an implementation in which the URL for the HTML page is not the same as the URL for the corresponding VXML page, voice gateway 3220 may determine the URL for the corresponding HTML page (3130) and send the URL for the corresponding HTML page in the message to browser 3216. Voice gateway 3220 may send a second message including the URL of the requested VXML page, with the second message going to a third-modality device and the sent URL allowing the third-modality device to request the corresponding third-modality data (3170).

Figure 33:
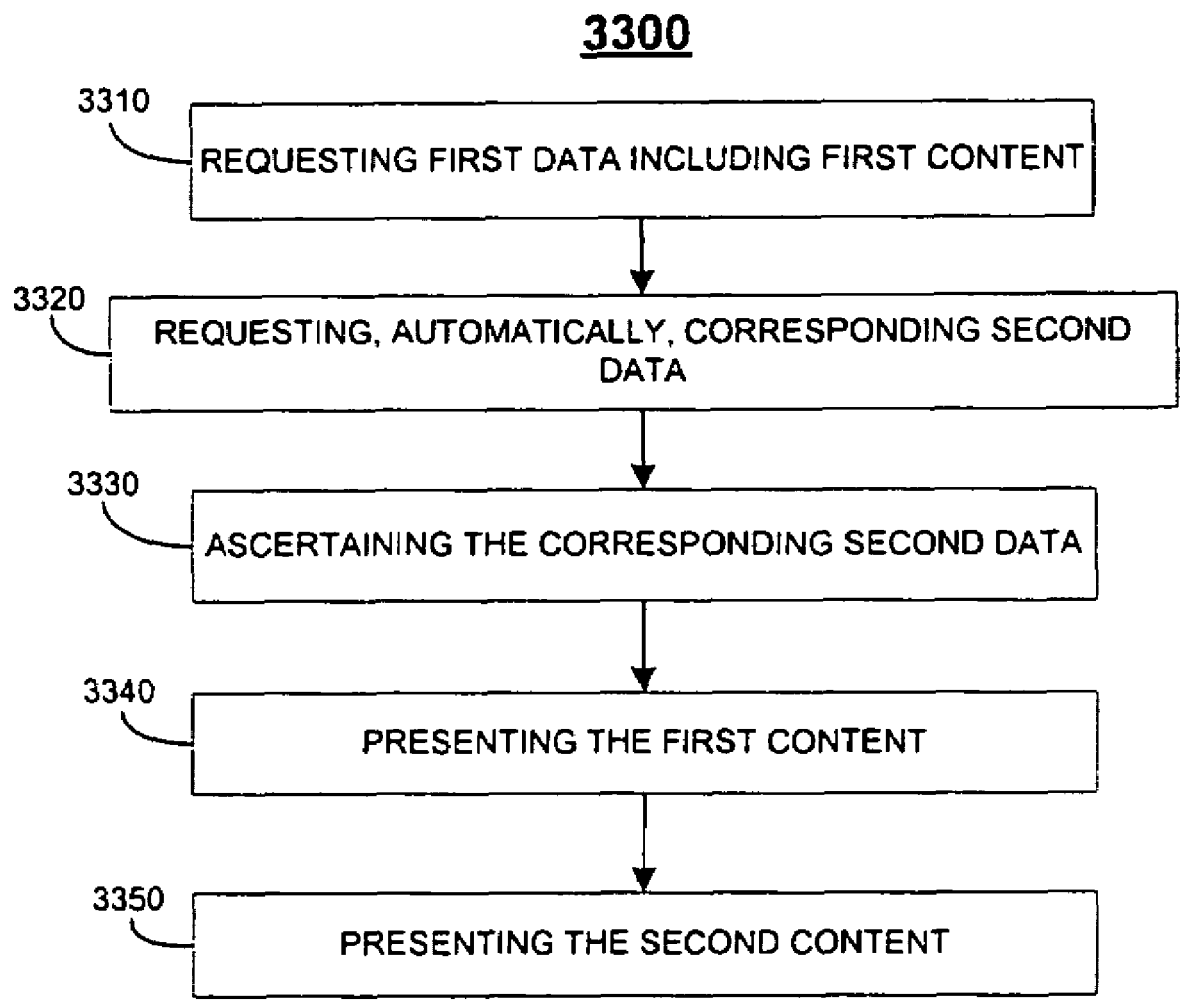
FIG. 33 is an example of a process for requesting synchronizing data.

Referring to FIG. 33, a process 3300 for requesting synchronizing data includes requesting first data for a first modality, with the first data including first content (3310). Process 3300 includes requesting, automatically after requesting the first data, corresponding second data for a second modality (3320). Corresponding second data includes second content that overlaps the first content, and the first modality may be synchronized with the second modality by presenting the first content and the second content to a user in such a manner that the user may respond to the overlapping content using either the first modality or the second modality.

Process 3300 includes ascertaining the corresponding second data (3330). The corresponding data may be ascertained by, for example, receiving information indicating the corresponding second data, or determining the corresponding second data based on the first data.

Process 3300 includes presenting the first content to a user using the first modality (3340) and presenting the second content to the user using the second modality (3350). The first content and the second content may be presented to the user in an overlapping time period in which the user may respond to the overlapping content using either the first modality or the second modality.

Process 3300 may be illustrated by, for example, system 3200. In system 3200, mobile device 3210 may request a VXML page (3310), the request being made to voice gateway 3220 using VoIP client 2727. Mobile device 3210 may thereafter automatically request the corresponding HTML page from web server 3230 (3320). Mobile device 3210 may receive the URL of the corresponding HTML page from voice gateway adaptor 3224 (3330), with the URL being received in a message at browser adaptor 3218. Mobile device 3210 may present the requested VXML page to a user using VoIP client 2727 and a speaker (3340), and may present the corresponding HTML page to the user using browser 3216 (3350).

Various operations of process 3300 also may be performed by, for example, proxy or fused implementations. In a proxy implementation, for example, a synchronization controller requests a HTML page from a web server (1120; 3310), and the synchronization controller requests the corresponding VXML page (1270; 3320). In a fused implementation, for example, a synchronization controller requests a HTML page from a web server (840; 3310), and the synchronization controller requesting the corresponding VXML page by passing an identifier of the corresponding VXML page to a voice mode system (830; 3320). More generally, in a fused implementation, for example, a device 730: (i) requests a HTML page (840; 3310), (ii) determines the corresponding VXML page (820; 3330), (iii) requests the corresponding VXML page (830; 3320), (iv) presents the requested HTML page after receiving the HTML page (see 850; 3340), and (v) presents the corresponding VXML page after accessing the VXML page (see 860; 3350).

Similarly, various operations of process 3300 also may be performed by one or more components in any of the server-push, browser-pull, voice-interrupt listener, or no-input tag implementations described earlier.

Figure 34:
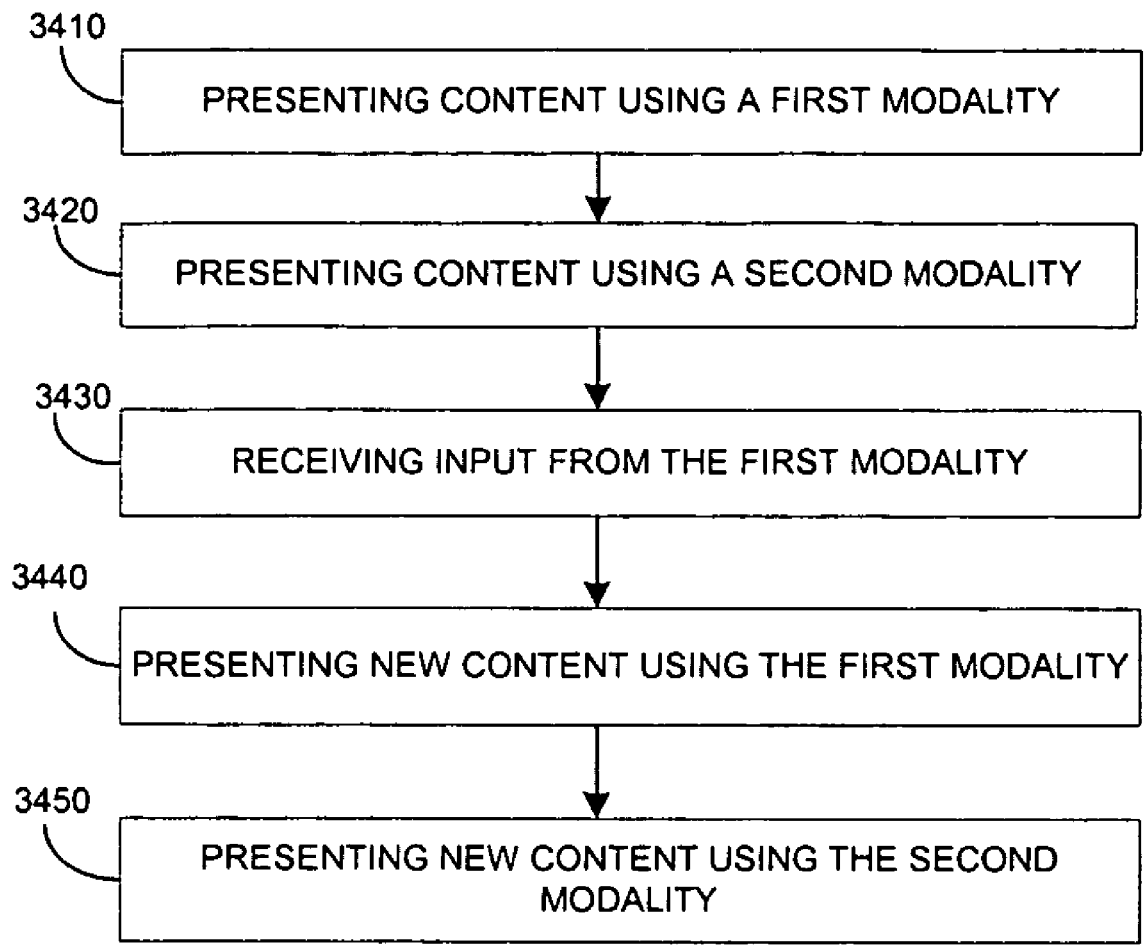
FIG. 34 is an example of a process for presenting updated data in different modalities.

Referring to FIG. 34, a process 3400 for presenting updated data in different modalities includes presenting content using a first modality (3410). Process 3400 also includes presenting the content using a second modality (3420) and receiving input in response to presenting the content, with the input being received from the first modality (3430). Process 3400 includes automatically presenting new content using the first modality in response to receiving the input, with the new content being determined based on the received input (2270). The new content is automatically presented using the second modality in response to receiving the input from the first modality (3450).

The above description of the operations in process 3400 use the term "content" in a slightly different manner than the description of the operations in processes 3100 and 3300. "Content" still generally refers to information that is presented to a user or that a user may be seeking, for example, the information that is displayed from a web page. However, process 3400 refers merely to the overlapping content that is presented by both modalities.

Implementations of each of the various devices, mobile or otherwise, may be used to illustrate process 3400. For example, considering system 3200, (i) mobile device 3210 may present a HTML page (3410), (ii) browser 3216 may inform voice gateway 3220 of the presented HTML page, (iii) voice gateway 3220 may request a corresponding VXML page, (iv) mobile device 3210 may present the corresponding VXML page (3420), (v) mobile device 3210 may receive a stylus input at browser 3216 requesting a new HTML page (3430), (vi) mobile device 3210 may present the new HTML page (2270), (vii) browser 3216 may inform voice gateway 3220 of the presented new HTML page, (viii) voice gateway 3220 may request the corresponding new VXML page, and (ix) mobile device 3210 may present the corresponding VXML page (3450).

Additional Implementations and Variations

Referring again to system 2700 of FIG. 27, implementations may include multiple mobile devices 2710 and 2730, multiple voice gateways 2720 and 2740, and/or multiple web servers 2750 and 2760, as shown. Implementations also may include multiple messaging handlers. Further, the coupling between components may vary depending on the implementation. For example, a voice gateway may support multiple mobile devices (and users), a messaging handler may be dedicated to a subset of components, and web servers and other components may have direct connections (physical or logical) to other components or may share a bus or other communication medium. Communication media may include, for example, wired, wireless, optical, and other media.

Implementations also may include having multiple users interact with one or more synchronized modalities, and the modalities may present information at a single device or at different devices. In one implementation, two users are remote to each other and are using different devices, with each device supporting at least one modality (possibly the same on each device). Either user can respond to the information presented at the user's one or more respective devices, and thereby modify the information that is subsequently presented at both users' devices. In another implementation, one of the users does not have the capability or authorization to respond to the presented data, but can observe or monitor the data. Such an implementation may be useful where the observing user is a supervisor and the other user is an employee, or where the observing user is a trainee and the other user is a trainer (or vice versa). In another implementation, each user has a different modality, allowing, for example, a supervisor or trainer to respond to data using only voice and the employee or trainee to respond using only a browser interface.

The mobile devices 2710 and 2730, or other devices, need not use a VoIP client 2727 and 2734 to communicate with a voice gateway. In one implementation, a device performs feature extraction on the device and communicates the resulting data to a voice gateway. The feature extraction may be performed by one or more components constituting a feature extraction unit. The communicated data may be communicated over an IP connection, an HTTP connection, or otherwise, and the voice gateway may perform a recognition process using an appropriate grammar. By performing the feature extraction, rather than transmitting the voice directly, the device reduces the required bandwidth between the device and the voice gateway, and accordingly this implementation can be used effectively with lower-bandwidth communication links.

Referring again to system 3000 of FIG. 30, in various implementations the function of firewall 3010 may be performed by, for example, a proxy, a gateway, or another intermediary. Implementations may use multiple intermediaries in various configurations.

An implementation may include any number of modalities, and the number of modalities may be, for example, fixed, variable but determined, or variable and unknown. The number of modalities may be fixed beforehand in a system, for example, that is specifically designed to support mobile devices communicating with a browser and voice and using two modalities. The number of modalities also may be variable but determined during an initial connection or power-up by a mobile device by, for example, having the system query a user for the number of modalities to be used.

The number of modalities also may be variable and unknown. For example, each modality gateway that is connected or powered-up may detect the IP address or user ID and subscribe to the unique messaging channel on the appropriate messaging handler. After subscribing, each modality gateway may receive all messages published, with each message (i) indicating, for example, that one of the modalities has been provided with new data, and (ii) providing information allowing the other modalities to synchronize. In an implementation in which a server publishes the messages, as each modality gateway synchronizes, the new session may be associated with the unique messaging channel.

In implementations that include multiple servers, a first server may provide information to a second server, for example, to facilitate association of sessions. A server may be enabled to provide multi-modal synchronization service as well as standard single-modal service.

In implementations that include multiple messaging handlers, the components that publish the synchronizing messages may publish on all messaging handlers. Alternatively, the components that publish may communicate with each other to ensure that messages are published on all of the messaging handlers to which active modality gateways are subscribed.

The implementations and features described may be used to synchronize data that includes navigation commands and/or non-navigation commands. Providing corresponding data for non-navigation commands may include, for example, having a component enter text, change a preference, or provide a focus in another modality.

Examples of various modalities include voice, stylus, keyboard/keypad, buttons, mouse, and touch for input, and visual, auditory, haptic (including vibration), pressure, temperature, and smell for output. A first modality may be defined as including voice input and auditory output, and a second modality may be defined as including manual input and visual and auditory output. A modality also may be restricted to either input or output.

Interfaces for various modalities may include, for example, components that interact with a user directly or indirectly. Directly interacting components may include, for example and as previously described, a speaker. Indirectly interacting components may include, for example, a VoIP client that communicates with the speaker.

Various implementations perform one or more operations, functions, or features automatically. Automatic refers to being performed substantially without human intervention, that is, in a substantially non-interactive manner. Examples of automatic processes include a process that is started by a human user and then runs by itself, or perhaps requires periodic input from the user. Automatic implementations may use electronic, optic, mechanical, or other technologies.

Figure 35:
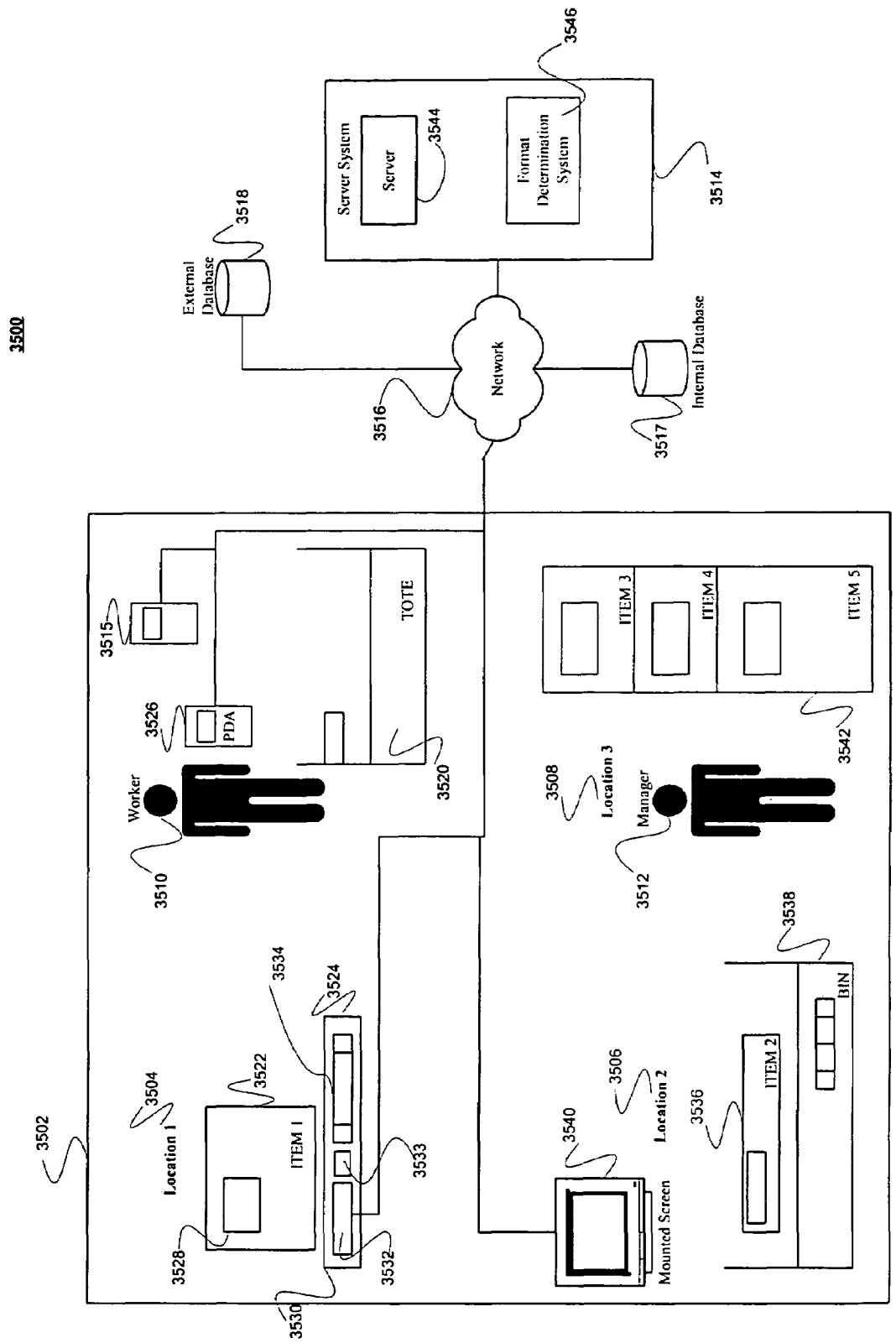
FIG. 35 is a block diagram of a multimodal warehousing system.

FIG. 35 is a block diagram of a multimodal warehousing system 3500. In FIG. 35, a warehouse 3502 includes a first location 3504, a second location 3506, and a third location 3508, at each of which a worker 3510 or a manager 3512 may perform various tasks. More generally, it should be understood that the warehouse 3502 represents one or more warehouses for storing a large number of products for sale in an accessible, cost-efficient manner. For example, the warehouse 3502 may represent a site for fulfilling direct mail orders for shipping the stored products directly to customers. The warehouse 3502 also may represent a site for providing inventory to a retail outlet, such as, for example, a grocery store. The warehouse 3502 also may represent an actual shopping location, i.e., a location where customers may have access to products for purchase. In this context, the locations 3504, 3506, and 3508 represent particular sites within the warehouse 3502 at which one or more products are shelved or otherwise stored, and are used below to illustrate particular functionalities of the multi-modal warehousing system 3500.

In FIG. 35, an enterprise system, including a server system 3514, is in communication with a mobile computing device 3515 via a network 3516. The server system 3514 includes an inventory management system that stores and processes information related to items in inventory. The server system 3514 may be, for example, a standalone system or part of a larger business support system, and may access (via the network 3516) both internal databases 3517 storing inventory information and external databases 3518 which may store financial information (e.g. credit card information). Although not illustrated for the sake of clarity, access to the internal databases 3517 and the external databases 3518 may be mediated by various components, such as, for example, a database management system and/or a database server.

Locations 3504, 3506, and 3508 and/or associated storage containers may be associated with different item types. The storage location of an item may be associated with a location and/or storage container by the server system 3514. As a result, the server system 3514 may provide the worker 3510 or the manager 3512 with, for example, suggestions on best routes to take to perform warehousing tasks.

For example, the server system 3514 may provide the mobile computing device 3515 with information regarding items that need to be selected from a storage area. This information may include one or more entries in a list of items that need to be selected. The entries may include a type of item to select (for example, ¼" phillips head screwdriver), a quantity of the item (for example, 25), a location of the item (that is, stocking location), and an item identifier code. Other information, such as specific item handling instructions, also may be included.

Warehouses such as the warehouse 3502 often are very large, so as to store large numbers of products in a cost-efficient manner. However, such large warehouses often provide difficulties to the worker 3510 attempting to find and access a particular item or type of item in a fast and cost-effective manner, for example, for shipment of the item(s) to a customer. As a result, the worker 3510 may spend unproductive time navigating long aisles while searching for an item type.

Additionally, the size and complexity of the warehouse 3502 may make it difficult for the manager 3512 to accurately maintain proper count of inventory. In particular, it may be the case that the worker 3510 fails to accurately note the effects of his or her actions; for example, failing to correctly note the number of items selected from (or added to) a shelf. Even if the worker 3510 correctly notes his or her activities, this information may not be properly or promptly reflected in the inventory database 3517.

These difficulties are exacerbated by the need for the worker 3510 to use his or her hands when selecting, adding, or counting items, i.e., it is difficult for the worker 3510 to simultaneously access items on a shelf and implement some type of item notation/tracking system. Although some type of voice-recognition system may be helpful in this regard, such a system would need to be fast and accurate, and, even so, may be limited to the extent that typical warehouse noises may render such a system (temporarily) impracticable.

In consideration of the above, the warehouse system 3500 allows the worker 3510 multimodal access to warehouse and/or inventory data, and automates warehouse functionality when possible and practical. Examples of these multimodal techniques and capabilities, as well as associated automated functionalities, are discussed in detail below with reference to the locations 3504, 3506, and 3508 of the warehouse 3502.

At the first location 3504, for example, the worker 3510 may use a tote 3520 to collect, or "pick," a first item 3522 from a shelf 3524. The mobile computing device 3515 may be a portable device, such as a personal digital assistant ("PDA") 3526, that may be small enough to be carried by a user without occupying either of the hands of the user (e.g., may be attached to the user's belt). The PDA 3526 may receive item entries from the enterprise system 3514. In one implementation, all of the item entries may be downloaded at one time and stored as a "pick list" (that is, a list of items to select or pick) in the memory of the PDA 3526. The pick list may list the item entries in a predetermined order associated with the location of the items in the storage area. For example, the order of the item entries may correspond to an item selection order that optimizes the efficiency of the path taken by the user as he or she picks items in the storage area.

Alternatively, the pick list may be stored in the server system 3514, and item entries may be downloaded to the PDA 3526 one at a time from the server system 3514. In this case, the next item entry is not accessed until the current item entry has been processed (that is, the items corresponding to the entry have been picked). The item entries also may be provided to the PDA 3526 a single entry at a time in a predetermined order associated with the location of the items in the storage area.

Inventory information also may be accessed by reading an RFID tag 3528 on the first item 3522. More specifically, the worker 3510 may access information about first item 3522 by interacting with a "smart" shelf 3530 enabled with an RFID tag 3532, RFID reader 3533, and a bar code 3534. For example, the smart shelf 3530 may detect the absence of the item 3522 using the RFID reader 3533. The detection of the absence of an item 3522 may be useful in situations related to high value items. For example, the worker 3510 may query the server system 3514 for the location of a possibly misplaced item. The smart shelf may be used to implement an automated inventory maintenance system. In addition, instead of (or along with) using RFID, the smart shelf 3530 may be implemented using other sensors, such as, for example, a weight-based sensor or an image detection system.

Using the above techniques, along with those discussed in more detail below, the worker 3510 may efficiently move throughout the warehouse 3502 while collecting, counting, or distributing items. Results of these actions may be promptly and accurately reported to the server system 3514, so that inventory information is accurate and up to date.

In another example, at the second location 3506, the worker 3510 may place a second item 3536 into a bin 3538 (or some other storage location, such as a shelf), in a process referred to herein as "stocking." The worker may use a mounted screen 3540 to receive information from the server system 3514 about the item being stocked, where this information may include, for example, location and quantity information about the item. The location information may be displayed in the form of visual location information, such as, for example, a map. Again, the worker 3510 also may use the PDA 3526 to access or input information while performing the stocking functionality. Thus, items may be distributed throughout the warehouse in an efficient manner.

In a third example, at the third location 3508 the manager 3512 may take a count, or "inventory," of items 3542. The manager 3512 may use the PDA 3526 or the mounted screen 3540 to update the internal warehouse databases 3517 via the server system 3514. The manager 3512 also may receive directions from the server system 3514 about how to conduct the inventory. For example, the server system 3514 may instruct the manager 3512 on which items to count, and/or in what order.

The techniques described above for enabling multimodal capabilities may be implemented in the picking, stocking, or counting techniques just described. For example, the server system 3514 may include a server 3544 and a format determination system 3546, which may generally represent, for example, the server system 110 and synchronization controller 120 of FIG. 1. Similarly, the format determination system may be implemented in the PDA 3526, as shown, for example, in FIG. 7. Thus, and as described in more detail below, the worker 3510 and/or manager 3512 may have simultaneous access to various different modes of input/output, so as to increase the ease and efficiency of their duties.

For example, in the picking scenario, the worker 3510 may use a voice-recognition functionality to notify the server system 3514 of the worker's current location or job status. This ability allows the hands of the worker 3510 to remain free for selecting items for placement into the tote 3520. If voice input becomes non-preferred (for example, if the worker 3510 enters a noisy area of the warehouse 3502), then other modalities will be available to the worker 3510, such as the bar code 3535 or stylus input into the PDA 3526. Additionally, the worker 3510 may print an order from the PDA 3526 before entering a noisy warehouse area. As discussed below, similar advantages exist in, for example, stocking and counting scenarios. Additionally, the techniques described above for enabling multimodal capabilities may be implemented in various scenarios associated with a warehouse environment. For example, the techniques may be implemented in moving, shipping, and receiving scenarios.

Although FIG. 35 is a block diagram of a multimodal warehousing system, other implementations may include fewer, additional, and/or different arrangements of components. For example, a mulitmodal warehousing system may include any apparatus that operates as an integration and communication platform to communicate between technologies including, for example, RFID, bar code recognition, voice recognition, mobile devices, mobile operating systems, pick-to-light systems, and automatic speech recognition (ASR).

Figure 36:
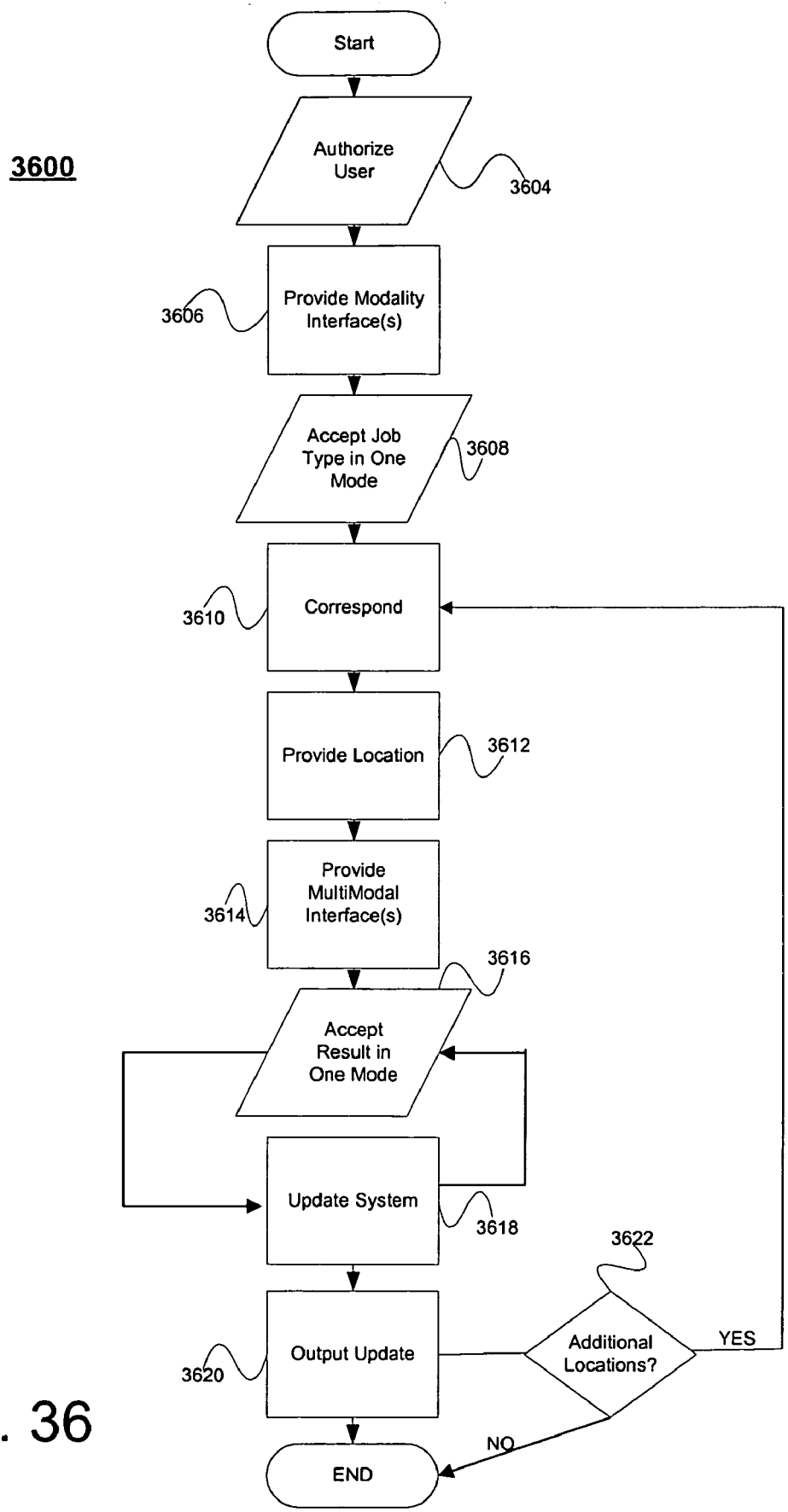
FIG. 36 is a flow chart illustrating server interactions in the system of FIG. 35.

FIG. 36 is a flow chart of a process 3600 enabling the server system 3514 to interact with mobile and stationary devices in a warehouse environment. In FIG. 36, a user of the mobile or stationary device is authorized to perform warehouse duties (3604). This authorization may include, for example, having the user enter a name and password. This information is verified by the server system 3514. The server system 3514 then provides multi-modal interfaces to the mobile or stationary device (3606). For example, the server may enable both voice and stylus input at a mobile device of the user, so that the user may input information described below.

The user requests a job type in a chosen mode, e.g., using voice input (3608). The job type may include, for example, selection of item(s) for stocking, picking, or counting (taking inventory). The server system 3514 then corresponds the information received from the user (3610) to the information in the internal warehouse databases 3516. For example, as described above with respect to FIGS. 1 and 2 in the context of HTML and VXML, it may be necessary to correlate a response to a job type request received in HTML by way of a stylus input with response data formatted in VXML, so as to continuously provide the user with the option of using both stylus and voice inputs as the user communicates over time with the server system 3514.

The server system 3514 subsequently provides a location at which the user will perform functions related to the user-chosen job type (3612). The server system 3514 provides this location information via multimodal interfaces (3614) using the format determination system 3546 in the server system 3514, seen in FIG. 35.

For example, having received an HTML request for a picking job to obtain item 1 3522, the server 3544 may output information related to the first location 3504 in HTML and VXML. The worker 3510 may indicate arrival at the first location 3504 by stylus or voice input to the PDA 3526, or by scanning the bar code 3524, and placement of the item 3522 into the tote 3520 may be recognized by way of the RFID tag 3532. Thus, more generally, the server system 3514 accepts the result of the user's task in a user chosen one of a plurality of available modes (3616). The server system 3514 updates related systems, for example, in the internal warehouse databases 3517 and the external databases 3518 (3618). The server system 3514 then outputs the update to the user in multimodal interfaces (3620). For example, the server system 3514 may update the database 3516 to reflect that the item 3522 has been removed.

If additional locations are needed (3622), the next location may be output to the worker 3510. It should be understood, of course, that all locations may be provided to the worker 3510 in the first instance, rather than iteratively.

More generally, multiple applications in warehouse environments may be built upon a multi-modal architecture. Such an architecture may include multiple gateways as described earlier. The modalities may be synchronized using the format determination system 3546, and/or other components performing various of its functions, may be located in one or more of the portable device, the server, or an intermediary, as described earlier. The enterprise system (described above) may correspond to a server, and data may be formatted in a mark-up language as is common in Internet applications, such as, for example Speech Application Language Tags (SALT) or XHTML+Voice (X+V), or in another format.

The multi-modal architecture and the ability to synchronize various modes of input and output provide a framework which is easily extendable to various application environments. In the warehouse environment, for example, a "page" such as a pick list can be output to a user in various modes (for example, display and voice) and input relating to an item on the page can be input from various modes (for example, stylus, voice, bar code, RFID tag). Synchronization of the different modes may occur at, for example, one or more of a mobile device, an enterprise system, or an intermediary device.

In one example of the picking implementation, a web application on the server 3544 is designed to provide the worker 3510 with a pick list and associated instructions, and to receive feedback from the worker 3510. The information of the pick list is provided in an HTML (hyper-text mark-up language) format to a browser on the PDA 3526 for input/output using the browser. The information of the pick list is also provided in a VXML (voice extensible markup language) format to a voice gateway that communicates with the mobile device for input/output using a microphone and a speaker on the mobile device. The implementation also provides communication between the enterprise system and an RFID gateway. The RFID gateway receives input from an RFID reader on a cart, for example, indicating items that have been placed into the tote 3520 on the cart. The web application queries the RFID gateway periodically to determine what items have been placed in the tote and updates the pick list information accordingly. The web application then provides the browser and the voice gateway with the updated pick list, and the browser and voice gateway update their output to the user accordingly.

In other implementations, the RFID gateway may send the information to the web application rather than being queried. The RFID gateway may receive the information of the pick list from the server and process the input from the RFID reader accordingly to update the pick list, and then send the updated pick list back to the server. The RFID gateway may, alternatively, simply send the input from the RFID reader to the web application (or some intermediary) and rely on the web application to integrate the input from the RFID reader with the pick list.

The RFID gateway may receive input from multiple RFID readers. The RFID gateway, or the web application, can maintain responsibility for associating a given RFID reader with a given tote or cart, for example. Such associations may be made, for example, during a setup procedure when a user is first given a pick list and a tote.

Communication between various of the gateways and the server may be facilitated or enabled by a message handler, such as the message handler 2770 of FIG. 27. The modalities used for input and output in various environments and applications may be interchanged. Unless otherwise indicated, modalities available for one environment and application are also available for other environments and applications.

It should be understood from the above description that the multi-modal capabilities of the warehousing system 3500 enable fast, convenient, and efficient implementation of the duties of the worker 3510. Moreover, the system 3500 enables real-time, accurate updating of inventory data. These capabilities and advantages are provided across a number of job types and device types, as discussed in more detail below with respect to FIGS. 37-42 and associated examples.

Figure 37:
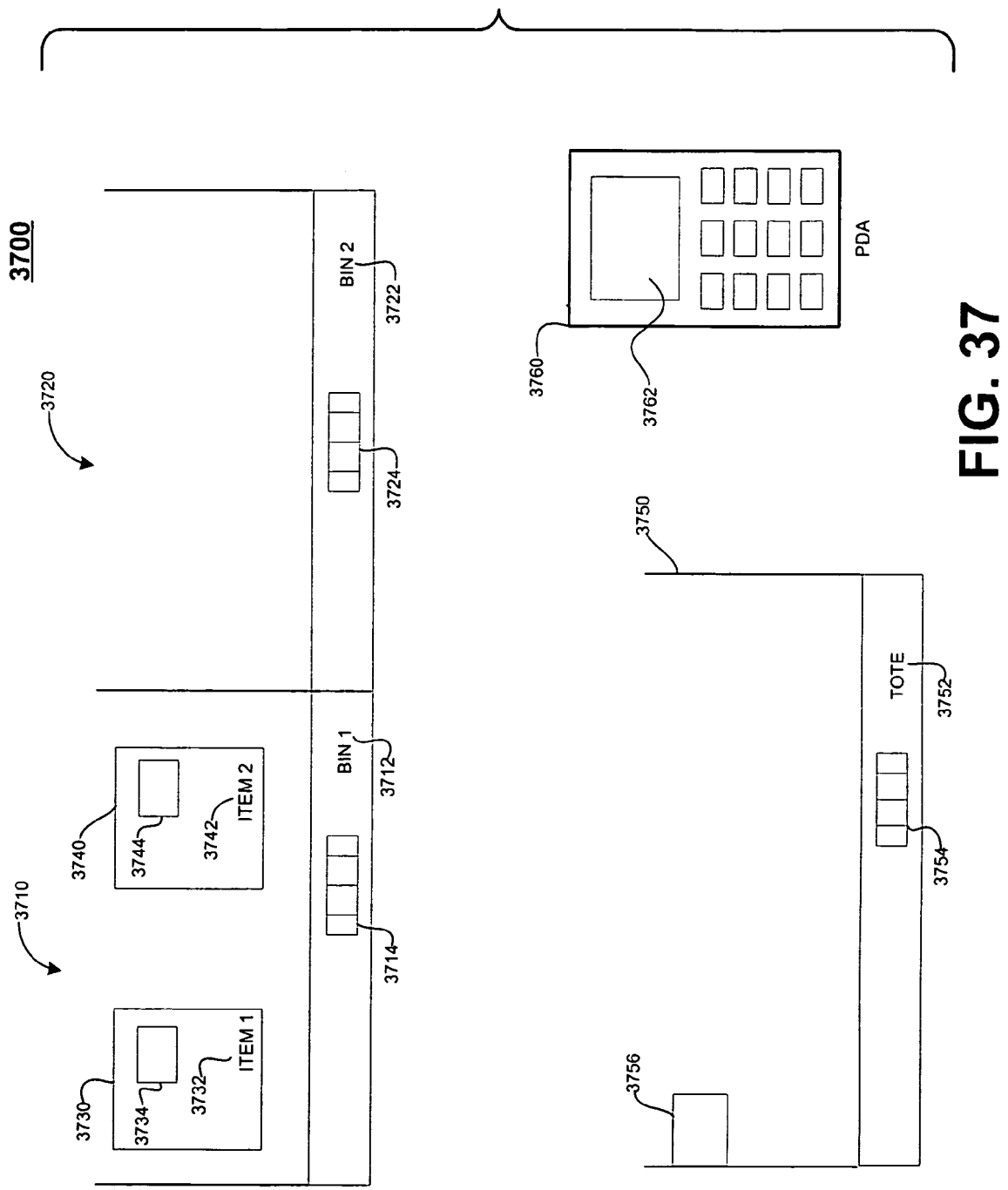
FIG. 37 is a block diagram illustrating item selection techniques.

FIG. 37 shows a system 3700 for selecting an item. A first bin 3710 is shown having a label 3712 of "Bin 1" and a bar code 3714. A second bin 3720 is shown next to bin 3710, with second bin 3720 having a label 3722 of "Bin 2" and a bar code 3724.

Within first bin 3710 is a first item 3730 having a label 3732 of "Item 1" and a radio-frequency identification ("RFID") tag 3734. RFID tag 3734 includes a transmitter and, optionally, as explained below, a receiver and/or processing capability. First bin 3710 also contains a second item 3740 having a label 3742 of "Item 2" and an RFID tag 3744.

System 3700 includes a tote 3750 for collecting items that are selected by, for example, a person or a machine (a "picker"), such as the worker 3510. Tote 3750 includes a label 3752 of "Tote," a bar code 3754, and a communication device 3756, such as, for example, an RFID reader for communicating with RFID tags. Generally speaking, the tote 3752 may represent any device for carrying items, such as, for example, a cart (including a shopping cart that may be used in a retail environment).

System 3700 includes a portable digital assistant ("PDA") 3760 including a display 3762. As described above, the PDA 3760 may be used by the worker 3510 to provide multimodal access to the server system 3514, and in conjunction with the RFID tags, bar codes, and other labels and devices described above.

Figure 38A:
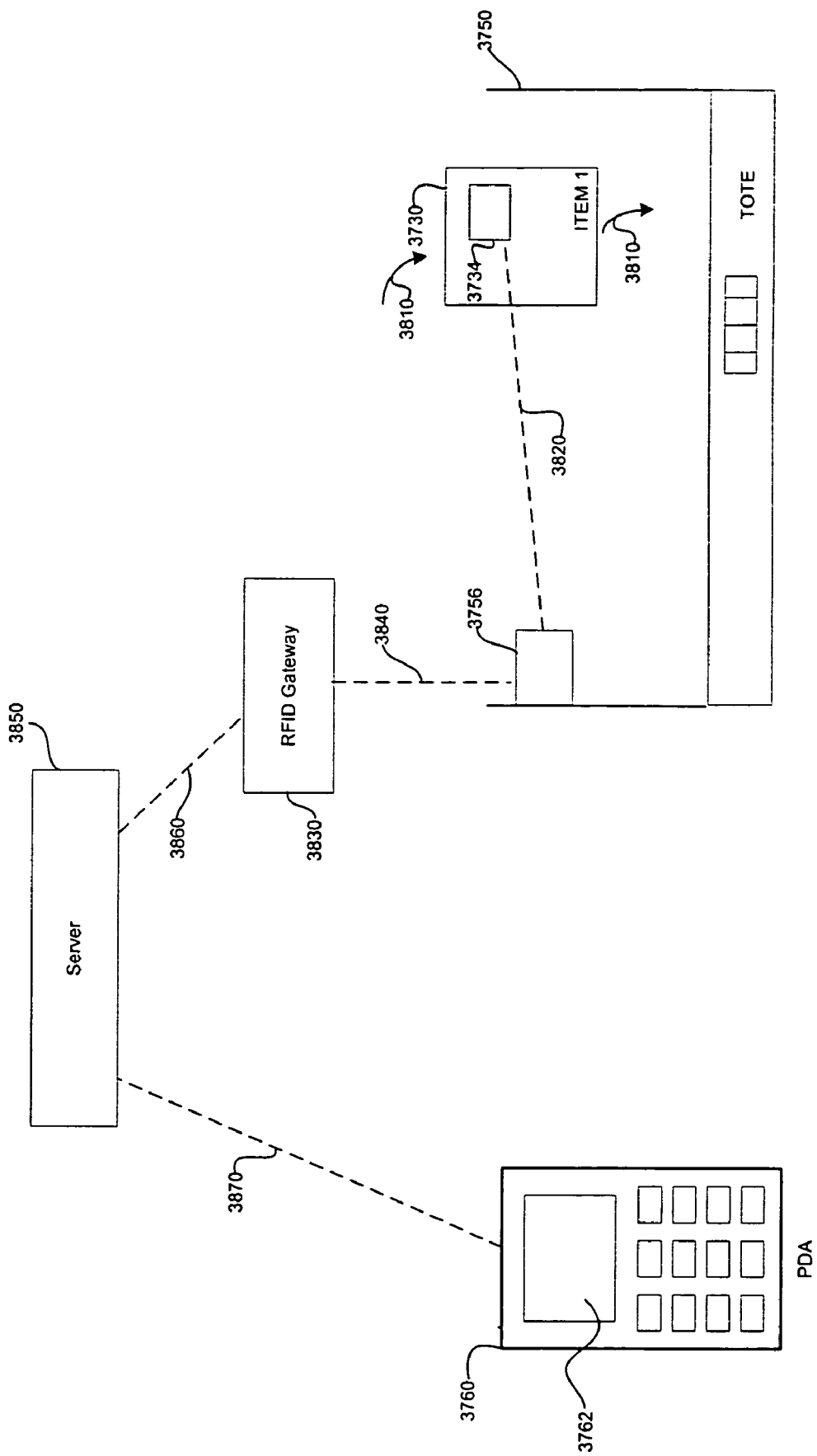
FIG. 38A is a block diagram further illustrating the item selection techniques of FIG. 37.

FIG. 38A shows several elements of system 3700 as first item 3730 is being placed into tote 3750. Arrows 3810 indicate that the first item 3730 is being placed into the tote 3750. When the first item 3730 is close enough to tote 3750, the RFID tag 3734 communicates with the device 3756 to identify the item 3730. Communication between RFID tag 3734 and device 3756 is indicated by a dashed line 3820.

Device 3756 then communicates with an RFID gateway 3830 (explained more fully below), with the communication being indicated by a dashed line 3840. RFID gateway 3830 communicates with a server 3850, as indicated by a dashed line 3860, to update a record, such as, for example, a pick-list. Server 3850 communicates with PDA 3760, as indicated by a dashed line 3870, to provide the updated record. Alternate implementations may incorporate many of the functions of server 3850 into PDA 3760, as discussed herein.

In the system 3700, the warehouse picking process, or the process of placing/counting inventory in a warehouse (such as in restocking returned items or replenishing the inventory of items), may begin with an instruction to the picker (i.e., worker 3510) via voice prompts to go to a certain aisle/bin, and pick (or select or count) a certain quantity of items. The picker may be operating hands-free using, for example, a headset, ear bud, or other device. The picker may confirm a current location by reading out the numbers 3712/3722 on the bin, or by scanning the bar-coded label 3714/3724 on the bin. The picker may read instructions on the PDA 3760 or an overhanging display associated with a particular bin or group of bins (i.e., it should be understood that the above-described multi-modal architecture(s) may split modalities for the same user across multiple devices).

The PDA 3760 or display also may provide the picker with updated display information that acknowledges the picker's voice confirmation. For example, the display may show the pick-list with a checkmark next to the item on the pick-list that the picker just picked, and the checkmark may be placed on the display automatically in response to the picker's voice confirmation that that item was picked. Displaying a portion of the pick-list that includes more than the current item may be useful in determining which items have been picked and how many remain to be picked, and may reduce picking errors or the incidence of needing to repeat instructions. The picker may confirm using, for example, stylus/keypad and/or voice.

Various features, such as allowing the picker to operate hands-free or providing the picker with an updated display of the entire pick list, may allow the picker to operate more quickly, with fewer errors, and with fewer commands needing to be repeated.

In one implementation(s), voice confirm may be performed with phonetically 'distant' words. That is, instead of reading out the bin numbers, the picker may read out words (associated with and displayed on the bins, for example) that are phonetically distinctive to improve recognition thereof by the associated voice-recognition system.

Figure 38B:
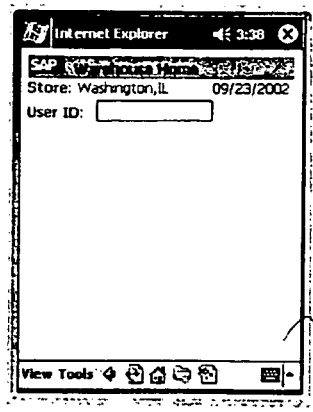
FIG. 38B-F are screenshots illustrating an item-picking process.
Figure 38C:
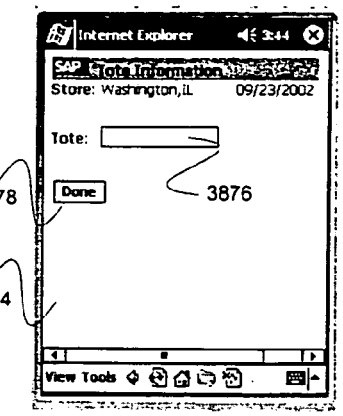
Figure 38D:
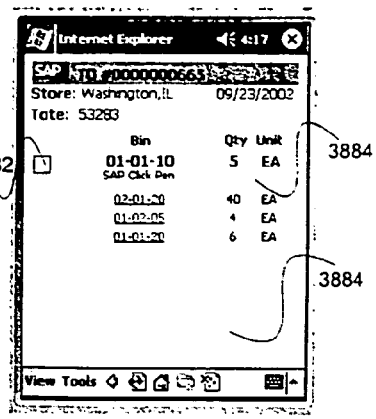

An implementation of a particular pick list is depicted in FIGS. 38B-38F. In FIG. 38B, the worker 3510 may hear: "Enter your User ID" when they see a first screen 3872. If a resulting spoken ID is correct, a second screen 3874 shown in FIG. 38C may result (there also may be other requirements, such as a password, entered using the stylus/keypad). As the screen 3874 comes up, the worker 3510 may hear: "Please scan or enter the tote number." The worker 3510 may then scan the barcode label 3754 on the tote 3750 by using the barcode scanner in the mobile device 3760. The worker 3510 also may enter the tote number 3752 into a field 3876 using the stylus or the keypad, and then say or click a first "Done" button 3878. At a third screen 3880 shown in FIG. 38D, the worker 3510 may hear: "please go to Aisle 01, Section 01, Bin 10," and may reply "ready" or "I am ready" when in front of the right bin.

The device 3760 may output the verbal command to "Pick 5 each." The worker 3510 then picks the right quantity of the item and says "done." To confirm picking of the correct item, the worker 3510 may read out check-digits or a check-word from under the relevant bin. These digits/words may be phonetically as distinct from each other as possible for closely placed bins, and/or may be random. They also may be changed regularly. The worker 3510 may then continue line by line down the transfer order. The line item being worked may be highlighted (e.g., by color) with item description attached. The worker 3510 also may click on a checkbox 3882 in a left column of each line 3884 item to indicate completion of the corresponding task(s).

Figure 38E:
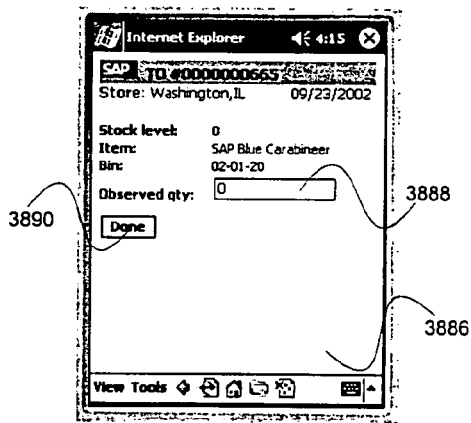
Figure 38F:
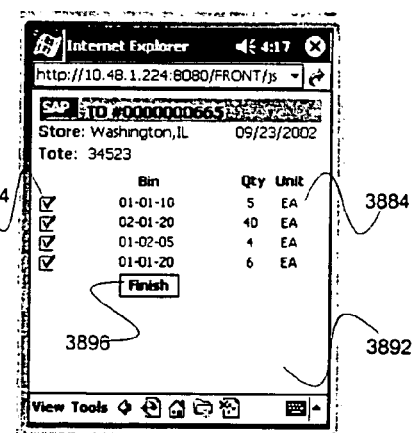

Referring to FIG. 38E, the worker 3510 then sees a fourth screen 3886 if the bin is expected to be empty after the worker 3510 has picked, the worker 3510 may be asked to confirm the same. The worker 3510 may hear: "Is the bin empty?" and may then reply "yes" if it is, or "no" if it is not, in which case the worker 3510 may then be asked: "What's the observed quantity?" The worker 3510 may subsequently say or enter with stylus the number of items left in the bin into a field 3888, and then say or click a second "Done" button 3890 to continue. After completion of picking the items in a transfer order, a final screen 3892, shown in FIG. 38F, shows each picked item with a check mark 3894 as a visual confirmation. The worker 3510 may then say "Finish" or click a "Finish" button 3896 to proceed to the next transfer order.

The items or cases being picked may be tagged using RFID (Radio Frequency Identification). The tote or cart into which the items are being placed may have an RFID reader built into it, as described above. In this case, the worker 3510 may not need to confirm by saying "Done" at all. Instead, as soon as the items are placed into the tote, the tote reader reports the tags found. The application verifies that the correct items were picked and confirms the line item automatically when this condition is met.

A summary of such an automated implementation is described below. Specifically, the worker 3510 picks items that are tagged with AutoID chips, such as, for example, RFID tags. The tote/box into which the picked items are placed have at least one reader for these chips. The tote also may have a barcode or RFID tag to be used to identify the tote. As soon as the item is placed in the tote/box, the reader confirms the item to the server and the worker 3510 receives the next set of instructions.

In this implementation, the interaction, described above, relating to the screen of FIG. 38D may be as follows. The worker 3510 hears: "Please go to Aisle 01, Section 01, Bin 10. (Pause) Pick 5 each." The worker 3510 then picks the right quantity of the item and places them in the tote. After the automatic confirmation, the worker 3510 may be instructed to the next line item. This process is repeated by continuing line by line down the transfer order. The line item being worked on may be highlighted, for example, in yellow on the PDA 3760 with item description attached. As explained earlier, the display of the line item and, optionally, additional line items in the order (pick list), may help the worker 3510 to remain oriented in the pick list and to remember the current instruction.

Generally, an RFID tag provides a mode of input that can speed the picking process and increase the accuracy of the picking process. One implementation includes the modes of voice, stylus/display, bar code scanning (of bins or totes, for example), RFID tag reading (of products, bins, totes, for example). Other modes are possible, and each of the modes may interact with the system and update the system. The worker 3510 may, for example, be allowed to use voice commands to update the pick list if an RFID tag is missing from a product.

Communication between the RFID tag 3734 and the device 3756 may follow a variety of protocols, several of which are described in the following implementations. Features of these implementations may be combined and augmented in various ways to achieve specific system requirements. In one implementation, RFID tag 3734 is continually transmitting (as is RFID tag 3744), and device 3756 responds to the strongest signal, making an implicit assumption that the strongest signal belongs to the RFID tag that is physically closest to device 3756. In another implementation, device 3756 requires a minimum received power before responding, the minimum received power indicating that the RFID tag is within a certain distance.

In another implementation, the RFID tag 3734 does not transmit until queried by device 3756. In this case, one such RFID tag is charged by the query and emits a response. Device 3756 may query the RFID tag 3734 using a variety of protocols. For example, device 3756 may continuously send out a query signal that is directional, that has low-power, and/or that has short range, such that RFID tag 3734 will not have a high probability of receiving the query signal unless RFID tag 3734 is within a minimum distance or is being placed into the tote 3750. RFID tag 3734 may be designed to wake-up in response to receiving the query signal, and also may have additional processing capability. The information that an RFID tag includes may vary with implementation or item, including, for example, an ID number alone, an item description, a manufacturing date or other manufacturing information, and/or storage information. For example, an RFID tag on an item of food may include an ID number, an item description, a manufacturing date or a shelf-life, and a storage temperature.

As illustrated, the PDA 3760 is in communication with a central system (server 3850) from which pick-lists are received. The PDA 3760 may use a wireless network to upload information when a pick-list has been fully selected, and to download a new pick list. PDA 3760 may use a wired network to achieve the same effect and may download/upload information in batch mode for purposes of efficiency.

The bar codes illustrated in FIGS. 37 and 38 may be used to achieve a variety of design objectives. For example, the PDA 3760 may include a bar code reader to scan bar code 3727 before first item 3730 is placed into tote 3750. The PDA 3760 may then verify, for example, that the picker has gone to the correct bin. As another example, bar codes may be scanned during an inventory-verification process to indicate which bin is being inventoried. As another example, bar codes may be scanned during a restocking process to indicate the bin into which an item is being restocked.

Additional error-catching procedures may be built into the process of selecting an item. For example, a picker may be instructed to pick a certain item, and if device 3756 detects a different item being placed into tote 3750, then the PDA 3760 may alert the picker, using, for example, a display message or audible instruction.

Figure 39:
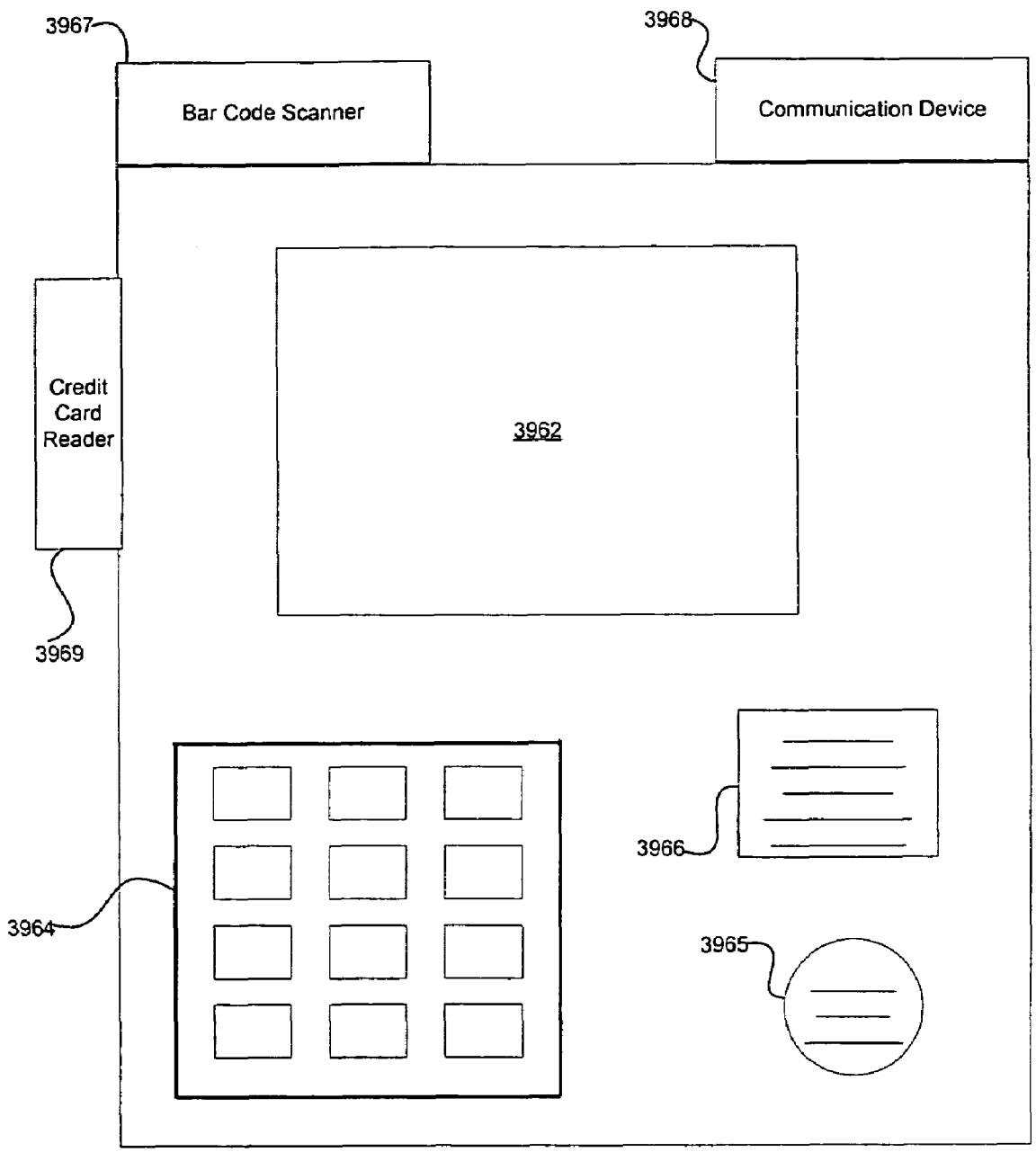
FIG. 39 illustrates a portable digital assistant ("PDA") for use in the system of FIG. 35.

FIG. 39 shows a PDA 3960 that is similar to the PDA 3760, but that explicitly includes additional features enabling additional modes of communication with, for example, a picker, a bin, or a tote. The PDA 3960 includes a display 3962 allowing information to be displayed and to be input using, for example, a stylus. The PDA 3960 includes a keyboard 3964 and a microphone 3965 allowing a picker to enter information by touch or voice, respectively. The PDA 3960 includes a speaker 3966 allowing information to be audibly output. The PDA 3960 includes a bar code scanner 3967 for scanning a bar code on, for example, a tote, a bin, or an item. The PDA 3960 includes a communication device 3968 for communicating with, for example, the device 3756 (indirectly or directly), or, in other implementations, with the RFID tag 3734. Communication device 3968 may use, for example, RF technology, infrared technology, or a hard-wired connection (hard-wired to, for example, a tote). The PDA 3960 also includes a credit card reader 3969 so that financial transactions may be completed using the PDA 3960.

The various communication modalities illustrated in the PDA 3960 can be integrated so that as each is used to interact with information, such as, for example, a pick-list, the information is updated in the various output modalities and accessible in the various input modalities. As referred to above, this allows varied presentations of the information, and also allows for increased efficiency and reduced workflow errors.

For example, an individual may receive instructions over speaker 3966 indicating the next item on the pick-list, and display 3962 may simultaneously display several items including the current item. As the individual selects the required number of the current item, display 3962 and/or speaker 3966 can provide an update on the remaining quantity to select for that item. The dual-presentation of the information can allow for increased efficiency and reduce errors.

As another example, the individual may have the option of responding in the mode that is simplest and/or easiest in a given situation. For example, the individual may speak "next item" into microphone 3965 to advance the pick-list to the next item, or may use a stylus on display 3962 to select the next item. Thus, hands-free operation is provided but not required, which may allow the individual to continue working while the individual is on the phone. As another example, an individual may scan a bar code using bar code scanner 3967 or, if the bar code is hard to reach, for example, the individual can type in a bar code number using keyboard 3964 or perhaps use a stylus with display 3962. Thus, the individual will not be held up in those situations when the bar code is inaccessible.

Although RFID tags are used in the implementation just described, other implementations may use other types of Auto ID devices, such as, for example, bar codes. It should be clear that Auto ID tags need not be based on RF technology. For example, a tag can be implemented to be read by optical, magnetic, opto-magnetic, or other technology, either with or without physical contact between the tag and a reader. Moreover, the tag can be passive (containing no internal power source for communications and data transmission) or active; and it can have processing capacity or not. A tag will generally be a digitally identifiable tag, meaning that the tag has the property that a unique digital identity can be read directly from the tag using some kind of reader. Some digitally identifiable tags, such as, for example, a bar code or an optical character recognition (OCR) tag, also may be written or written to, and may offer extra advantages in cases where information needs to be made available without dependence on a communication network.

Items can be tagged with a unique identifier by any available item-level tagging technology, for example, active and passive Radio Frequency Identification ("RFID") tags, barcodes, and tags that can be applied on a molecular basis. Tags can include various pieces of information, such as, for example, owner, price, lot number, and storage temperature. Tags also may include data acquired from sensors, such as, for example, the current temperature. Tags also may include rules or other information, such as, for example, a rule specifying that if the temperature of the corresponding item reaches a given temperature, perhaps for a specified amount of time, then the item is to be discarded.

Tags also may include a unique identification code for an associated item. In one implementation, the unique identification code is partitioned into several fields including an organization field, a product category field, and a serial number field. Thus, identical items residing in a common bin in a warehouse might have the same information in the organization field and the product category field, but have different serial numbers. In this way, a tag includes substantial information not unique to that tag (or its associated item) but also includes information that uniquely identifies the item.

Tag readers also may be varied, including, for example, RFID readers, barcode scanners, polymer tag readers, and sensors. The data on a tag may be automatically read by a tag reader. Such reading may be, for example, continuous, a periodic scan, or a scan that is triggered by, for example, a proximity sensor. Readers may be positioned, for example, on a manufacturing line, in storage locations, in shipping and receiving areas, at loading docks, within trucks or other moving vehicles, and also may be hand-held wireless-connected devices. Some examples of tag readers, in particular RFID readers, in particular contexts include RFID readers that are: (i) fixed to a shelf in a warehouse or store, (ii) fixed to a cart, (iii) hand-held and separate from a PDA, (iv) integrated into a PDA. RFID readers might be periodic, as mentioned above, by, for example, only being turned on at periodic intervals to collect data, and being turned off at other times. Several of these examples are described further in examples that follow.

Figure 40A:
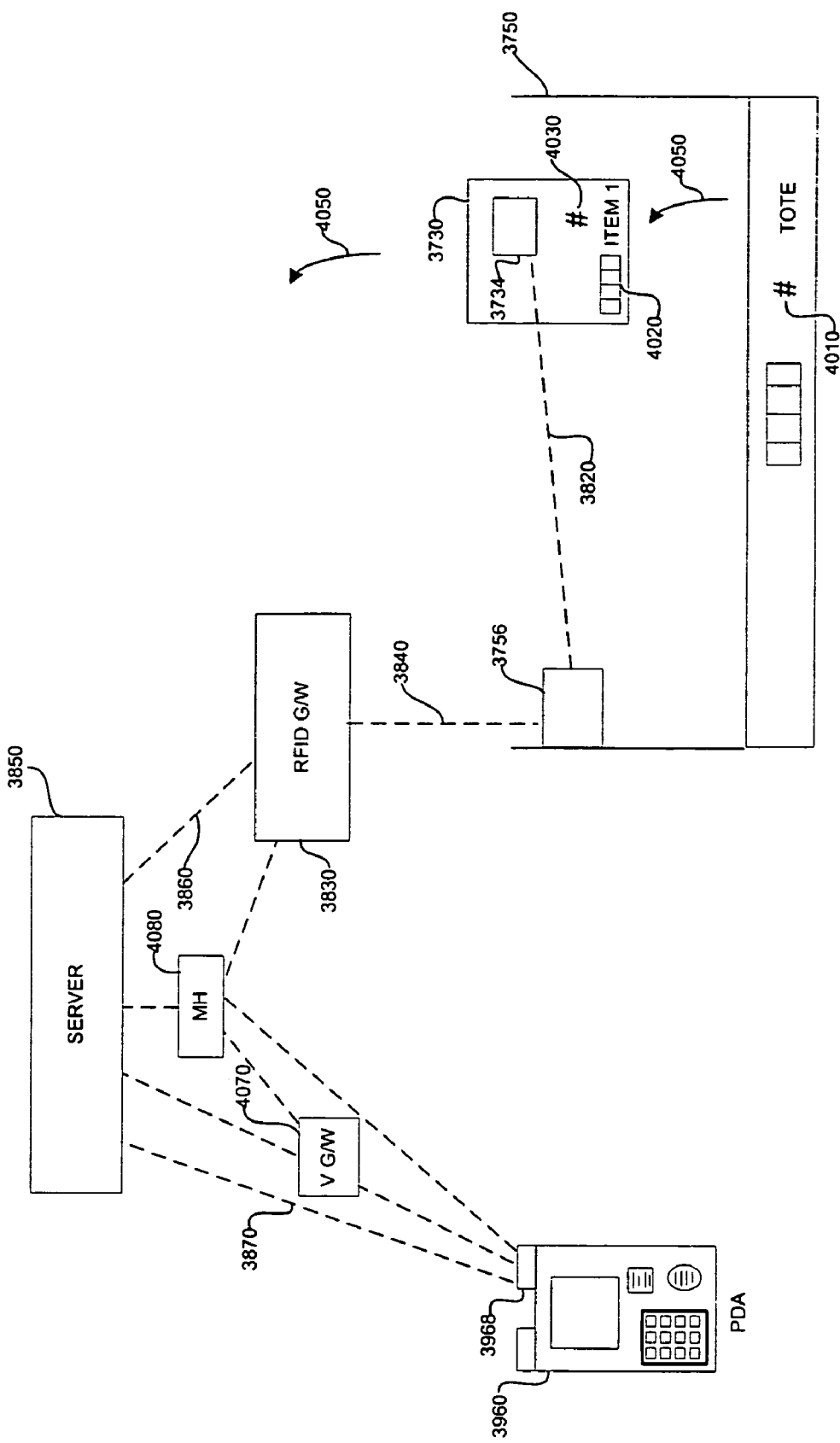
FIGS. 40A-B are block diagrams illustrating item-moving techniques.
Figure 40B:
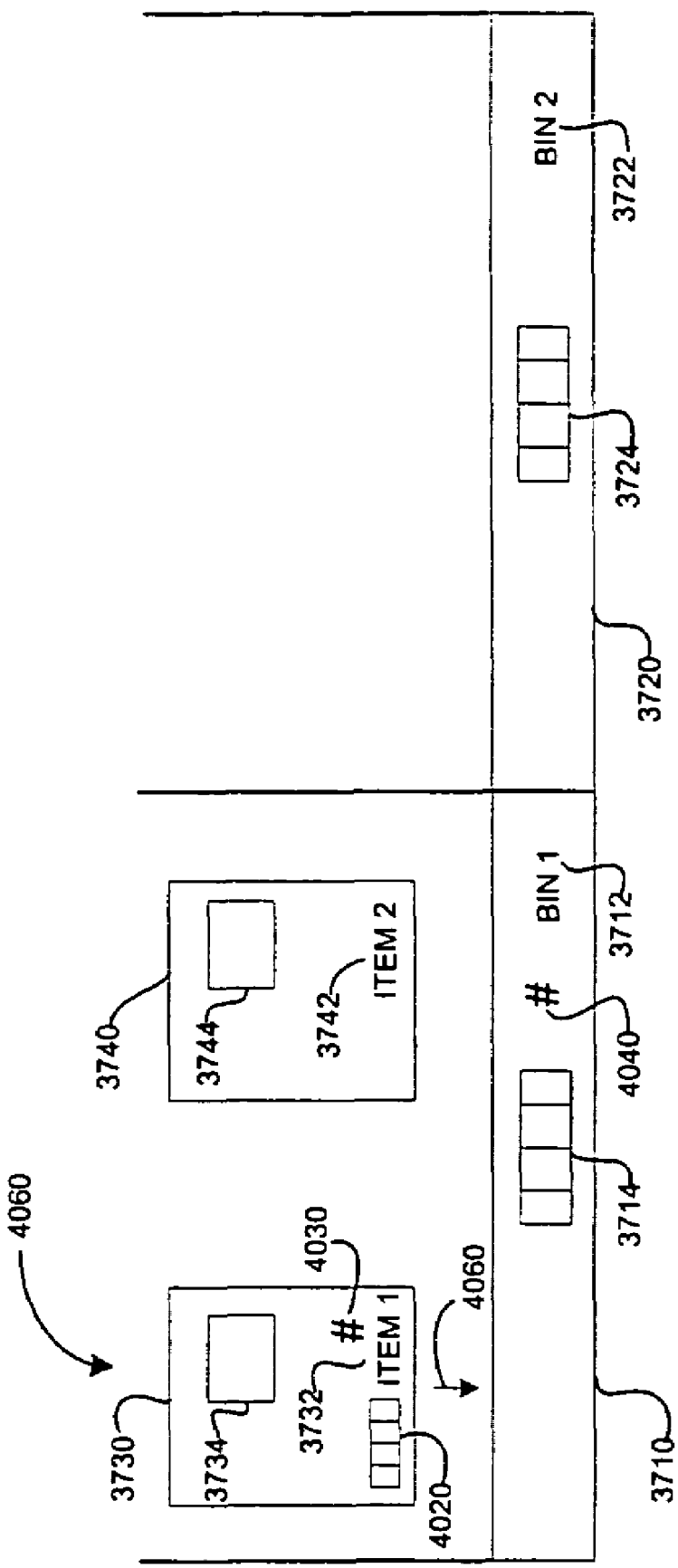

Referring to FIGS. 40A-B, tote 3750 includes an identification number 4010 that uniquely identifies tote 3750. First item 3730 includes a bar code 4020 and an identification number 4030. Bar code 4020 and identification number 4030 each identify first item 3730, but need not uniquely identify first item 3730. For example, identification number 4030 may be, for example, a SKU. First bin 3710 includes an identification number 4040 (FIG. 40B) that uniquely identifies first bin 3710.

FIGS. 40A-B indicate the movement of the first item 3730. FIG. 40A shows the first item 3730 as initially being located in the tote 3750, with arrows 4050 indicating that the first item 3730 is subsequently being removed from tote 3750. FIG. 40B includes arrows 4060 that indicate that the first item 3730 is being placed into first bin 3710. Arrows 4050 and 4060 together indicate that the first item 3730 is being moved from tote 3750 to first bin 3710, as occurs, for example, in a stocking operation.

Server 3850 is shown communicating with a voice gateway 4070 and a messaging handler 4080, among other components previously described. Voice gateway 4070 communicates with PDA 3960 in providing voice communications. Messaging handler 4080 communicates with RFID gateway 3830, voice gateway 4070, PDA 3960, and server 3850 in synchronizing communications between the various gateways. The operations of messaging handler 4080 and various gateways in several implementations should be understood based on the various multimodal architecture(s) described above.

As explained earlier, PDA 3960 includes communications device 3968 that communicates with server 3850 and, through server 3850, to reader 3756, for example. In other implementations, PDA 3960 may communicate directly with reader 3756. Communications device 3968 may be communicatively coupled to a variety of components in PDA 3960, such as, for example, a browser, a browser adaptor, and a voice-over-IP ("VoIP") client, as described above. Communications device 3968 may, accordingly, include a variety of communications interfaces, hardware, and software, as appropriate to communicate with the various components to which communications device 3968 is coupled.

Figure 41:
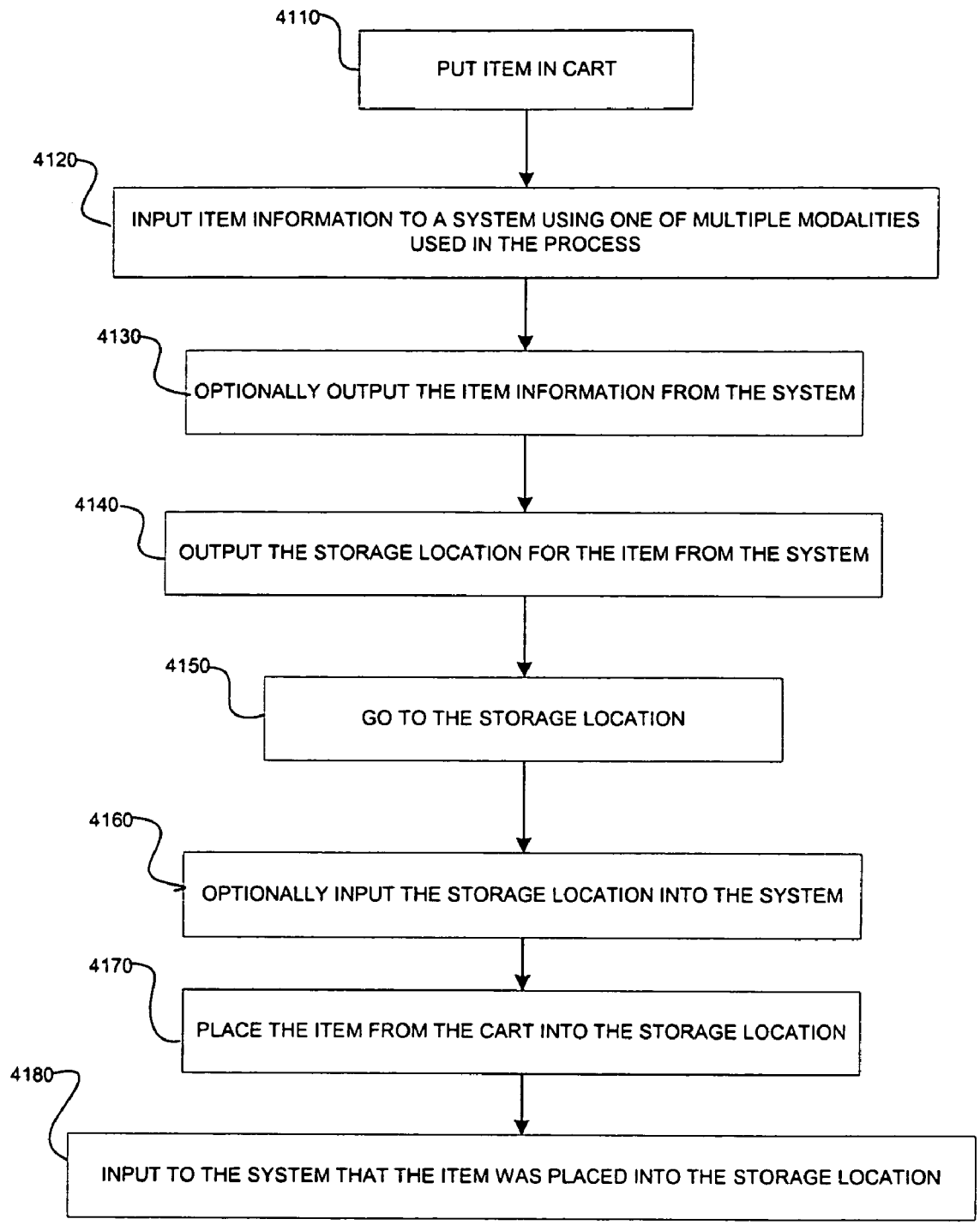
FIG. 41 is a flow chart illustrating a process for stocking an item.

Referring to FIG. 41, a process 4100 is shown for stocking an item using, for example, the system of FIGS. 40A-B. As indicated below, implementations of process 4100 use multiple modalities in performing the input and output operations, (although process 4100 may be adapted in other implementations to use only a single modality). The description of process 4100 below generally assumes that PDA 3960 is used, but another device or system may be used in addition to, or in lieu of, PDA 3960.

Process 4100 includes putting an item into tote 3750, or into, for example, a cart or other delivery vehicle (4110). The item may be put into tote 3750 by, for example, an individual or a machine.

Process 4100 includes inputting item information into PDA 3960 or, for example, some other device or system (4120). The item information may include, for example, (i) a name or description of the item, such as, for example, label 3732, (ii) a SKU, product number, or other identifying number, such as, for example, identification number 4030, or (iii) the information conveyed by a bar code, such as, for example, bar code 4020. Inputting the item information may include, for example, a user speaking the item information into microphone 3965, scanning the item information with bar code scanner 3967, and entering the item information using keyboard 3964 or a stylus operating with display 3962. In another implementation, an RFID reader receives the item information from an RFID tag on the item, with the RFID reader being located on tote 3750, for example.

The modality used to input the item information into PDA 3960 is one of multiple modalities used in process 4100 (4120). As indicated throughout the discussion of process 4100, various modalities may be used in several of the operations. Process 4100 is characterized by the use of at least two different modalities, although as stated above, process 4100 may be adapted to use only a single modality.

Process 4100 optionally includes outputting the item information from PDA 3960 after the item information is input (4130). For example, after a user scans bar code 4020 on first item 3730 (see FIG. 40A) using bar code scanner 3967, PDA 3960 may output the item information on display 3962 or speaker 3966 so that the user can receive the item information. The item information may be displayed throughout process 4100 so that the user can refer back to the item information as needed.

Process 4100 includes outputting a storage location for the item from PDA 3960 (4140). For example, the storage location may be maintained on PDA 3960 in a database, or the storage location may be received by PDA 3960 from server 3850 in response to PDA 3960 sending the item information to server 3850. PDA 3960 may output the storage location to the user using, for example, display 3962, speaker 3966, or a printer (not shown).

Process 4100 includes the user going to the storage location (4150) and, optionally, inputting the storage location into PDA 3960 when the user has arrived at the storage location and is ready to put the item into the storage location (4160). The user may input the storage location by, for example, speaking into microphone 3965, using a stylus on display 3962, using keyboard 3964, and using bar code scanner 3967. The user may input the storage location by inputting, for example, label 3712, bar code 3727, or identification number 4040. Inputting the storage location may serve, for example, to verify that the user is at the correct storage location.

Process 4100 includes the user placing the item from the cart into the storage location (4170) and inputting to the system that the item has been placed into the storage location (4180). The user may provide the input (4180) to the system by, for example, speaking into microphone 3965 the phrase "done," using a stylus on display 3962 to select a box labeled "placed," using keyboard 3964 to enter the number of items placed, and using bar code scanner 3967 to scan bar code 3727. In implementations in which the user needs to place more than one of the particular item into the storage location, the user may provide a single input indicating the quantity placed or provide a separate input after each instantiation of the item is placed. An example of the latter includes a system in which first bin 3710 includes a bin RFID reader that receives a transmission from each item placed into the bin. The bin RFID reader may be designed so that it only receives transmissions from items that are placed into first bin 3710. In such an implementation, the bin RFID reader may transmit the received information through RFID gateway 3830 to server 3850, and server 3850 may communicate all or part of the information to PDA 3960 through messaging handler 4080.

Other implementations of process 4100 may omit or modify certain of the operations described above to accommodate, for example, different design goals or system architectures. As indicated at the beginning of the description of process 4100, and suggested throughout by the various examples provided, PDA 3960 may be replaced or supplemented by another device or system. Such another device or system may include, for example, an RFID reader, a detached bar code scanner, a voice input-output system, and a server.

In one implementation, the system includes a tote RFID reader, a shelf RFID reader, a voice input-output system, and a server, and the user receives voice instructions to go to a particular bin and to put certain items in the bin. In such an implementation, the user need not provide confirming input because the RFID readers may be able to determine the items that have been removed from the cart and to determine the bins into which the removed items have been placed. Further, in such an implementation, the system may detect placement errors in real-time and instruct the user with a voice command to correct the error.

As indicated earlier, process 4100 can be used to stock an item on a shelf in a store as well as to stock an item in a bin in a warehouse. Various differences may exist between the environments, such as, for example, the shelves in a store may not have bar codes, and the exact implementation of process 4100 may need to be altered to accommodate these differences.

In one implementation of stocking a shelf in a store, a store worker uses a headset communicating with server 3850 through voice gateway 4070, without the use of PDA 3960. The store worker picks up various items to be restocked (4110), speaks the SKU of an item into the headset (4120), receives a voice command over the headset indicating the shelf where the item is to be stocked (4140), walks to the indicated shelf (4150), places the item on the shelf (4170), and speaks "done" into the headset to inform server 3850 that the item has been placed on the indicated shelf (4180). The store worker then repeats the process for each item that needs to be stocked.

In another implementation that does not use PDA 3960, the store worker uses a bar code scanner along with the headset. The bar code scanner is detached from the headset and communicates with server 3850 using a wireless connection. The store worker performs the stocking process in the same way as described above, except that the store worker scans a bar code on each item instead of speaking the SKU.

Figure 42:
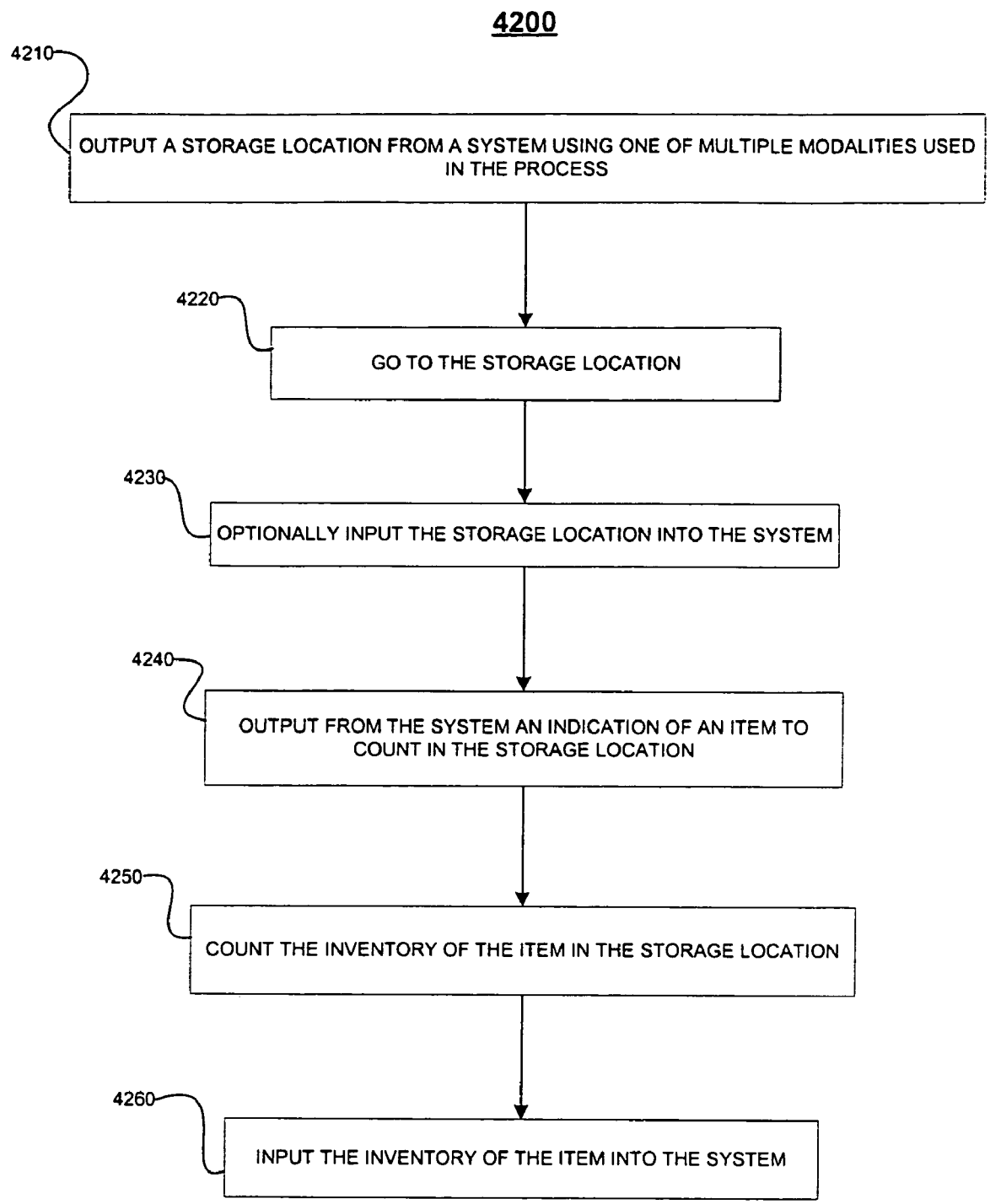
FIG. 42 is a flow chart illustrating a process for taking an inventory of an item.

Referring to FIG. 42, a process 4200 is shown for taking an inventory of an item using, for example, the system of FIGS. 40A-40B. Process 4200 may be used to put an item in a bin in a warehouse, on a shelf in a store, or in some other environment as well. As indicated below, implementations of process 4200 use multiple modalities in performing the input and output operations, however process 4200 may be adapted in other implementations to use only a single modality. The description of process 4200 below generally assumes that PDA 3960 is used, but as with process 4100 another device or system may be used in addition to or in lieu of PDA 3960.

Process 4200 includes outputting a storage location from PDA 3960 or, for example, some other device or system (4210). The storage location may be output to a user using, for example, display 3962 or speaker 3966.

The modality used to output the storage location from PDA 3960 is one of multiple modalities used in process 4200 (4210). As indicated throughout the discussion of process 4200, various modalities may be used in several of the operations. Process 4200 is characterized by the use of at least two different modalities, although as stated above, process 4200 may be adapted to use only a single modality.

Process 4200 includes the user going to the storage location (4220) and, optionally, inputting the storage location into PDA 3960 (4230). The user may input the storage location in order, for example, for PDA 3960 (or server 3850) to verify that the user is at the correct storage location. The user may input the storage location using, for example, any of the techniques described with respect to operation 4160 above.

Process 4200 includes outputting from PDA 3960 an indication of an item to count in the storage location (4240). The indication may include, for example, (i) a name or description of the item, such as, for example, label 3732, and (ii) a SKU, product number, or other identifying number, such as, for example, identification number 4030. In a scenario in which the storage location contains multiple different items (for example, products), PDA 3960 may step the user through each item serially, prompting the user to determine the inventory of each item in turn. Implementations also may allow the user to indicate that the storage location contains an additional type of item that was not output by PDA 3960. PDA 3960 may output the indication using, for example, any of the techniques described with respect to operations 4130 or 4270 above.

Process 4200 includes the user counting the inventory of the item in the storage location (4250) and inputting the inventory of the item into PDA 3960 (4260). The user may input the inventory (4260) by, for example, speaking a quantity into microphone 3965, using a stylus on display 3962 to select or otherwise enter a quantity, and using keyboard 3964 to enter a quantity.

In certain implementations, inputting the inventory of the item also serves to verify that the user has counted the correct item. For example, the user may input the inventory by entering a quantity next to a particular item name or description in an inventory list displayed on display 3962. As another example, the user may have a PDA with an integrated RFID reader that can be used to scan an entire shelf and to provide a description of the item(s) on that shelf as well as a count of the item(s) on that shelf. Hand-held RFID readers (whether or not integrated into a PDA) may be used to perform various data entry or input operations described throughout this disclosure.

In other implementations, a separate operation may be used to verify that the user is counting the correct item. Such a separate operation may include, for example, any of the techniques described with respect to operation 4120 above. As another example, such a separate operation also may include, for an item with an RFID tag, selecting one of the item from the storage location and placing the item within receiving range of an RFID reader.

Process 4200 may include further operations, such as, for example, PDA 3960 (i) processing the inventory data that was input in operation 4260 or providing the inventory data to a server or remote computer system, (ii) providing an indication of whether the inventory data agrees with a computer record, and (iii) providing an instruction to proceed to the next item in the storage location or to the next storage location.

Certain warehouse environments may include shelf RFID readers, in which case the inventory of items having RFID tags may be continually updated with real-time data. Process 4200 may be used in these environments to verify the inventory indicated for one or more items.

Various inventory adjustments may be performed, including, for example, placing an order for items that have a low inventory. Inventory adjustments may be performed independently of an inventory process and may be based on, for example, a computer record of inventory and of the volume and timing of sales. Process 4200 may be used to ensure that the computer record of inventory is accurate and, thus, that the reordering process is based on accurate information.

As indicated earlier, process 4200 can be used to inventory an item on a shelf in a store as well as to inventory an item in a bin in a warehouse. Various differences may exist between the environments, such as, for example, the shelves in a store may not have bar codes, and the exact implementation of process 4100 may need to be altered to accommodate these differences.

In one implementation, a store owner may receive a voice command over a headset indicating a shelf for which items are to be inventoried (4210). The store worker may proceed to the indicated shelf (4220), scan a bar code on the shelf (4230), receive a voice command over the headset indicating the item to be inventoried (4240), count the indicated item (4250), and speak into the headset the inventory on hand of that item (4260). The store worker may then receive another command indicating the next item to be inventoried on that shelf, or indicating the next shelf for which items are to be inventoried.

Process 4200 describes a process for inventorying an item. As indicated earlier, if process 4200 is repeated, the inventory may be taken, for example, for a shelf that contains multiple items, for an area that contains multiple shelves, and for a warehouse or store that contains multiple areas. Accordingly, process 4200 may be used, for example, to perform an annual physical inventory of an entire warehouse, or to perform some form of cycle counting. Cycle counting can be defined as any regularly recurring inventory (counting) program that counts less than the entire physical inventory each time. Many variations of cycle counting can be used or created, such as, for example, counting each item once per year or counting certain items more frequently than others.

Yet another inventory process that can be used with the systems and configurations described herein is referred to as a "shoot the hole" process. In the "shoot the hole" process, an individual identifies empty bins/shelves and informs the system. The individual may be, for example, a picker, a stocker, an inventory-taker, or another person that is working in the facility. The individual may use a bar code scanner or other modality to tell the system that a bin is empty, and a user interface may be adapted to receive this information or to prompt the individual for this information. After the individual identifies an empty bin, the system may respond with an indication that, for example, a restocking order needs to be placed, a restocking order has already been placed, or inventory for restocking has been received and is waiting to be put in the bin. The "shoot the hole" inventory process is also referred to as "ad hoc" cycle counting because less than the entire physical inventory is inventoried in each count, but the items are not necessarily counted in a regularly recurring manner.

Figure 43:
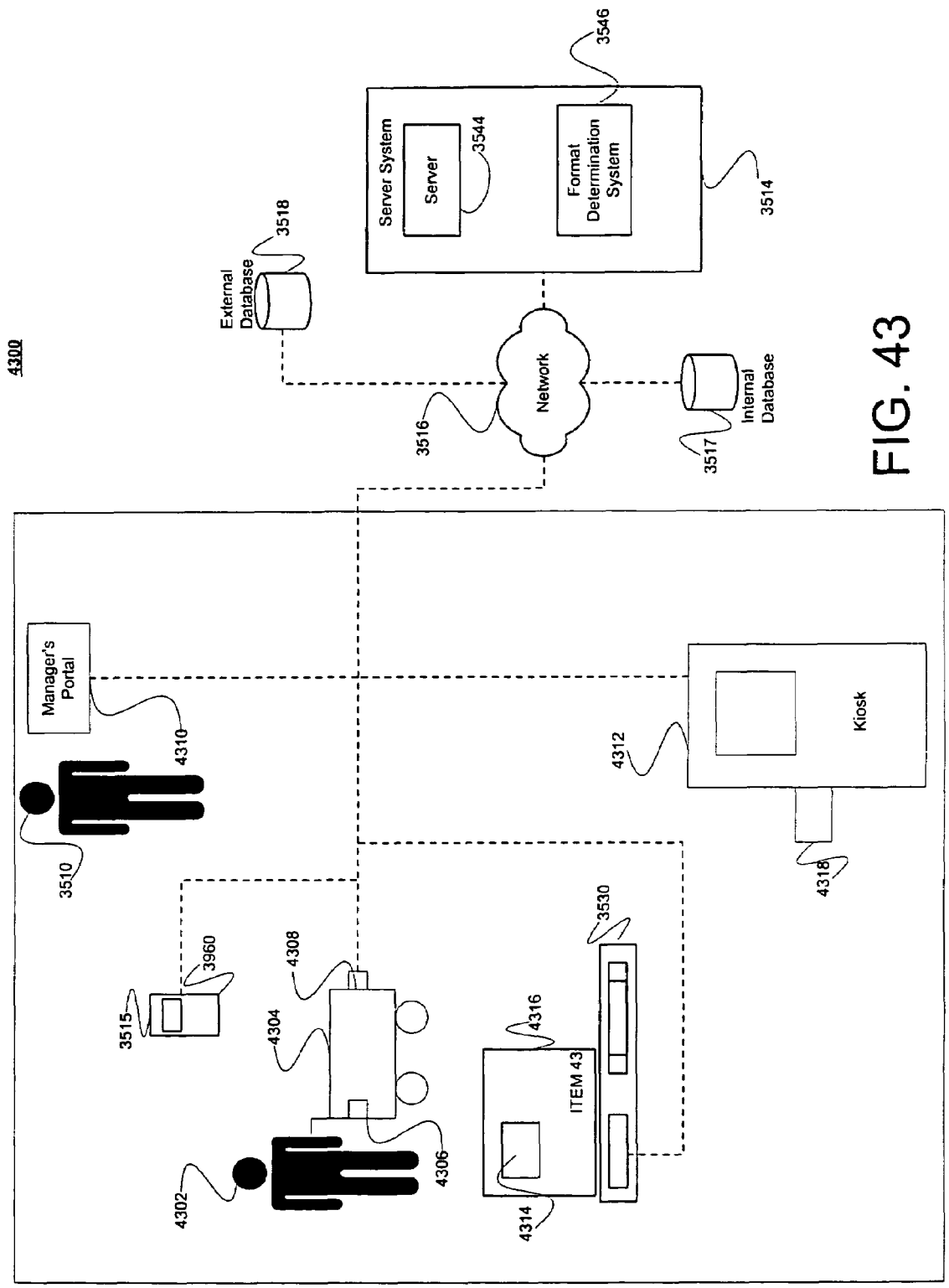
FIG. 43 is a block diagram of a multimodal sales system.

FIG. 43 is a block diagram of a multimodal sales system, such as, for example, a store 4300. FIG. 43 is a variation of the system 3500 shown in FIG. 35; it is a location including products for purchase and areas for purchasing products, such as, for example, checkout lines. The store 4300 includes, or has access to, the server system 3514. The server system 3514 connects to the internal database 3517 via the network 3516. The internal database 3517 may store, for example, product information and customer information. The product information may include, for example, location and quantity information for products in the store 4300. The server system 3514 may interact with "smart" shelves 3530 in the store 4300, as described with respect to FIG. 35, to compile both product and location information. Location information may include visual location information, such as, for example, maps, or may include references to aisle numbers. Product information also may include details about products, as well as information about how the products relate to each other, such as, for example, complimentarity between products (e.g., ice cream and ice cream toppings).

Operators of retail environments such as the one represented by the store 4300 generally seek to facilitate the ease with which customers may find, access, and purchase products for sale. Difficulties and inconveniences experienced by the customers may result in fewer or no sales being completed by the customers. In contrast, providing customers with a fast and convenient shopping experience, as well as providing sufficient product information to the customers, may result in greater sales, as well as customer loyalty.

For example, customers who cannot find a desired product, or cannot access information about the product, may leave the store without making a purchase. Similarly, customers who spend inordinate amounts of time searching for products, or waiting to complete a transaction for the products, may not return to the store for future purchases. Often, product information may be available to the store operators, but may be inaccessible to the customer while in the store. Moreover, even when accessed by store operators, the product information should be accurate and up-to-date, so that the operator may ensure that products are ordered, priced, and stocked in a timely manner.

Implementations described below facilitate a customers' shopping experience by providing information to and about the customer. In particular, implementations operate across a plurality of devices, and provide multi-modal access to store information. As a result, the store 4300 may be operated in a more efficient manner, so that sales are increased and customer satisfaction and loyalty are improved.

In the store 4300, the customer 4302 may be provided with a cart 4304 into which products may be placed and transported through the store 4300. The cart 4304 may be RFID-enabled, and may include an RFID reader 4306 and a RFID transmitter 4308. As a result, the RFID gateway 3830 may receive input from a plurality of RFID-enabled carts 4304.

The server system 3514 may then use this received input from the RFID gateway to 3830 track the movement of customers 4302 through the store 4300. For example, the server system 3514 may discern a bottleneck of RFID-enabled shopping carts 4306 and alert store workers 3510 to open a new checkout line. The server system 3514 also may record customer "linger" by shelves or products through tracking the RFID-enabled shopping carts 4306. The recorded customer "linger time" may then be later analyzed for a correlation between "linger time" and sales of the corresponding product. The server system 3514 may be used, for example, to provide visualization information of RFID-enabled cart 4304 movement patterns, sales flow of goods (i.e., what sells when), and groups of goods purchased.

The product information and the customer information may be multimodally accessible to one or both of the worker 3510 and the customer 4302 using a mobile device, such as, for example, a customer PDA implemented as the PDA 3960 or a stationary device, such as, for example a manager's portal 4310 or an information kiosk 4312. Alternatively, the PDA 3960 may be mounted onto the cart 4304. Product information may be accessed by scanning an identification tag 4314 on an item 4316, such as, for example, an RFID tag or a bar code, using the communication device 3968 on the PDA 3960 or a similar communication device 4318 on the information kiosk 4312.

The manager's portal 4310 refers generally to information available to store operators that is designed to enable efficient and cost-effective administration of the store 4300. The portal 4310 may be, for example, an Internet or Intranet website that is available to the manager from an enterprise-wide server system, which could include, or be a part of, the server system 3514. The portal 4310 also may represent locally-stored inventory information, which may or may not be shared with other store locations. Even more generally, the portal 4310 may be understood to represent any information that is available to a store manager or other personnel and that might be helpful to shopping customers.

The kiosk 4312 should be understood to represent any publicly available computing device that may be used to locally present information to the shopping public. The kiosk 4312 may have multiple input/output modes, including at least any of the modalities discussed herein. The kiosk 4312 may include a single station having multiple substations (e.g., multiple sets of displays and I/O interfaces), or may include a number of computing devices placed throughout the store 4300.

Figure 44:
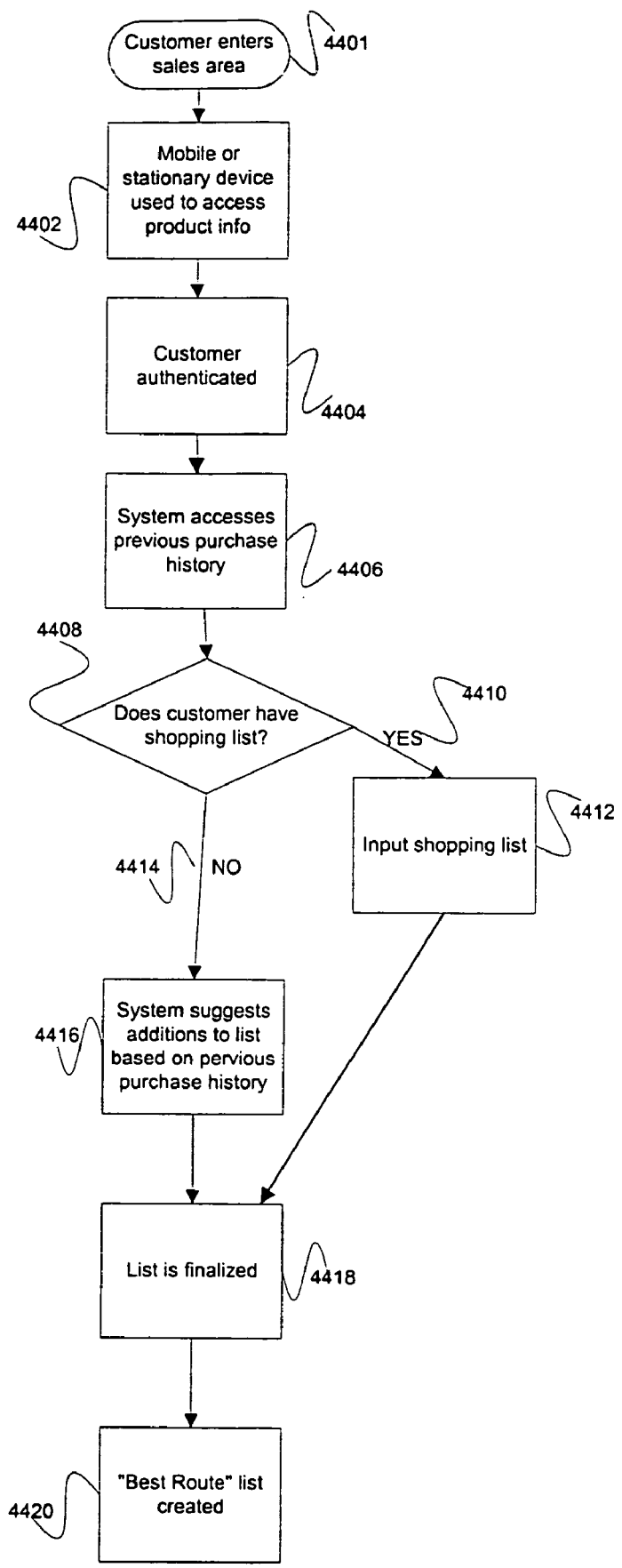
FIG. 44 is a flow chart of a process to access product information.

FIG. 44 is a flowchart of examples of ways the customer 4302 may access the product information stored on the server system 3514. As the customer 4302 enters a sales area (4401), the customer 4302 may access the product information by using the information kiosk 4312 or the PDA 3960 (4402). The customer 4302 may be prompted by the server system 3514 to identify herself, such as, for example by entering a user name and password (4404). The identification of the customer 4302 enables the server system 3514 to, for example, access a purchase history for the customer (4406). The customer 4302 may then be asked for a predetermined shopping list (4408). If the customer 4302 has a shopping list (4410), the list may be input in one of a plurality of modalities (4412). The system may remind the customer of a product left off of the inputted list, if any, based on previous purchase history (4414) such as, for example: "Buy milk because the last time you bought milk from us was one week ago." If the customer 4302 does not have a shopping list (4416), the server system 3514 may then display a list of previous purchases, and make suggestions based on previous purchase history (4414). The customer may then finalize the shopping list with the server system 3514 (4418). The server system 3514 may then generate a shopping list that utilizes the server system's knowledge of product location, resulting in a "best route" shopping list (4420).

As the customer 4302 moves throughout the aisles, access to product information from the server system 3514 may be needed. For example, the customer 4302 may scan the item 4316 using the PDA 3960, as described above, and query (using one of a plurality of modalities) the server system 3514: "What goes well with this product?" The server system

3514 may then output a multi-modal interface with suggestions based on previous customer preferences, other customer preferences, and excess inventory and/or promotions.

The customer 4302 and the worker 3510 may access customer information, such as, for example, financial information, in conjunction with product information to purchase a product using the PDA 3960, the manager's portal 4310, and/or the information kiosk 4312. For example, instead of placing physical items into the cart 4304, the customer may scan the identification tag 4314 using the information kiosk 4312 or the PDA 3960. The server system 3514 may then note items and alter the checkout system to consolidate items for ready pickup and/or delivery. If the customer 4302 is authenticated, financial information may be accessed by the server system 3514, as described above, and a financial transaction may be completed either by the worker 3510 or by the customer 4302.

Figure 45:
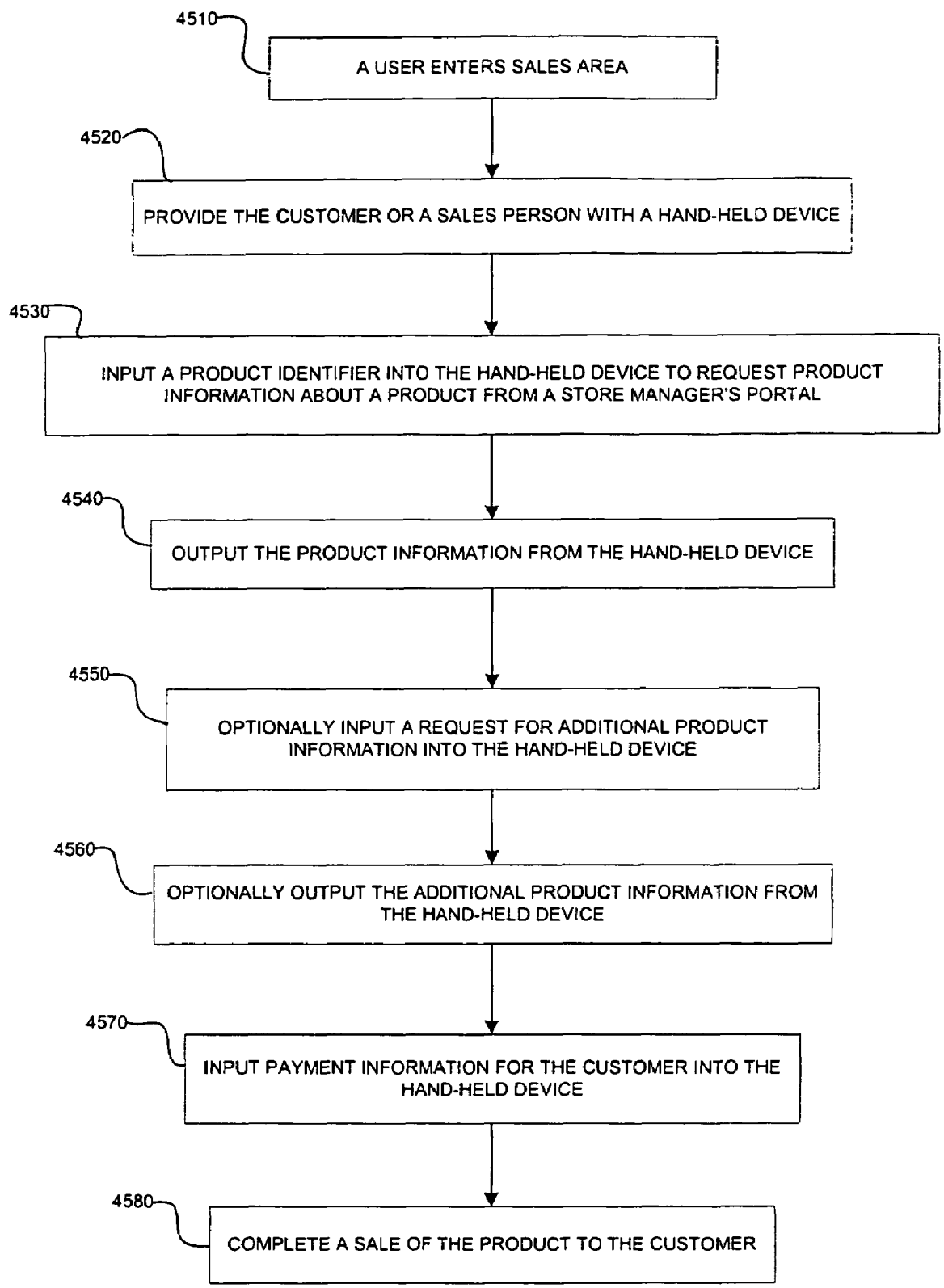
FIG. 45 is a flow chart of a process to purchase a product.

FIG. 45 is a flowchart of a process to purchase a product. As indicated below, implementations of process 4500 request product information from the store manager's portal 4310, however, process 4500 may be adapted in other implementations to request information from other sources. The description of process 4500 below generally assumes that the hand-held device is the PDA 3960, but another device or system (including the kiosk 4312) may be used in addition to or in lieu of the PDA 3960.

Process 4500 includes a customer entering a sales area, such as, for example, a store, a sales floor, or an exhibition or convention hall (4510), and optionally includes a sales person assisting the customer. The customer 4302 or worker 3510 is provided with the PDA 3960 (4520).

Process 4500 includes inputting a product identifier into the PDA 3960 to request product information about a product from the store manager's portal (4530). The product identifier may include, for example, (i) a name or description of the item, such as, for example, label 3742, (ii) a stock-keeping unit ("SKU"), product number, or other identifying number, or (iii) the information conveyed by the identification tag 4314.

Inputting the product identifier may include, for example, the customer 4302 speaking the item information into the microphone 3965, scanning the item information with the bar code scanner 3967, and entering the item information using the keyboard 3964 or a stylus operating with the display 3962. In another implementation, an RFID reader receives the item information from an RFID tag on the product, with the RFID reader 4306 located on the cart 4304, for example.

Inputting the product identifier also may include, for example, the use of the various user interface techniques described earlier. For example, the PDA 3960 or a system to which the PDA 3960 is communicatively coupled, may use (i) a multi-cluster approach, (ii) a multi-level, multi-parameter cascade approach, and (iii) a dynamic grammar, each of which is described earlier. These approaches and techniques may be used in voice recognition and database searching, for example. These various approaches and techniques also may be used in other environments, such as, for example, the warehouse environment described above with respect to FIG. 35.

The store manager's portal 4310 may be characterized by having access to a volume of product information for a variety of products. The product information accessible may include, for example, price, inventory, availability, description, promotional offers, alerts, warranty, reviews, and competitor information for each of these categories.

Process 4500 includes outputting the product information from the PDA 3960 (4540). The PDA 3960 may, for example, receive the requested product information from the store manager's portal 4310. Other implementations may request the product information from a remote computer system, such as, for example, the server system 3515. Outputting the product information may include, for example, using the speaker 3966 or the display 3962. Other implementations may use, for example, a printer that is either built-in such as in, for example, a calculator having an integrated reel printer, or is detached and connected over, for example, a wireless connection.

Process 4500 optionally includes inputting a request for additional product information into PDA 3960 (4550) and, optionally, outputting the additional product information from PDA 3960 (4560). Inputting the request may include, for example, navigating through one or more screens to request price information for a displayed product. Such navigation may include, for example, using a stylus or voice command.

Process 4500 includes inputting payment information for the customer 4302 into the PDA 3960 (4570). Payment information may be input using, for example, voice input over microphone 3965, keyboard 3964, and a stylus or other mode of input for display 3962. Other implementations may use additional modes of input, such as, for example, a credit card reader.

Personal information also may be entered, perhaps as part of the payment information. Implementations may, for example, use one or more of the techniques and approaches described earlier. In one implementation that allows voice input, the implementation prompts for address information in a "reverse" order—for example, state, then zip code, then city, then street address—to allow for smaller grammars and better search results.

Process 4500 includes completing the sale of the product to the customer 4302 (4580). Completing the sale may include various operations, such as, for example, communicating with a credit card clearinghouse to verify credit card information, and issuing a command to fulfill the sales order. The server system 3514 may connect to the credit card database 3518 using the network 3516.

Implementations of process 4500 may use multiple modalities in performing the various input and output operations. Implementations of process 4500 need not be performed with hand-held or mobile devices but may be performed with, for example, one or more fixed-location computers on a sales floor, such as, for example the information kiosk 4312.

A particular implementation of the process 4500 is depicted in FIGS. 46A-J. In general, the worker 3510 looks up a catalog quickly using the PDA 3960 without any stylus entry (can use stylus if desired). The worker 3510 takes the customer 4302's information and creates a customer entry or updates existing customer information. The worker 3510 creates a sales order using voice or by list selection via the stylus. Information such as a credit card number is entered through stylus input (can use voice input, but for security purposes it may be better if not spoken aloud). Barcode input also may be used to create sales order of items on the sales floor. Barcodes can be attached to a shelf, such as the barcode 3534, or to the individual products.

Figure 46A:
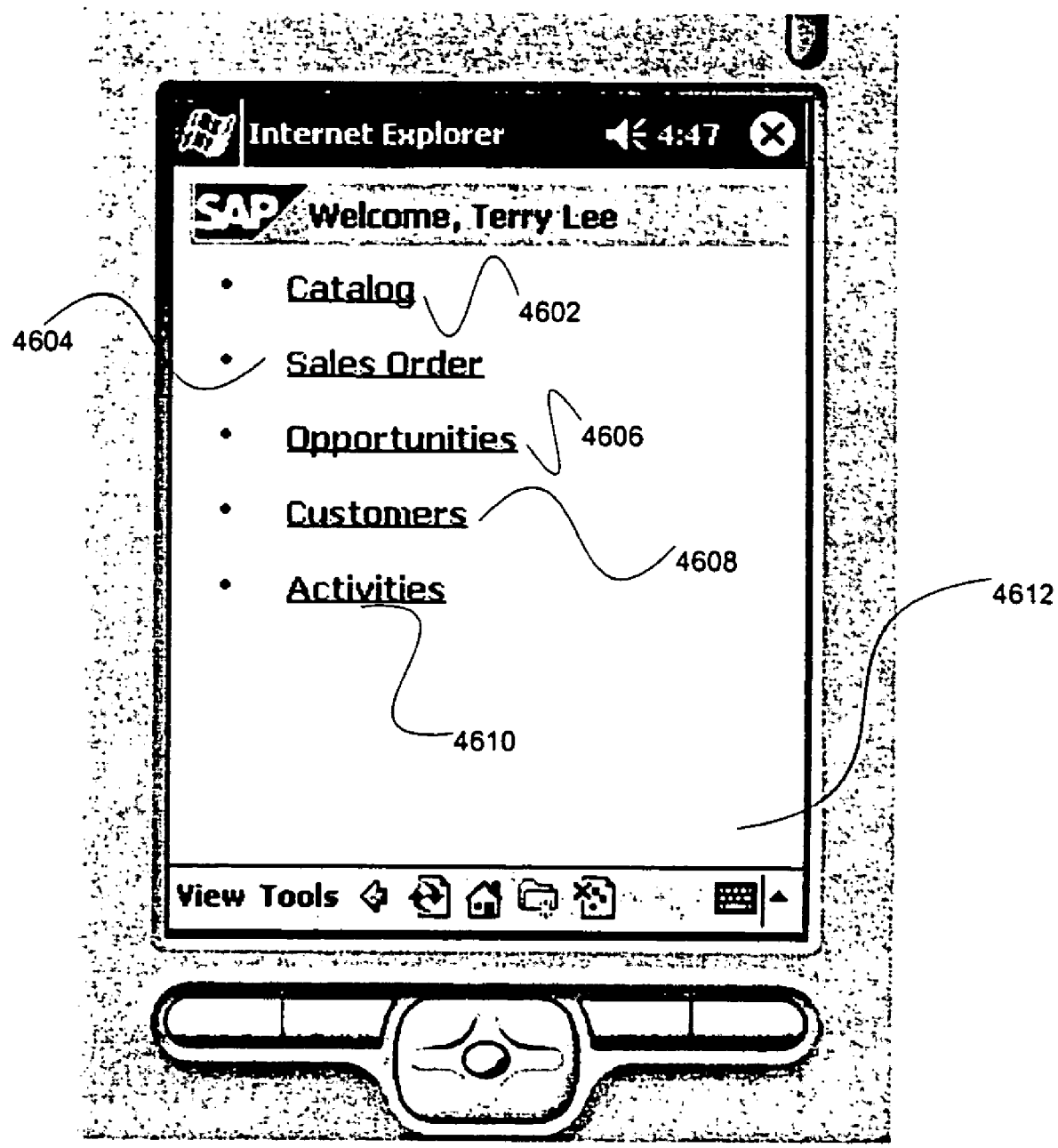
FIG. 46A-J are screenshots of an implementation of the process of FIG. 45.
Figure 46B:
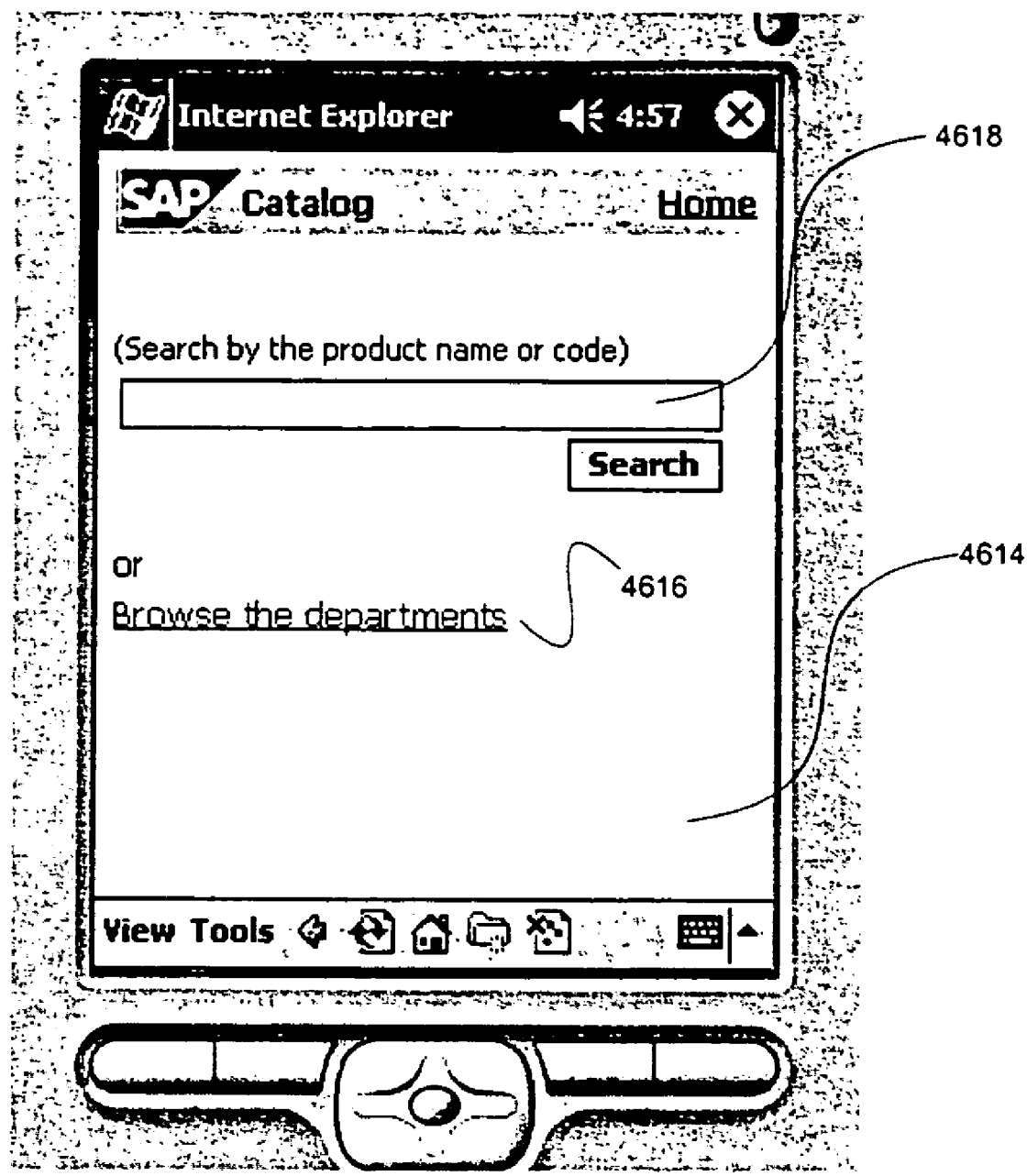
Figure 46C:
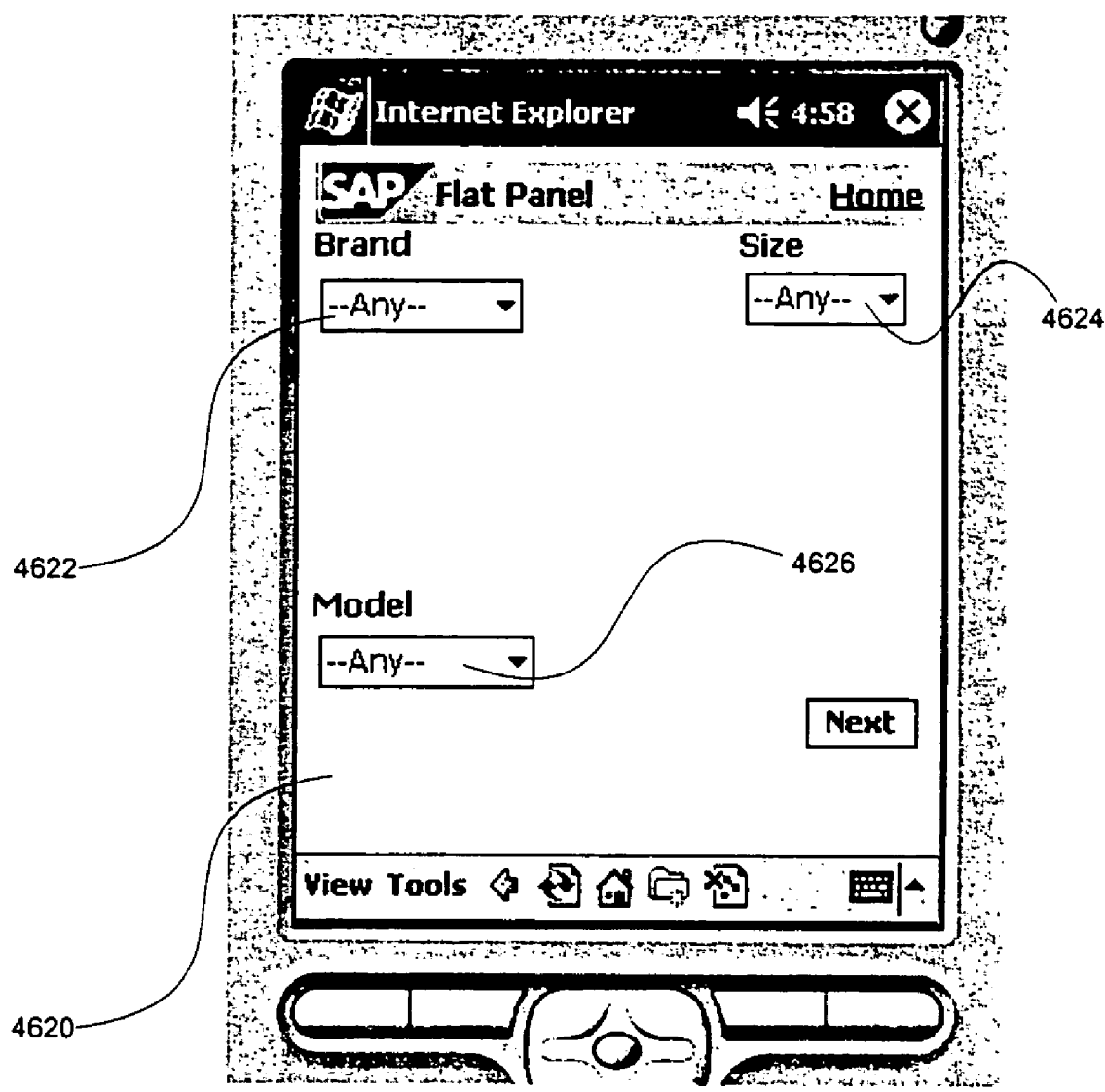
Figure 46D:
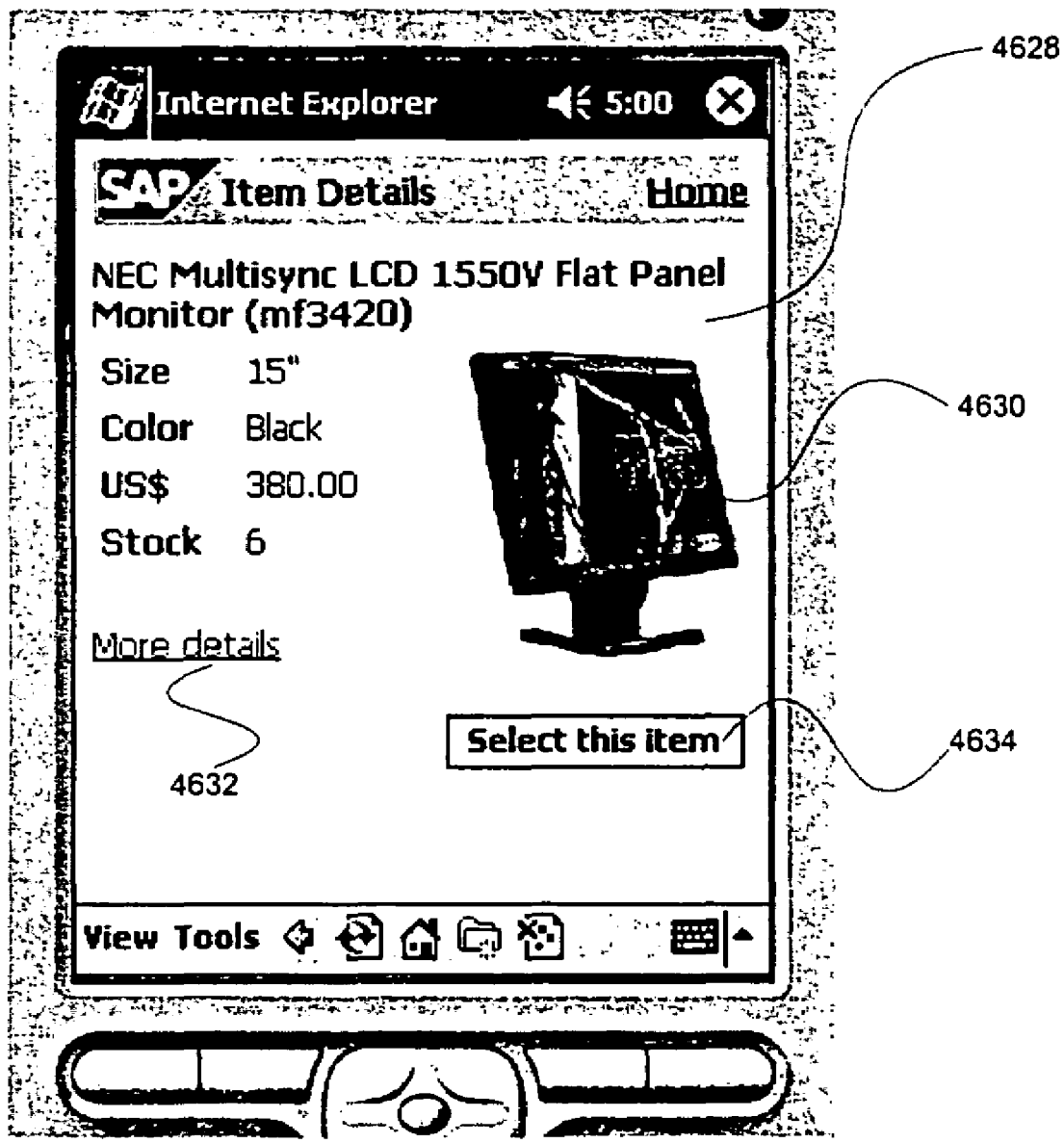
Figure 46E:
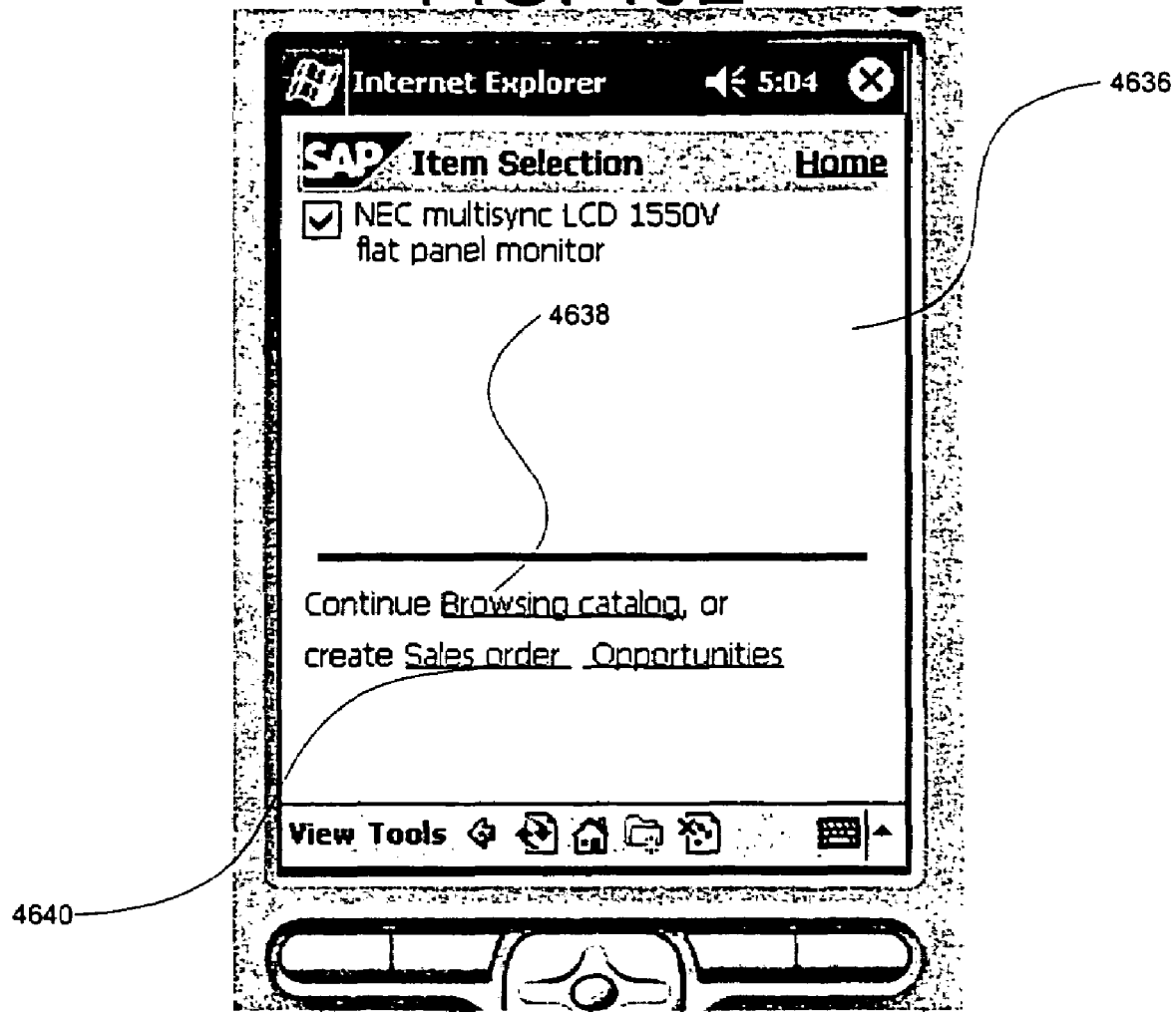

Referring to FIG. 46A, the worker 3510 may click on, or say a name of any link 4602, 4604, 4606, 4608, and 4610 of a screen 4612 to perform a desired operation. The worker 3510 may want to search for particular products by selecting the "Sales Catalog" link 4602. A screen 4614, shown in FIG. 46B may come up. There are multiple possibilities for a product search.

The worker 3510 may click a "Browse the departments" link 4616 or say the phrase to browse through a hierarchy of the catalog, such as, for example: "computers." The worker 3510 may directly key into a field 4618 with a stylus or speak aloud part of a desired product name, such as, for example: "flat panel," taking them the worker 3510 to a screen 4620, shown in FIG. 46C. There are three drop-down lists, 4622, 4624, 4626 which the worker 3510 may select a choice from by using the stylus or the worker may speak phrases such as, for example the following: "Brand NEC" for the list 4622, "Size 15 inches" for the list 4624, and "Model 1550v" for the list 4626. Other variations are possible, and drop-down lists can be tailored to the characteristics of a product line, for example.

The worker may input complete product information, such as, for example: "NEC flat panel 1550v," taking them to a screen 4628, shown in FIG. 46D. An image 4630 of the product may be displayed. The worker 3510 may select a "More details" link 4632 to get more information about the item. Alternatively, the worker 3510 may say or select a "select this item" link 4634, resulting in a screen 4636, shown in FIG. 46E.

The worker 3510 may say or click a "Browse catalog" link 4638 to continue searching for additional products, leading back to the screen 4614. The worker 3510 may select a "Create sales order" link 4640, taking them to a screen 4642, shown in FIG. 46F. The worker 3510 may say or click a "new customer" link 4644, taking them to a screen 4646, shown in FIG. 46G. The worker 3510 may say or key in the information for all fields.

The worker 3510 does not need to focus on a field to input the data for that field, though the worker 3510 may click on a field or say a field name, such as, for example: "First Name" 4648 in order to set the focus. In one implementation, the focus automatically moves between fields in the steps. When inputting information into fields, the worker 3510 may speak from a large vocabulary, or the worker 3510 may type whatever is needed. The worker 3510 may click on or speak "Next" 4650 to go to a screen 4652, shown in FIG. 46H. After the worker 3510 inputs remaining information into fields in the screen 4652, the button "Cancel" 4654 or "Save" 4656 may be selected.

Figure 46F:
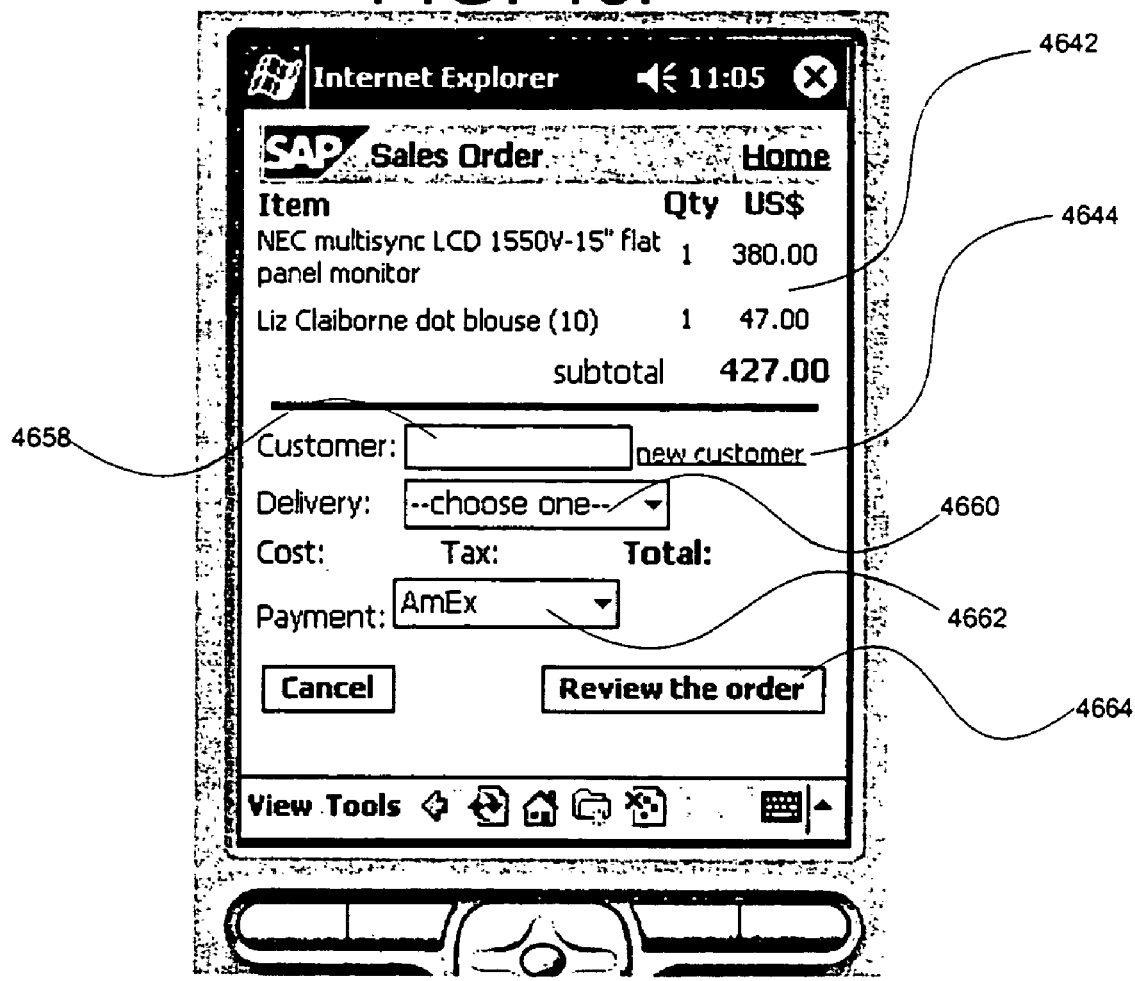
Figure 46G:
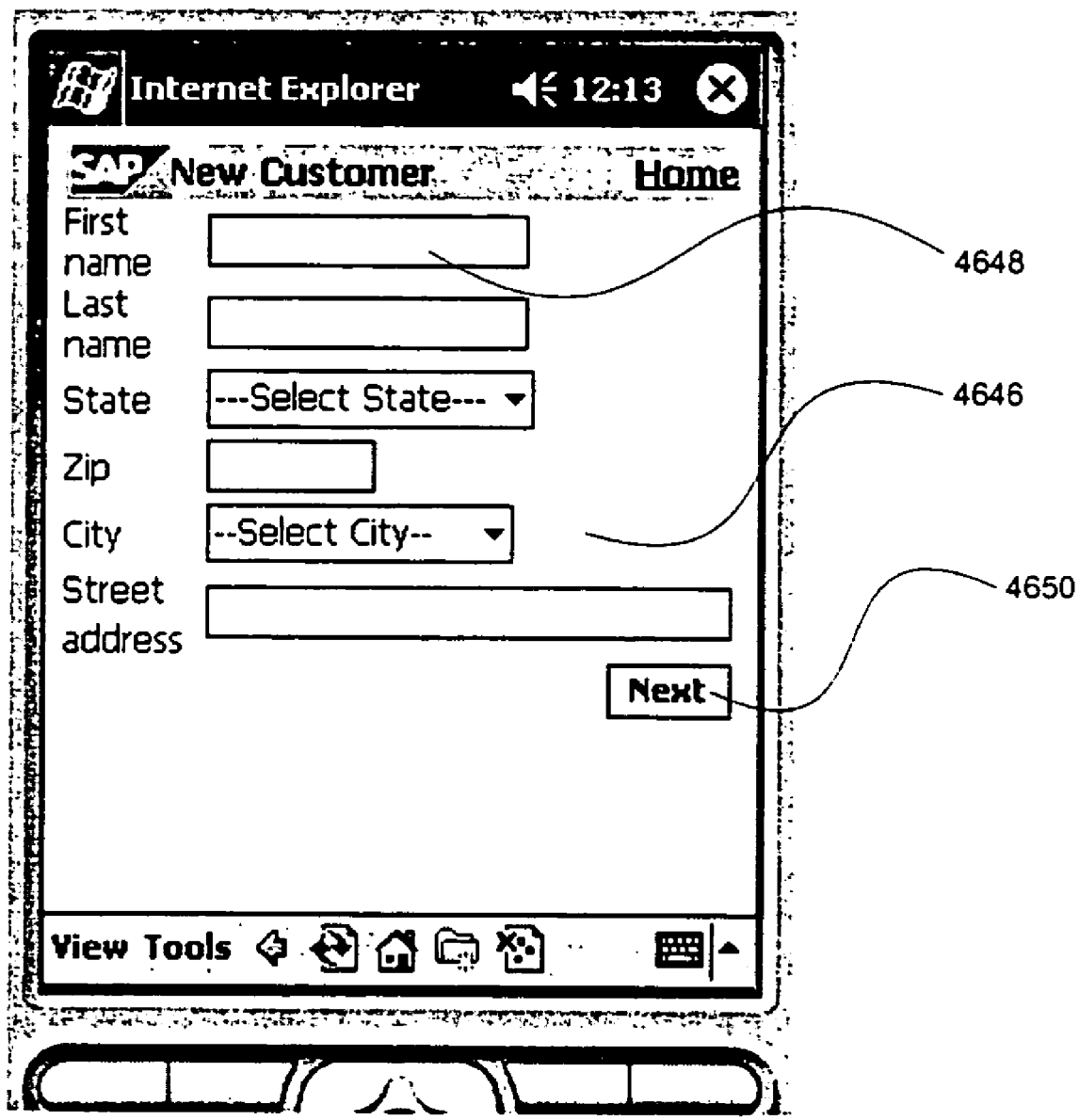
Figure 46H:
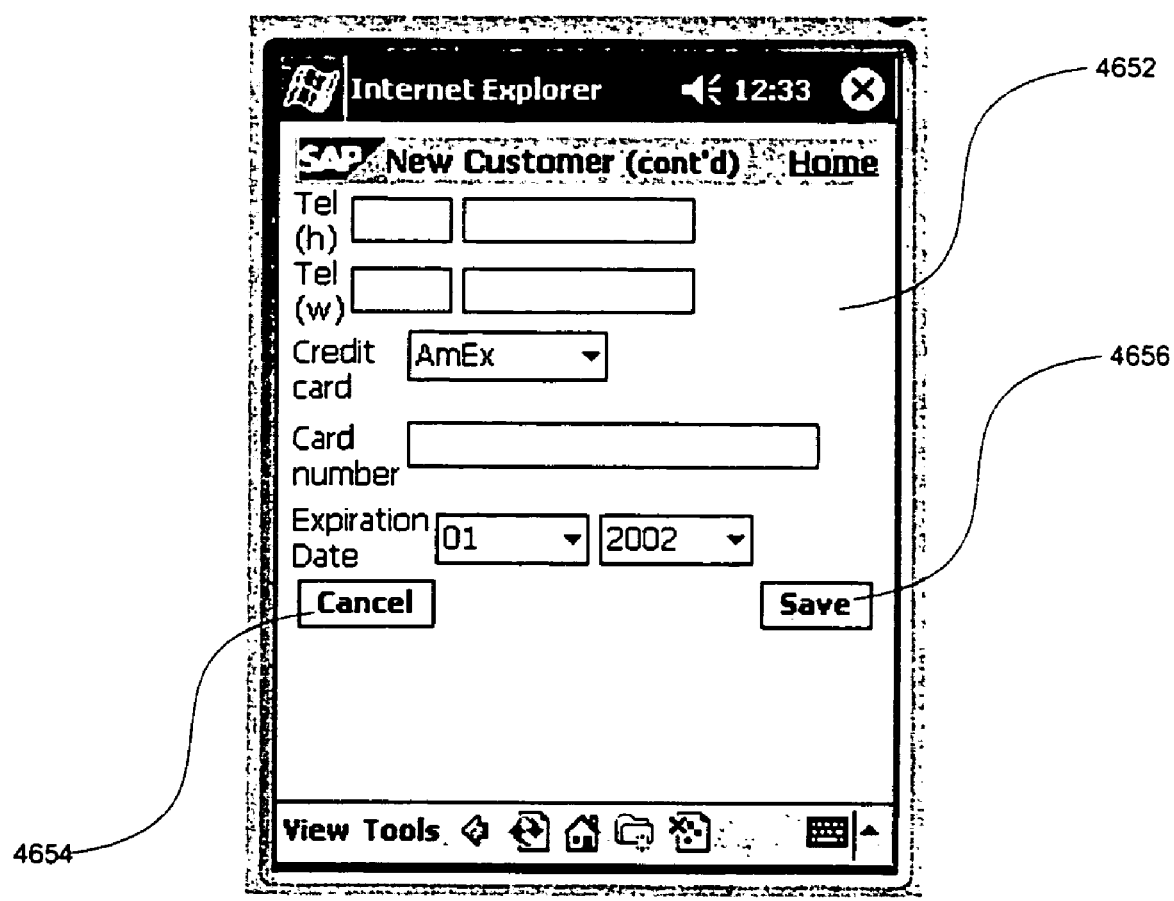
Figure 46I:
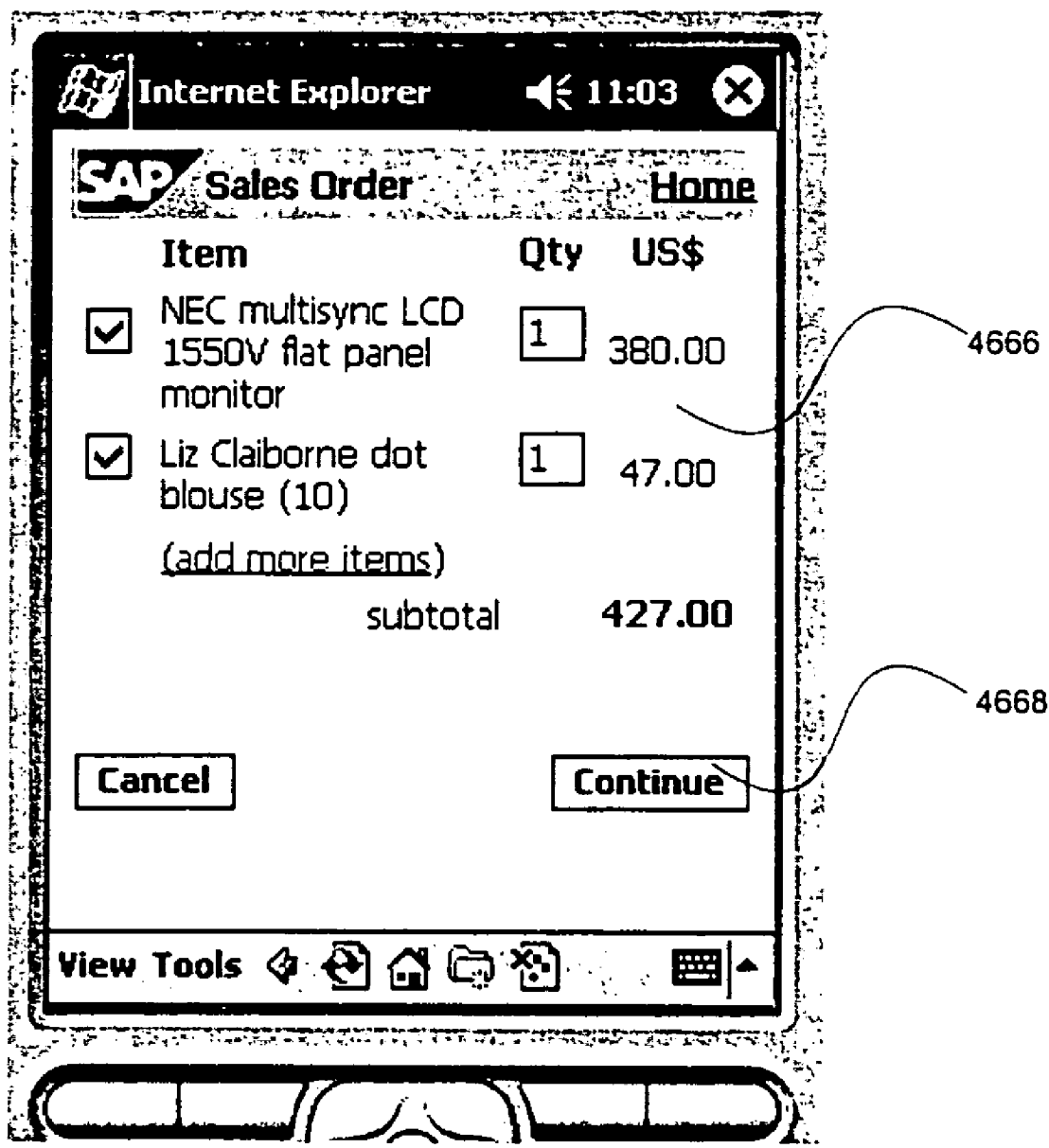
Figure 46J:
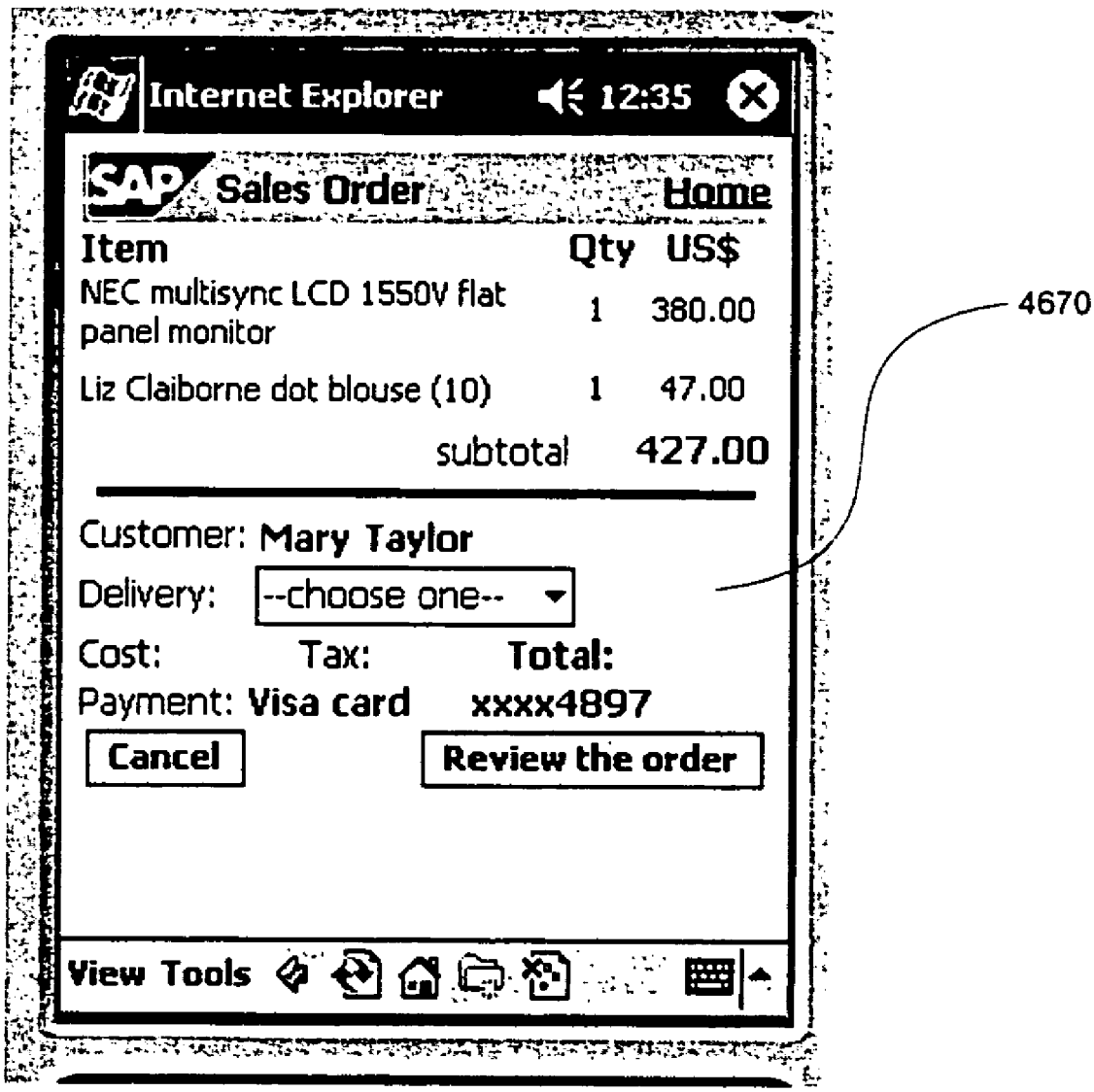

In the screen 4642 of FIG. 46F, the worker may have said or entered an existing customer's name into a field 4658, accessing the server system 3514's customer information. The worker 3510 may then select a delivery type 4660 and a payment method 4662. The worker 3510 may review the order by selecting "review the order" 4664, resulting in a screen 4666, shown in FIG. 46I. The worker 3510 may then continue with the order by selecting "Continue" 4668, resulting in a screen 4670, shown in FIG. 46J. The worker 3510 may then review the order and complete the transaction.

Though in the above implementation, the worker 3510 completes a purchase transaction, alternate implementations may enable an authenticated customer to complete the transaction alone. In either case, it should be understood that the PDA 3960 and associated functionality enables a "portable cash register," such that a need for checkout lines may be avoided for at least some customers. This may be particularly advantageous for stores that are relatively large, or that sell large items that are difficult to move to a cash register, or that include outdoor portions, such as a garden store.

As explained earlier, various actions described in this disclosure are intended to be construed broadly. For example, receiving may include accessing or intercepting. As another example, a device may consist of a single component or multiple components.

A number of implementations have been described. Nevertheless, it will be understood that various modifications may be made. For example, various operations in the disclosed processes may be performed in different orders or in parallel, and various features and components in the disclosed implementations may be combined, deleted, rearranged, or supplemented. Accordingly, other implementations are within the scope of the following claims.

What is claimed is:

1. A computer-implemented method comprising:
   outputting a first page for display on a portable device, the first page including a first field for receiving a product identifier of a first product identified by a customer;
   receiving the product identifier;
   analyzing a linger time of a customer or an other customer in a first area where a second product previously purchased by the customer or by the other customer was sold;
   correlating the first product with the second product based on analyzing the linger time;
   outputting a second page for display on the portable device, the second page displaying information identifying the second product;
   determining a route between a second area associated with the first product and the first location associated with the second product; and
   outputting information describing the route on the electronic device.

2. The method of claim 1, wherein analyzing a linger time of the customer or the other customer in a first area where the second product previously purchased by the customer or by the other customer was sold further comprises analyzing the linger time of an RFID-enabled shopping cart of the customer or the other customer in the second area where the second product was sold.

3. The method of claim 1, wherein the product identifier is received using a different modality than is used to output the information identifying the second product.

4. The method of claim 1, wherein the first product is correlated with the second product further based on a sales promotion of the second product.

5. The method of claim 1, wherein the first product is correlated with the second product further based on excess inventory of the second product.

6. The method of claim 1, wherein receiving the product identifier further comprises receiving spoken information describing the first product.

7. A computer storage medium encoded with a computer program, the program comprising instructions that when executed by data processing apparatus cause the data processing apparatus to perform operations comprising:
   outputting a first page for display on a portable device, the first page including a first field for receiving a product identifier of a first product identified by a customer;
   receiving the product identifier;
   analyzing a linger time of a customer or an other customer in a first area where a second product previously purchased by the customer or by the other customer was sold;
   correlating the first product with the second product based on analyzing the linger time;
   outputting a second page for display on the portable device, the second page displaying information identifying the second product;
   determining a route between a second area associated with the first product and the first location associated with the second product; and outputting information describing the route on the electronic device.

8. The computer storage medium of claim 7, wherein analyzing a linger time of the customer or the other customer in a first area where the second product previously purchased by the customer or by the other customer was sold further comprises analyzing the linger time of an RFID-enabled shopping cart of the customer or the other customer in the second area where the second product was sold.

9. The computer storage medium of claim 7, wherein the product identifier is received using a different modality than is used to output the information identifying the second product.

10. The computer storage medium of claim 7, wherein the first product is correlated with the second product further based on a sales promotion of the second product.

11. The computer storage medium of claim 7, wherein the first product is correlated with the second product further based on excess inventory of the second product.

12. The computer storage medium of claim 7, wherein receiving the product identifier further comprises receiving spoken information describing the first product.

13. A system comprising:
one or more computers; and
a computer-readable medium coupled to the one or more computers having instructions stored thereon which, when executed by the one or more computers, cause the one or more computers to perform operations comprising:
outputting a first page for display on a portable device, the first page including a first field for receiving a product identifier of a first product identified by a customer,
receiving the product identifier;
analyzing a linger time of a customer or an other customer in a first area where a second product previously purchased by the customer or by the other customer was sold;
correlating the first product with a the second product based on analyzing the linger time,
outputting a second page for display on the portable device, the second page displaying information identifying the second product;
determining a route between a second area associated with the first product and the first location associated with the second product; and
outputting information describing the route on the electronic device.

14. The system of claim 13, wherein analyzing a linger time of the customer or the other customer in a first area where the second product previously purchased by the customer or by the other customer was sold further comprises analyzing the linger time of an RFID-enabled shopping cart of the customer or the other customer in the second area where the second product was sold.

15. The system of claim 13, wherein the product identifier is received using a different modality than is used to output the information identifying the second product.

16. The system of claim 13, wherein the first product is correlated with the second product further based on a sales promotion of the second product.

17. The system of claim 13, wherein the first product is correlated with the second product further based on excess inventory of the second product.

18. The system of claim 13, wherein receiving the product identifier further comprises receiving spoken information describing the first product.

* * * * *

UNITED STATES PATENT AND TRADEMARK OFFICE
CERTIFICATE OF CORRECTION

PATENT NO.      : 7,603,291 B2                              Page 1 of 1
APPLICATION NO. : 10/743348
DATED           : October 13, 2009
INVENTOR(S)     : Raiyani et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1328 days.

Signed and Sealed this

Fifth Day of October, 2010

David J. Kappos
*Director of the United States Patent and Trademark Office*